US009202369B2

(12) United States Patent
Jain et al.

(10) Patent No.: US 9,202,369 B2
(45) Date of Patent: *Dec. 1, 2015

(54) METHOD FOR ROBUST WIRELESS MONITORING AND TRACKING OF SOLAR TRACKERS IN COMMERCIAL SOLAR POWER PLANTS

(75) Inventors: Vivek Jain, Mountain View, CA (US); Gunther May, Karlstadt (DE); Lakshmi Venkatraman, Mountain View, CA (US); Abtin Keshavarzian, Mountain View, CA (US); Till Deubel, Neunkirchen (DE)

(73) Assignee: Robert Bosch GmbH, Stuttgart, DE (US)

( * ) Notice: Subject to any disclaimer, the term of this patent is extended or adjusted under 35 U.S.C. 154(b) by 806 days.

This patent is subject to a terminal disclaimer.

(21) Appl. No.: 13/550,663

(22) Filed: Jul. 17, 2012

(65) Prior Publication Data
US 2014/0022089 A1     Jan. 23, 2014

(51) Int. Cl.
*G08C 19/00* (2006.01)
*H04W 40/00* (2009.01)
*G08C 17/00* (2006.01)
*H04L 12/24* (2006.01)
(Continued)

(52) U.S. Cl.
CPC ............... *G08C 19/00* (2013.01); *H04W 40/00* (2013.01); *G08C 17/00* (2013.01); *H04L 41/04* (2013.01); *H04L 41/12* (2013.01); *H04Q 9/00* (2013.01); *H04W 84/00* (2013.01)

(58) Field of Classification Search
CPC ..................... G08C 17/00–17/06; G08C 19/00; H04L 41/04–41/12; H04Q 9/00; H04W 40/00–40/38; H04W 84/00–84/18
See application file for complete search history.

(56) References Cited

U.S. PATENT DOCUMENTS 7,606,171 B1    10/2009 Young et al.
7,769,041 B2    8/2010 Arrakoski
(Continued)

FOREIGN PATENT DOCUMENTS

GB     2287383 A     9/1995
WO     2009112937 A1    9/2009

OTHER PUBLICATIONS

International Search Report and Written Opinion corresponding to PCT Application No. PCT/IB2013/001993, mailed Dec. 12, 2013 (10 pages).

*Primary Examiner* — Hai Phan
*Assistant Examiner* — Orlando Bousono
(74) *Attorney, Agent, or Firm* — Maginot Moore & Beck LLP

(57) ABSTRACT

A method of wireless communication includes providing a matrix of trackers. The matrix includes rows and columns of trackers. A number of rows and a number of columns in the matrix is determined. If the number of rows is substantially greater than the number of columns, then vertical sweeping is performed including passing data along each of the columns of trackers to an end tracker in each column. If the number of rows is substantially less than the number of columns, then horizontal sweeping is performed including passing data along each of the rows of trackers to an end tracker in each row. If the number of rows is substantially equal to the number of columns, then diagonal sweeping is performed including passing data diagonally across each of the rows and columns of trackers to an end tracker in each row and each column. The data is passed along the end trackers to a final destination data collector.

6 Claims, 48 Drawing Sheets

(51) Int. Cl.
   *H04Q 9/00*   (2006.01)
   *H04W 84/00*  (2009.01)

(56) References Cited

U.S. PATENT DOCUMENTS 7,818,009 B2    10/2010   Trachtman
   7,818,018 B2    10/2010   Nanda et al.
   8,184,715 B1 *   5/2012   Rosenzweig et al. .... 375/240.24
   2004/0095880 A1*  5/2004   Laroia et al. .................. 370/208
   2004/0190476 A1   9/2004   Bansal et al.
   2006/0104232 A1   5/2006   Gidwani
   2007/0071146 A1   3/2007   Scaglione et al.
   2008/0040509 A1   2/2008   Werb et al.
   2010/0329174 A1  12/2010   Shuey
   2012/0086596 A1   4/2012   Insanic et al.
   2012/0219068 A1*  8/2012   Rosenzweig et al. .... 375/240.24

* cited by examiner

| Sweeping Scheme | When to use | Description |
|---|---|---|
| Vertical (FIG. 4a) | Number of trackers in a column are much more than in a row (n>>m) | Each tracker transmits within its column from farther end towards the final node. Once data is collected by the last node in the column, then all the nodes in the last row follow the same procedure to finally collect data at the destination node |
| Horizontal (FIG. 4b) | Number of trackers in a row are much more than in a column (m>>n) | Each tracker transmits within its row from farther end towards the final node. Once data is collected by the last node in the row, then all the nodes in the last column follow the same procedure to finally collect data at the destination node |
| Diagonal (FIGS. 4c-e) | Number of trackers in a row and column are nearly equal (m~n) | Each tracker transmits within its diagonal path from farther end towards the final node. Once data is collected by the last node in the respective row and column, then all the nodes in the last row and column follow the same procedure to finally collect data at the destination node |

FIG. 3

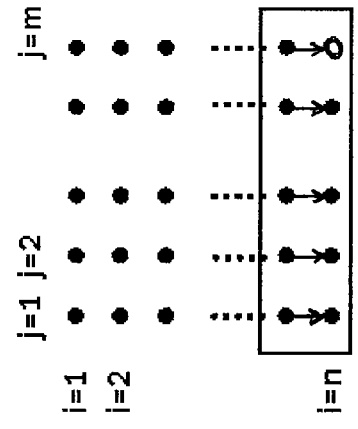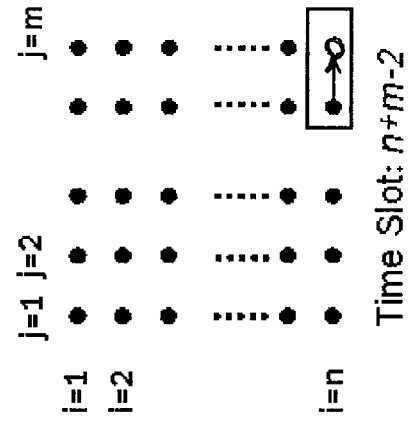
FIG. 5a  FIG. 5b  FIG. 5c
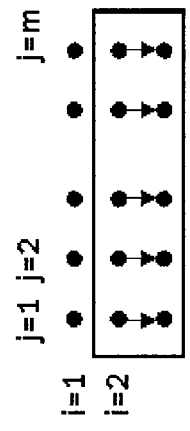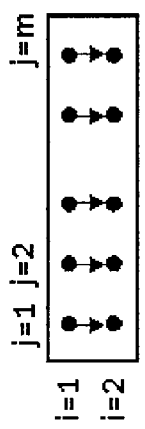
FIG. 5d  FIG. 5e  FIG. 5f

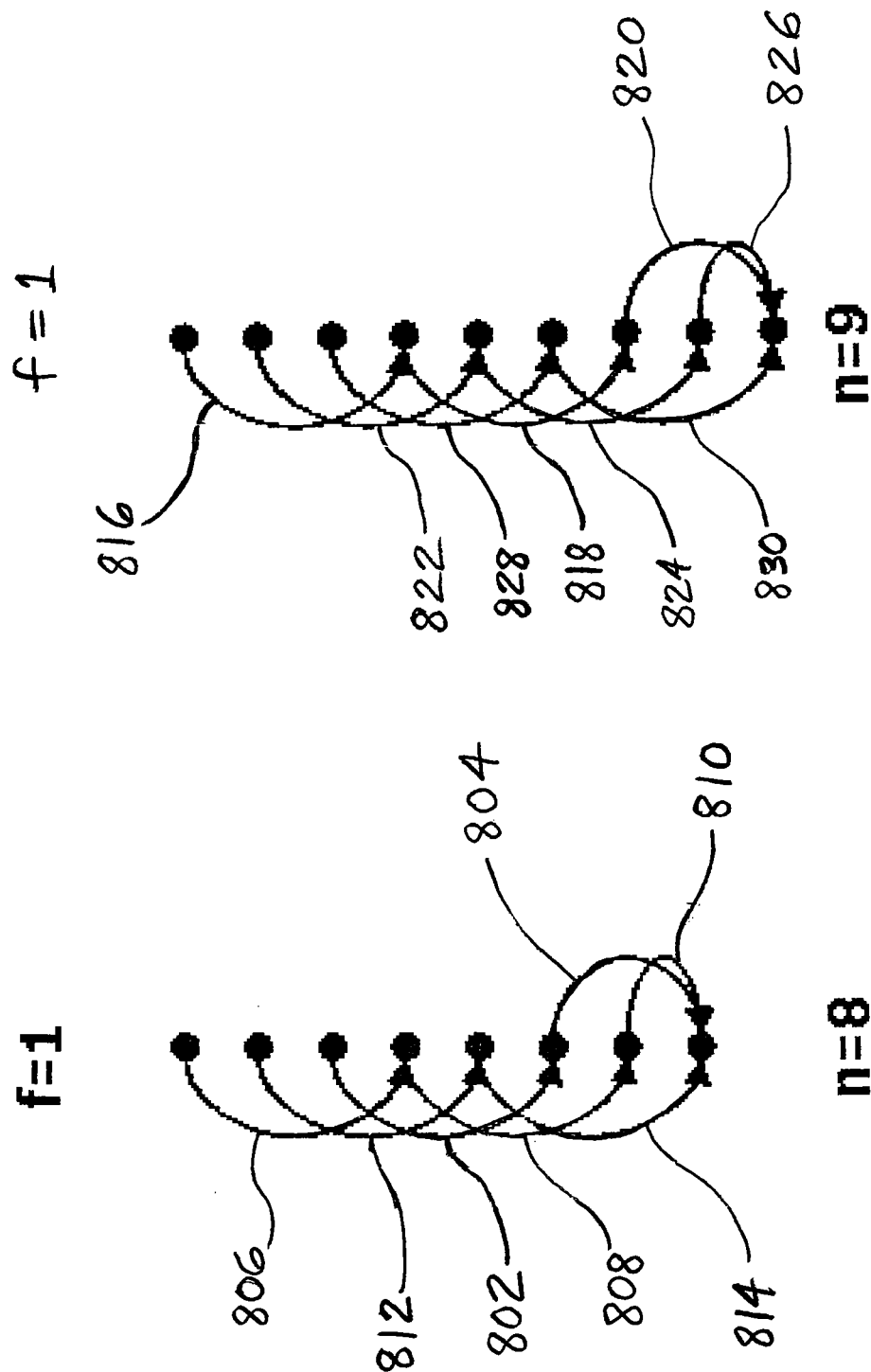

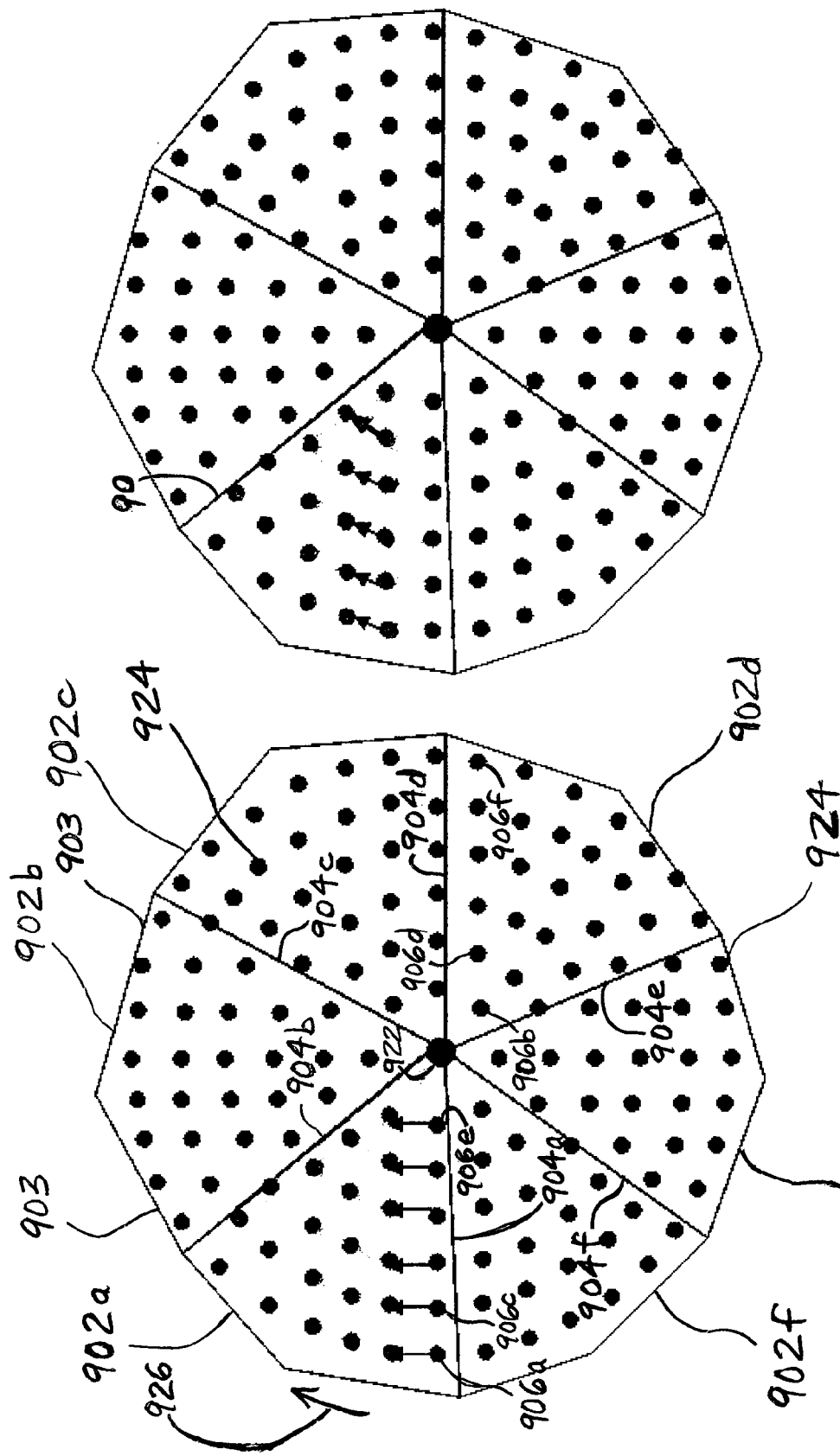

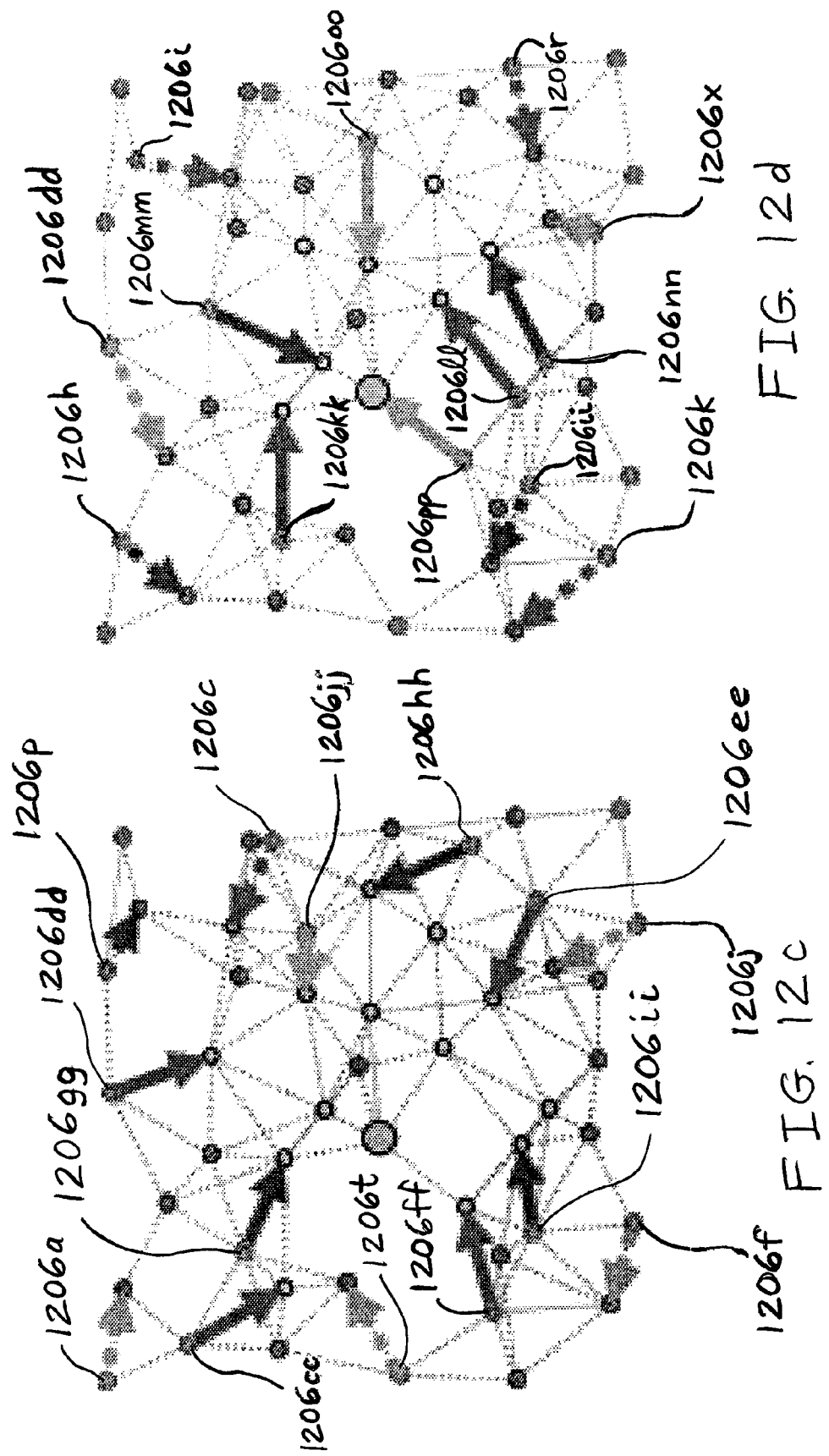

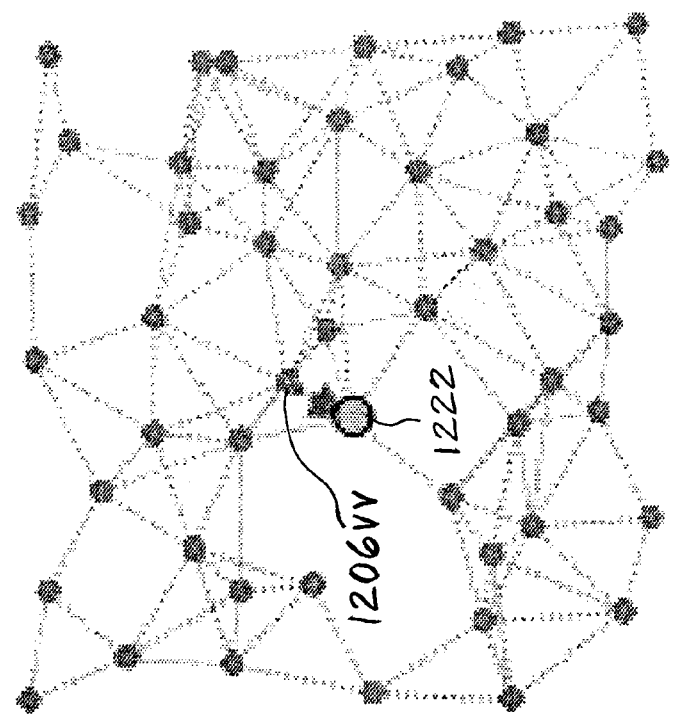
FIG. 12ℓ
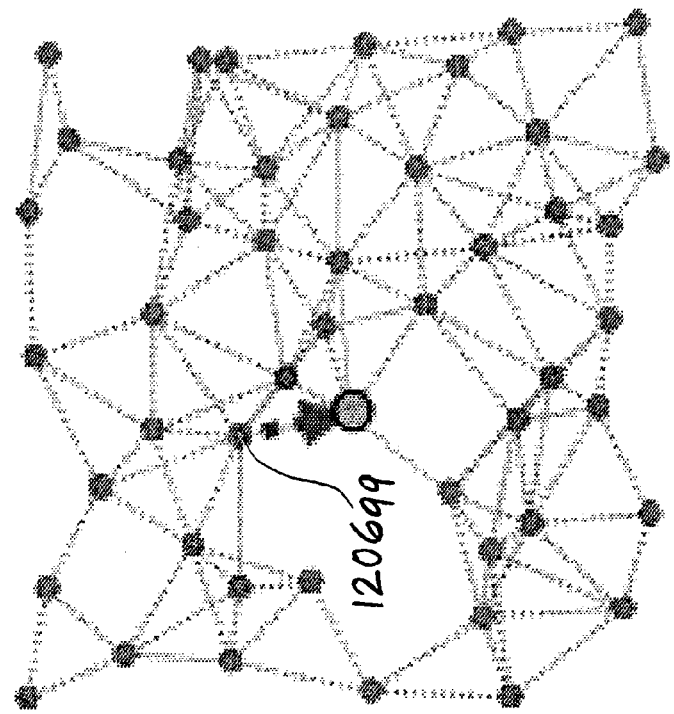
FIG. 12k

METHOD FOR ROBUST WIRELESS MONITORING AND TRACKING OF SOLAR TRACKERS IN COMMERCIAL SOLAR POWER PLANTS

BACKGROUND OF THE INVENTION

1. Field of the Invention

The invention relates to wireless monitoring, and, more particularly, to wireless monitoring of solar trackers.

2. Description of the Related Art

A typical commercial solar plant consists of several thousands of solar trackers. For optimal performance, trackers may point to the sun's position so as to capture a maximum amount of solar energy. Because the sun's position in the sky is constantly changing, pointing the trackers at the sun may require continuous tracking. A control station may govern the tracking by sending commands to each individual tracker over a wired network. The control station may also perform continuous condition monitoring of the trackers by receiving status messages from the trackers. Connecting thousands of trackers to the central control station via wires is a cumbersome process requiring a lot of time and incurring huge cost.

Commercial solar plants may include thousands of tracking collectors (i.e., trackers) to capture the solar energy. These tracking collectors can convert solar energy to electricity via either of two methods. In the first such method, sometimes referred to as "Concentrated Solar Power" (CSP), the trackers include mirrors which focus the sun's rays on a heat collector. The heat energy is then later converted to electricity. In the second method, sometimes referred to as "Concentrated Photovoltaic" (CPV), the trackers include photovoltaic modules which convert solar energy to electricity directly.

For optimal performance, the trackers may continuously point in the direction of the sun. Also, during non-operation, at night, or during inclement weather conditions (e.g., rain, snow, etc.), the trackers may return to the safe position in which they are protected. The position of each of these trackers may be controlled from and by a central data control station (DCS) that transmits commands and receives status messages from the trackers using wired communication.

FIG. 1 illustrates a known wired data communication hierarchy 10 for parabolic trough CSP systems. Hierarchy 10 may include fiber-optic point-to-point links 12 between the DCS and the data concentrators. Hierarchy 10 may also include wired RS-485 or fiber-optic point-to-point links 14 between the data concentrators and the data collectors. Hierarchy 10 may further include a tracking system 16 (e.g., "tracker") having data collectors and hydraulic and power units for a parabolic trough.

Tracking requirements and solutions may be the same for CSPs and CPVs from a communications point of view. A typical solar plant includes thousands of trackers, so the plant may cover several square kilometers of area. Thus, connecting each of these trackers with a DCS may require several kilometers of wire as well as a huge cost and installation effort.

What is neither disclosed nor suggested by the prior art is a method of controlling a group of solar trackers that overcomes the above-described problems.

SUMMARY OF THE INVENTION

A wireless solution to the above-described challenges can be both cost and time effective for this commercial solar plant application. However, connecting thousands of trackers wirelessly calls for a robust communication method which can ensure the reliability and latency requirements of the application. The invention provides several such methods to enable robust wireless communication between the control station and the trackers.

The invention is directed to methods to enable robust wireless communication between a control station and solar trackers in a commercial solar plant. The methods include data collection sweeping schemes for rectangular and circular grid topologies; data collection schemes for any topology, including random slotted, hierarchical, divide and conquer, and repeaters/collectors; and data communication from a data control station to trackers.

A wireless solution can be both time and cost effective. A bi-directional wireless communication between a DCS and trackers may call for certain data collection and data communication features. With regard to data collection, status data may be collected securely and reliably from all trackers (of which there may be about two thousand) within a few seconds. With regard to data communication, the trackers may be controlled for both normal operation and emergency operation. The invention may provide several embodiments of robust communication methods that satisfy the reliability and latency parameters of the above-described two types of communication.

The invention may provide several wireless communication methods for reliable and time-constrained data transfer between a control system and trackers for commercial solar power plants. The described methods can be used in solar tracking systems, for example.

In one embodiment, the invention provides a method for wireless monitoring and tracking of solar trackers in commercial solar power plants.

Typical deployments of solar power systems may be either in rectangular grid or circular topologies. According to one embodiment of the invention, the geometry of tracker distribution may be used to assign time slots as well as to assign routing schemes.

In another embodiment, sweeping schemes may be used for rectangular grid topology. Trackers may communicate with their neighbor nodes dependent upon the selected sweeping method. Vertical sweeping may be selected when the number of trackers in a column is more than the number of trackers in a row. Horizontal sweeping may be selected when the number of trackers in a row is more than the number of trackers in a column. Diagonal sweeping may be used when the number of trackers in a row and the number of trackers in a column are nearly equal. The selection of the sweeping scheme may be optimized for frequency reuse and for collection/communication on a single path.

In yet another embodiment, sweeping for circular topology may include data flow being on concentric circles or directed towards the center of the topology. Sweeping for circular topology may also include division of the topology into sectors and the use of different frequency channel groups for different sectors.

In one embodiment, a random slotted scheme may be used for any topology. All non-overlapping communication may be scheduled in a given slot, and the use of available frequency channels may be maximized. Methods may optimize the use of variable slot sizes as well as the use of multiple collection schedules.

In another embodiment, a hierarchical scheme may be used for any topology. The whole topology may be divided into several non-overlapping clusters where trackers send data to the pre-defined/selected cluster head. The cluster head may then forward the collected data to the central data control system. Methods may optimize frequency reuse as well as the reuse of multiple radios/directional antennas for simultaneous communication or for directly communicating with the data control system.

In yet another embodiment, a divide and conquer method may be used to collect/communicate information. The whole area of the topology may be divided into multiple sub-areas. A different subset of channels may be used for each sub-area. It may be possible to employ a different communication method for every sub-area so as to optimize the overall communication. A given path may be divided into multiple sectors and simultaneous communication may be scheduled in those sectors.

In one embodiment, stand-alone repeaters or intermediate data collectors may be used to relay communications. Multiple radios may be used in order to transmit communications to several nodes simultaneously. Directional antennas may be used in order to increase the transmission range and enable communication with other intermediate collectors or with the final data collector.

In another embodiment, data communication from the data control system (DCS) to the trackers may be performed in the case wherein the DCS needs to communicate with a particular tracker. The same path and intermediate nodes may be used as in the case where the DCS collects data from the particular tracker. An algorithm that determines the shortest path distance may be used.

In yet another embodiment, data communication from the DCS to the trackers may be performed in the case wherein the DCS needs to broadcast the same data to all trackers. Predefined cluster heads/repeaters/intermediate collectors may be used for rebroadcasting messages. A pre-defined set of trackers may be used as broadcasters as well.

In still another embodiment, data communication from the DCS to the trackers may be performed in the case wherein the DCS needs to send individualized data to every tracker node. The same communication paths and schedule used to transmit data from the trackers to the DCS may be used in transmitting individualized data from the DCS to the tracker nodes, but in the reverse order.

The invention comprises, in one form thereof, a method of wireless communication including providing a matrix of trackers. The matrix includes rows and columns of trackers. A number of rows and a number of columns in the matrix are determined. If the number of rows is substantially greater than the number of columns, then vertical sweeping is performed including passing data along each of the columns of trackers to an end tracker in each column. If the number of rows is substantially less than the number of columns, then horizontal sweeping is performed including passing data along each of the rows of trackers to an end tracker in each row. If the number of rows is substantially equal to the number of columns, then diagonal sweeping is performed including passing data diagonally across each of the rows and columns of trackers to an end tracker in each row and each column. The data is passed along the end trackers to a final destination data collector.

The invention comprises, in another form thereof, a method of wireless communication including providing a plurality of trackers disposed within a substantially circular outer boundary. A final destination data collector is provided approximately centrally located within the circular outer boundary. The trackers are grouped into a plurality of substantially pie-shaped sectors. Each pie-shaped sector is defined between the circular outer boundary and two corresponding imaginary and substantially radially-oriented borders. Circumferential sweeping is performed within each sector. The circumferential sweeping within each sector includes passing data from ones of the trackers disposed along a first of the radially-oriented borders to a plurality of end trackers disposed along a second of the radially-oriented borders. The passing is in a plurality of circumferential directions. The data is passed along the end trackers to the final destination data collector.

The invention comprises, in yet another form thereof, a method of wireless communication including providing a plurality of trackers disposed within a substantially circular outer boundary. A final destination data collector is provided approximately centrally located within the circular outer boundary. The trackers are grouped into a plurality of substantially pie-shaped sectors. Each pie-shaped sector is defined between the circular outer boundary and two corresponding imaginary and substantially radially-oriented borders. The trackers in one of the sectors are grouped into a plurality of substantially parallel and substantially radially-oriented lines of trackers. A first of the lines of trackers is disposed along a first of the radially-oriented borders. Each of the other lines of trackers extend substantially from the circular outer boundary to a second of the radially-oriented borders. Substantially radial sweeping is performed within each line in the one sector. The substantially radial sweeping includes passing data in directions away from the circular outer boundary to a plurality of end trackers disposed along the second radially-oriented border. The data is passed along the end trackers to the final destination data collector.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a table of sweeping schemes of the invention for trackers arranged in a rectangular grid topology.

FIG. 5a is a plan view of data transfer in a first time slot of the vertical sweeping scheme of FIG. 4a.

FIG. 5b is a plan view of data transfer in a second time slot of the vertical sweeping scheme of FIG. 4a.

FIG. 5c is a plan view of data transfer in an (n−1)th time slot of the vertical sweeping scheme of FIG. 4a, wherein n is the number of rows in the rectangular grid.

FIG. 5d is a plan view of data transfer in an nth time slot of the vertical sweeping scheme of FIG. 4a, wherein n is the number of rows in the rectangular grid.

FIG. 5e is a plan view of data transfer in an (n+1)th time slot of the vertical sweeping scheme of FIG. 4a, wherein n is the number of rows in the rectangular grid.

FIG. 5f is a plan view of data transfer in an (n+m−2)th time slot of the vertical sweeping scheme of FIG. 4a, wherein n is the number of rows in the rectangular grid, and m is the number of columns in the rectangular grid.

FIG. 7b is a plan view of data transfer in a second time slot in the method of FIG. 7a.

FIG. 7c is a plan view of data transfer in an (n−1)th time slot in the method of FIG. 7a.

FIG. 7d is a plan view of data transfer in an nth time slot in the method of FIG. 7a.

FIG. 7e is a plan view of data transfer in an (n+1)th time slot in the method of FIG. 7a.

FIG. 7f is a plan view of data transfer in an (n+2)th time slot in the method of FIG. 7a.

FIG. 7g is a plan view of data transfer in a time slot subsequent to the (n+2)th time slot in the method of FIG. 7a.

FIG. 7h is a plan view of data transfer in a final time slot in the method of FIG. 7a.

FIG. 8a is a plan view of data transfer in a method of data transfer along a single path with only one non-overlapping frequency channel available and eight trackers in the path according to one embodiment of the invention.

FIG. 8b is a plan view of data transfer in a method of data transfer along a single path with only one non-overlapping frequency channel available and nine trackers in the path according to one embodiment of the invention.

FIG. 9a is a plan view of data transfer in a first time slot in a method of concentric and radial data transfer using a circular grid topology.

FIG. 9b is a plan view of data transfer in a second time slot in a method of concentric and radial data transfer using a circular grid topology.

FIG. 12c is a plan view of data transfer in a third time slot in a random slotted scheme of data transfer including multiple collection schedules.

FIG. 12d is a plan view of data transfer in a fourth time slot in a random slotted scheme of data transfer including multiple collection schedules.

FIG. 12k is a plan view of data transfer in an eleventh time slot in a random slotted scheme of data transfer including multiple collection schedules.

FIG. 12l is a plan view of data transfer in a twelfth time slot in a random slotted scheme of data transfer including multiple collection schedules.

FIG. 18b is a plan view of data transfer from DCS to tracker nodes in a fourth time slot in a scheme in which the DCS broadcasts the same data to all tracker nodes.

Figure 1:
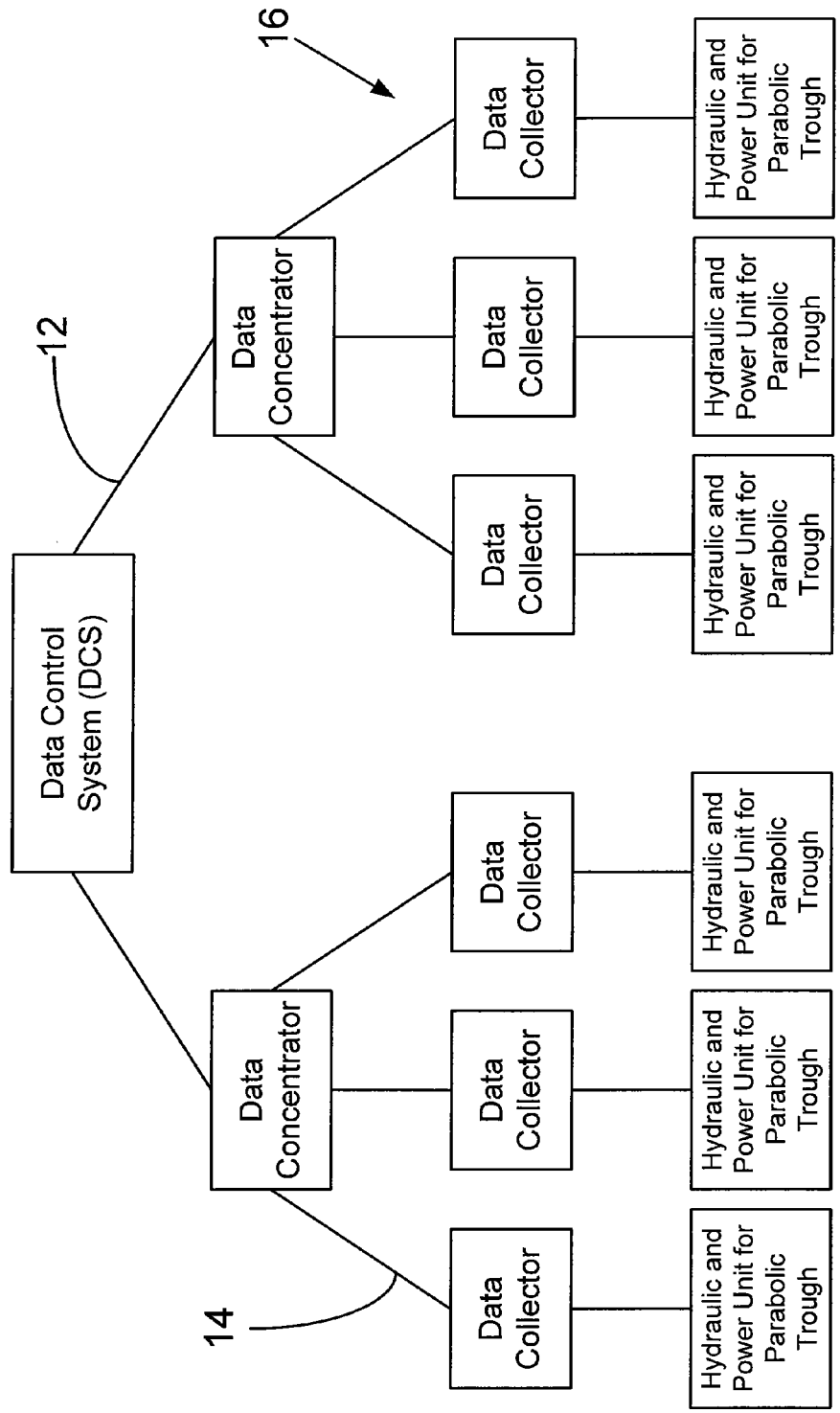
FIG. 1 is a block diagram of a wired communication hierarchy for parabolic trough CSP systems according to the prior art.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE INVENTION

Figure 2B:
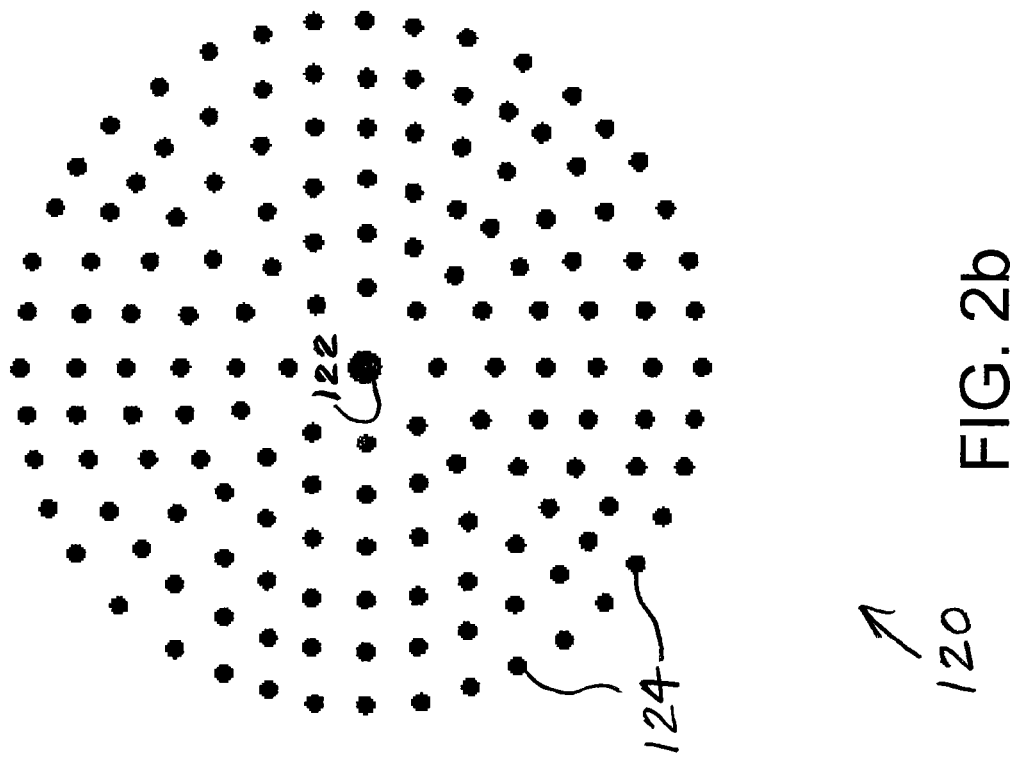
FIG. 2b is a plan view of a solar tracker wireless monitoring and tracking arrangement of the invention with the trackers arranged in concentric circles.
Figure 2A:
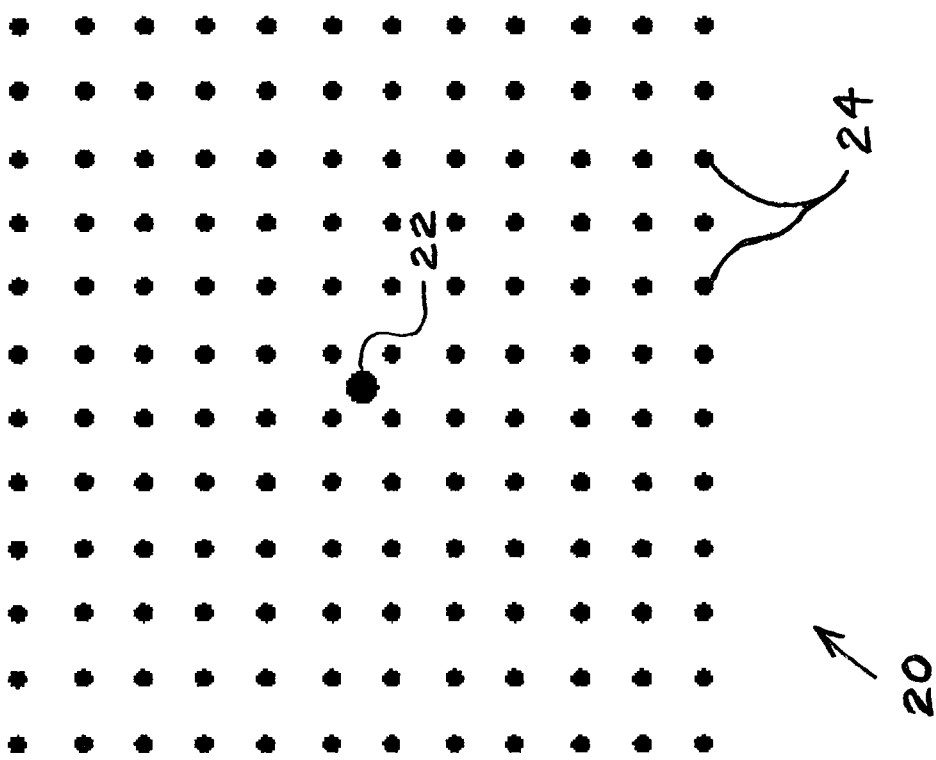
FIG. 2a is a plan view of a solar tracker wireless monitoring and tracking arrangement of the invention with the trackers arranged in a rectangular grid.

In accordance with the invention, one embodiment of a solar tracker wireless monitoring and tracking arrangement 20 is shown in FIG. 2a. Arrangement 20 includes a central data control system (DCS) 22 which is located within a matrix of rows and columns of trackers 24. In a second embodiment of a solar tracker wireless monitoring and tracking arrangement 120 illustrated in FIG. 2b, trackers 124 are arranged in concentric rings surrounding a central data control system (DCS) 122. Thus, the solar plant may have trackers arranged either in a rectangular grid or in concentric circles as shown in FIGS. 2a-b. Two types of communication that may be involved in the invention include data collection and data communication (e.g., data transmission). In data collection, status messages from each tracker may be sent to, and collected by, the DCS. In data communication, query/control messages may be transmitted from the DCS to the trackers. This query/control message can be unique for each tracker or can be a broadcast message that is identical for each tracker.

Figures 4A, 4B:
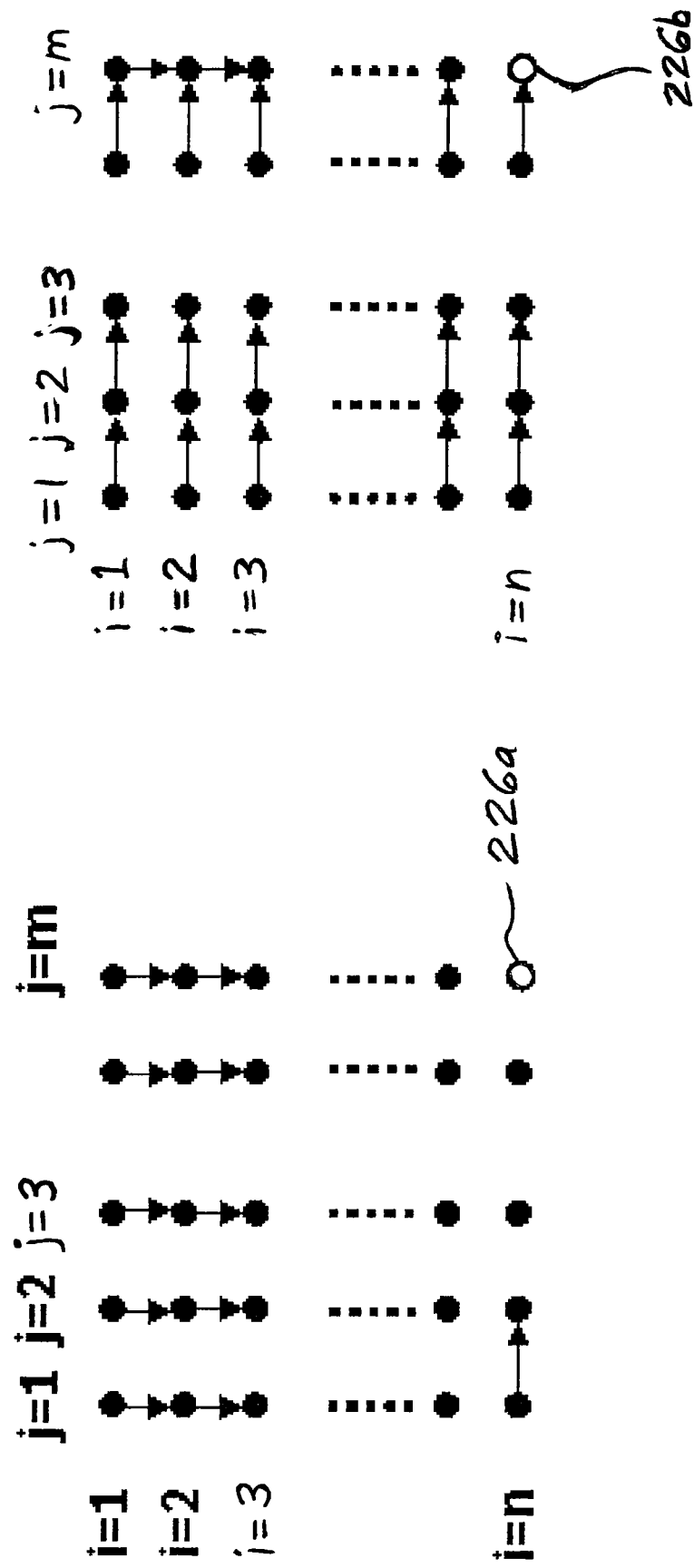
FIG. 4a is a plan view of one embodiment of a vertical sweeping scheme of the invention for trackers arranged in a rectangular grid topology.
FIG. 4b is a plan view of one embodiment of a horizontal sweeping scheme of the invention for trackers arranged in a rectangular grid topology.

With regard to data collection, various sweeping schemes of the invention for a rectangular grid topology are illustrated in the table of FIG. 3 and FIGS. 4a-e. Which of the schemes is to be implemented in a particular application may depend on the arrangement of the trackers, and the total number of trackers, in the selected quadrant. FIG. 4a illustrates a vertical sweeping scheme with horizontal collection. Each arrow represents a transfer of data from one tracker to an adjacent tracker. Each tracker in a same row may transmit the data during a same time slot. For example, each tracker in row 1 (i=1) may transmit to its respective adjacent tracker in row 2 (i=2) in the same time slot; each tracker in row 2 (i=2) may transmit to its respective adjacent tracker in row 3 (i=3) in a same subsequent time slot, etc. After all the data in each column has been received by a respective end tracker in the column (e.g., in row n), then, in a next time slot, the data may be transferred from the end tracker in column 1 (i=n, j=1) to the end tracker in column 2 (i=n, j=2). In a subsequent time slot, all the data held by the end tracker in column 2 (i=n, j=2) may be transferred to the end tracker in column 3 (i=n, j=3), etc., until finally all of the data in the grid has been transferred to a data collector 226a in row n and column m (i=n, j=m).

Conversely, FIG. 4b illustrates a horizontal sweeping scheme with vertical collection. Again, each arrow represents a transfer of data from one tracker to an adjacent tracker. Each tracker in a same column may transmit the data during a same time slot. For example, each tracker in column 1 (j=1) may transmit to its respective adjacent tracker in column 2 (j=2) in the same time slot; each tracker in column 2 (j=2) may transmit to its respective adjacent tracker in column 3 (j=3) in a same subsequent time slot, etc. After all the data in each row has been received by a respective end tracker in the row (e.g., in column m), then, in a next time slot, the data may be transferred from the end tracker in row 1 (i=1, j=m) to the end tracker in row 2 (i=2, j=m). In a subsequent time slot, all the data held by the end tracker in row 2 (i=2, j=m) may be transferred to the end tracker in row 3 (i=3, j=m), etc., until finally all of the data in the grid has been transferred to a data collector 226b in row n and column m (i=n, j=m).

Figure 4D:
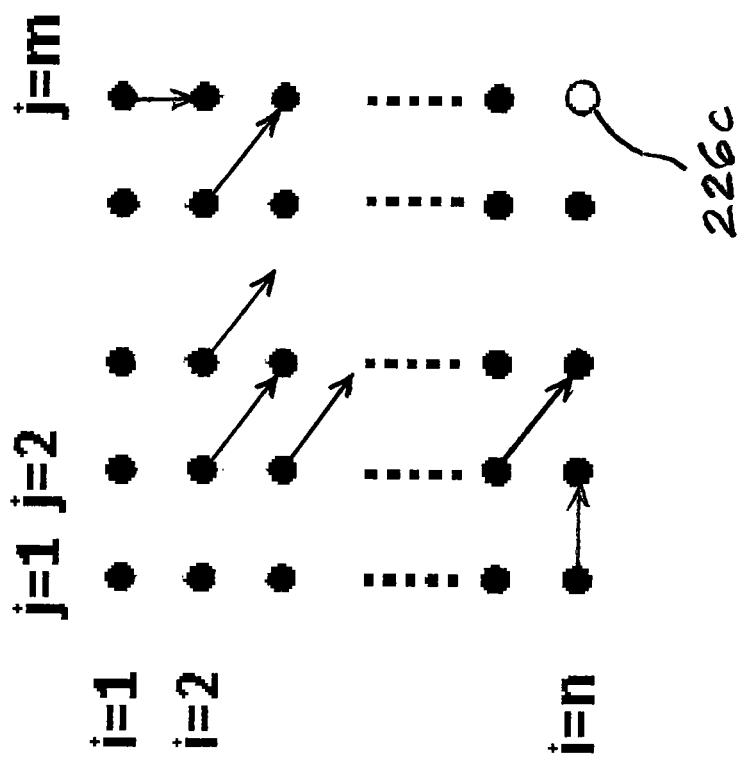
FIG. 4d is a plan view of a second data transfer step of the diagonal sweeping scheme of FIG. 4c.
Figure 4C:
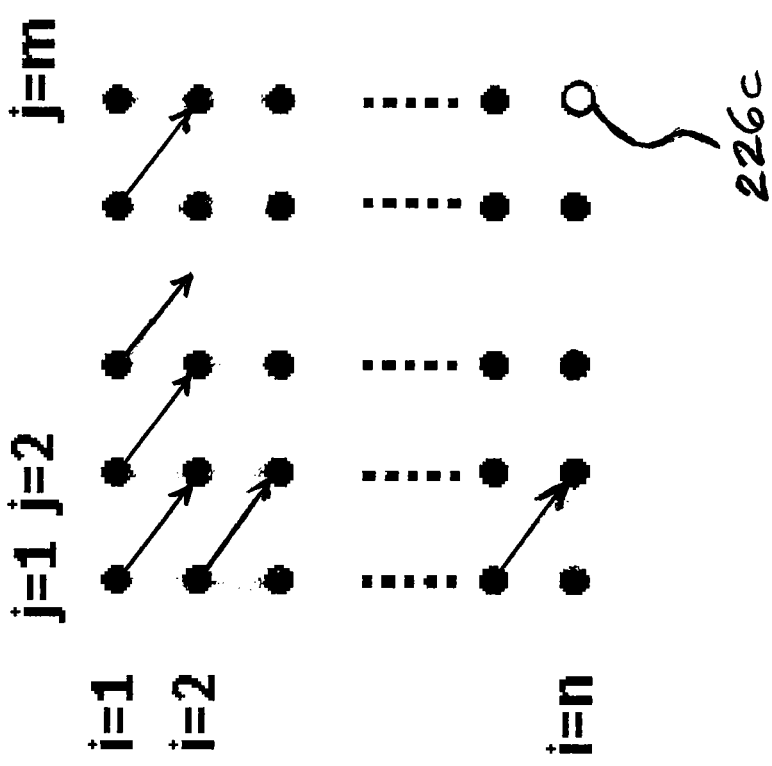
FIG. 4c is a plan view of a first data transfer step of one embodiment of a diagonal sweeping scheme of the invention for trackers arranged in a rectangular grid topology.
Figure 4E:
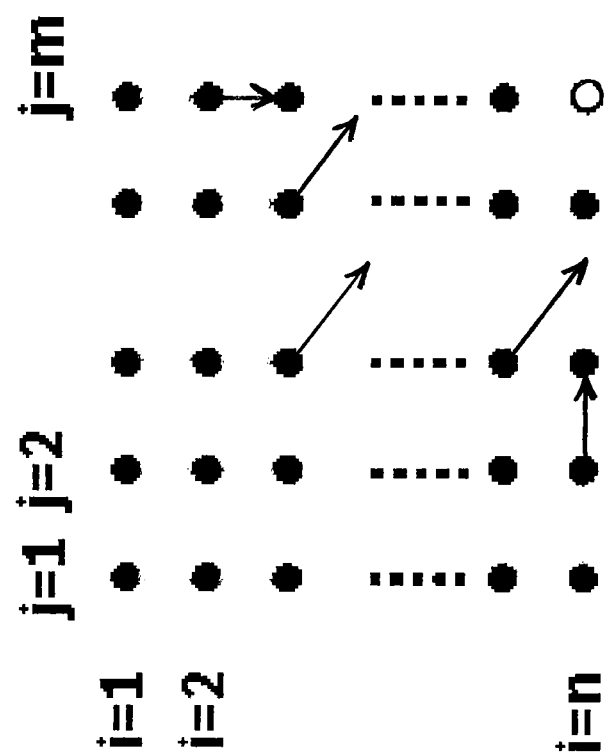
FIG. 4e is a plan view of a third data transfer step of the diagonal sweeping scheme of FIG. 4c.

FIGS. 4c-e illustrate a diagonal sweeping scheme with horizontal and vertical collection. Again, each arrow represents a transfer of data from one tracker to an adjacent tracker. During a first time slot, as illustrated in FIG. 4c, each tracker in an end column 1 (j=1) and/or in an end row 1 (i=1) (except for the tracker at the end of the end column at i=n, j=1 and the tracker at the end of the end row at i=1, j=m) may transmit data to its respective diagonally adjacent tracker.

In a second time slot illustrated in FIG. 4d, each tracker that received data in the first time slot, and that has a diagonally adjacent tracker, transfers all data held by the tracker to the diagonally adjacent tracker. If a tracker received data in the first time slot but does not have a diagonally adjacent tracker, then the tracker may make no transfer in the second time slot. In the case of a tracker in the end column or the end row that does not have a diagonally adjacent tracker (i.e., the tracker at i=n, j=1 and the tracker at i=1, j=m), the tracker transmits data to the horizontally adjacent tracker or the vertically adjacent tracker in the second time slot.

In a third time slot illustrated in FIG. 4e, each tracker that received data in the second time slot, and that has a diagonally adjacent tracker, transfers all data held by the tracker to the diagonally adjacent tracker. If a tracker received data only diagonally but does not have a diagonally adjacent tracker, then the tracker may make no transfer in the third time slot. If a tracker received data horizontally or vertically in the second time slot (i.e., the tracker at i=n, j=2 and the tracker at i=2, j=m), then the tracker transmits data to the horizontally adjacent tracker or the vertically adjacent tracker in the third time slot. This process continues until all of the data has been collected in a data collector 226c, which is the final destination.

One embodiment of the vertical sweeping scheme is illustrated in further detail in FIGS. 5a-f, wherein data flow occurs in every time slot. In slot 1 (FIG. 5a), the trackers in row i=1 each transmit its data to its respective adjacent neighbor in row i=2. In the next slot 2 (FIG. 5b), each tracker in row 2 transmits its own data as well as data collected by the tracker in slot 1 to its respective adjacent neighbor in row 3, and so on. This process continues until slot i=n−1 (FIG. 5c) wherein each of the trackers in the second to last row i=n−1 transmits its own data as well as data collected by the tracker in slot n−2 to its respective adjacent neighbor in row i=n.

In slot n (FIG. 5d), the end tracker in column j=1 (i.e., the tracker at i=n, j=1) transmits its own data as well as data collected by the tracker in slot n−1 to its adjacent neighbor in column j=2 (i.e., the tracker at i=n, j=2). In slot n+1 (FIG. 5e), the end tracker in column j=2 (i.e., the tracker at i=n, j=2) transmits its own data as well as data collected by the tracker in slot n to its adjacent neighbor in column j=3 (i.e., the tracker at i=n, j=3), and so on. This process continues until slot i=n+m−2 (FIG. 5f) wherein the end tracker in the second to last column j=m−1 transmits its own data as well as data collected by the tracker in slot n+m−3 to data collector 326.

In FIGS. 4a-c and 5a-f, it is assumed that there are enough frequency channels available for each tracker to simultaneously transmit in its own designated slot. That is, each tracker node within a slot transmits using a non-overlapping channel. However, this is not practically possible when the number of tracker nodes transmitting in a slot is greater than the number of available non-overlapping frequency channels. In this case, the trackers may still follow the same communication path, but some of the trackers may transmit in different slots. For example, if the number of columns exceeds the number of available frequency channels in a vertical sweeping scheme, then instead of scheduling transmission from a respective tracker in each of the columns simultaneously, then some of the trackers may transmit in a first time slot, and the remainder of the trackers may transmit in one or more subsequent time slots. If there are only two frequency channels available, then transmission by a respective tracker in each of columns 1 and 2 may be scheduled in a first time slot, transmission by a respective tracker in each of columns 3 and 4 may be scheduled in a second or other subsequent time slot, and so on.

Figure 6:
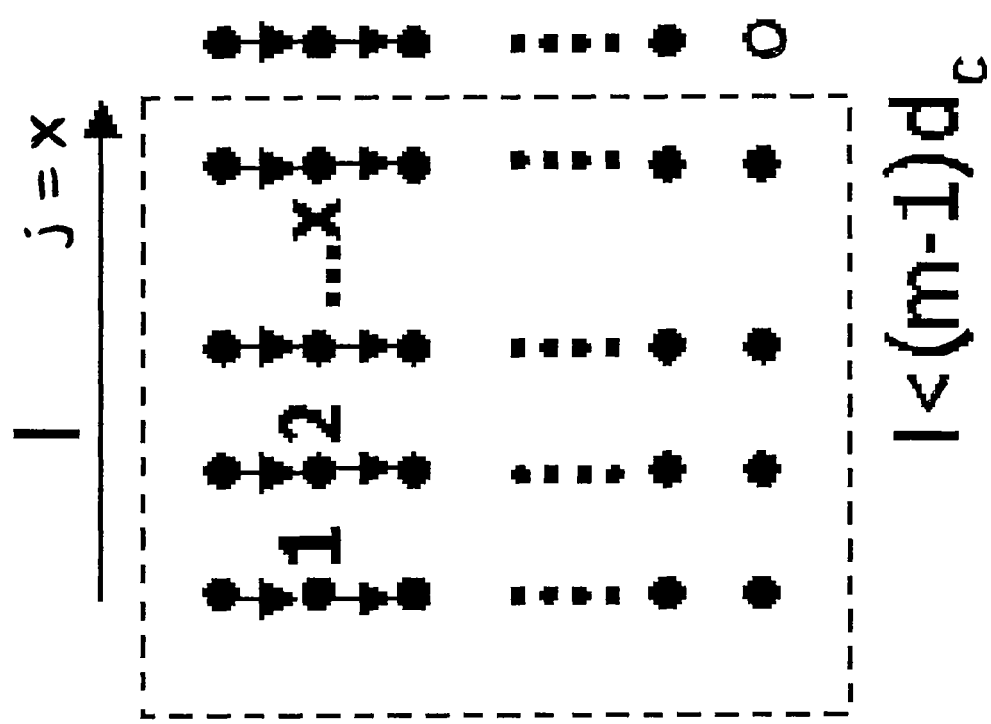
FIG. 6 is a plan view illustrating a matrix of trackers divided into sub-matrices for simultaneous data transfer using the same frequency channels in a vertical sweeping scheme of the invention.

In an optimization method of the invention, a given frequency may be used for transmission by more than one tracker simultaneously (e.g., in a same time slot). In order to maximize the usage of available frequencies, a given matrix of trackers can be divided into several sub-matrixes which can employ sweeping while sharing at least some of the same frequency channels. Given a matrix of rows and columns of trackers, and assuming a vertical sweeping scheme, two scenarios are possible. In a first such scenario, the interference range covers all m tracker nodes in the row. That is, a receiving tracker node in an end column is capable of receiving an interfering transmission from a tracker node in an opposite end column. In a second such scenario, the interference range covers x neighbor nodes given by $\lfloor I/d_c \rfloor$, wherein I is the interference (channel re-use) distance, $d_c$ is the distance of separation between two adjacent columns, and m is the number of tracker nodes in each row. That is, as illustrated in FIG. 6, a receiving tracker node in an end column (e.g., j=1) is capable of receiving an interfering transmission from a tracker node in column j=x, but is not capable of receiving an interfering transmission from a tracker node in a column that is one column farther (column j=x+1). Thus, $I=(x-1)d_c<(m-1)d_c$.

Combining the above two scenarios, the maximum number of nodes in a single row covered by an interference range may be given by:

$$x = \min\left(\left\lfloor \frac{I}{d_c} \right\rfloor, m-1\right)$$

In other words, every $(x+1)^{th}$ column can be scheduled to transmit simultaneously using the same frequency. Thus, in the example of FIG. 6, a tracker node in column j=1 and a tracker node in any column numbered j=x+1 or greater may be scheduled to transmit simultaneously using the same frequency. Similarly, a tracker node in column j=2 and a tracker node in any column numbered j=x+2 or greater may be scheduled to transmit simultaneously using the same frequency, and so on. Therefore, the problem may be reduced to scheduling only x+1 number of columns, wherein (x+1)≤m.

If the number of available non-overlapping frequency channels is greater than x, then the problem may be solved as described above (e.g., only tracker nodes separated by a distance greater than the interference distance I may use the same frequency channel simultaneously). However, if the number of available non-overlapping frequency channels is not greater than x, then, within a given sub-matrix, a tracker transmitter node is scheduled to transmit on a given channel only when its intended receiver node is out of interference range of every other transmitter node that is transmitting on the same channel. For a simpler and optimal implementation, data collection may be started on column number f+1, (wherein f is the number of available non-overlapping channels) only when the transmission in this column does not interfere with the ongoing communication in any other column.

In the example illustrated in FIGS. 7a-h, the number of available non-overlapping channels f is assumed to be equal to (x−1). In a first transmission time slot, depicted in FIG. 7a, x−1 tracker nodes in the first row each transmit in a respective frequency channel. That is, the nodes in positions (1, 1) through (1, x−1) each transmit in a respective frequency channel. Although the node at (1, x) does not transmit during the first time slot, the node at (1, x+1) transmits in the first time slot in the same frequency channel as the node at (1, 1).

Figure 7B:
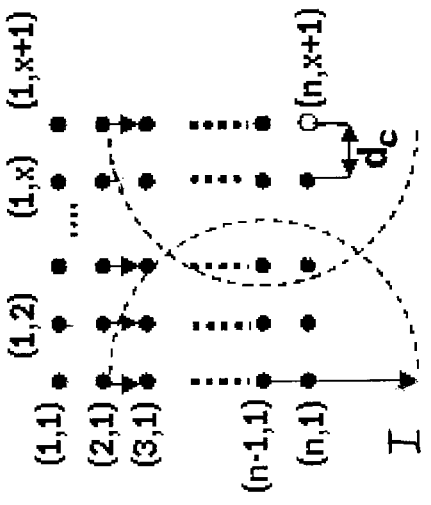

In a second transmission time slot, depicted in FIG. 7b, n−1 tracker nodes in the second row each transmit in the same respective frequency channels as in the first time slot. That is, the nodes in positions (2, 1) through (2, x−1) each transmit in a respective frequency channel. Although neither the node at (1, x) nor the node at (2, x) transmits during the second time slot, the node at (2, x+1) transmits in the second time slot in the same frequency channel as the node at (2, 1).

Figure 7D:
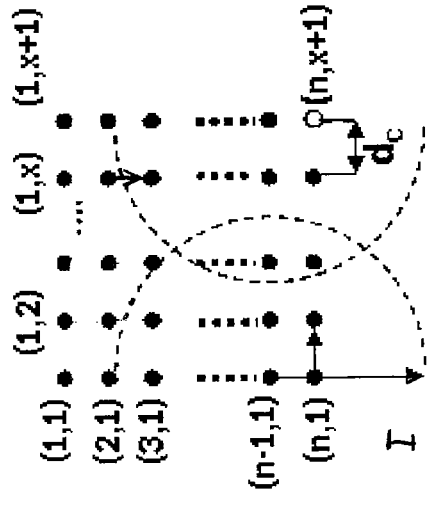
Figure 7A:
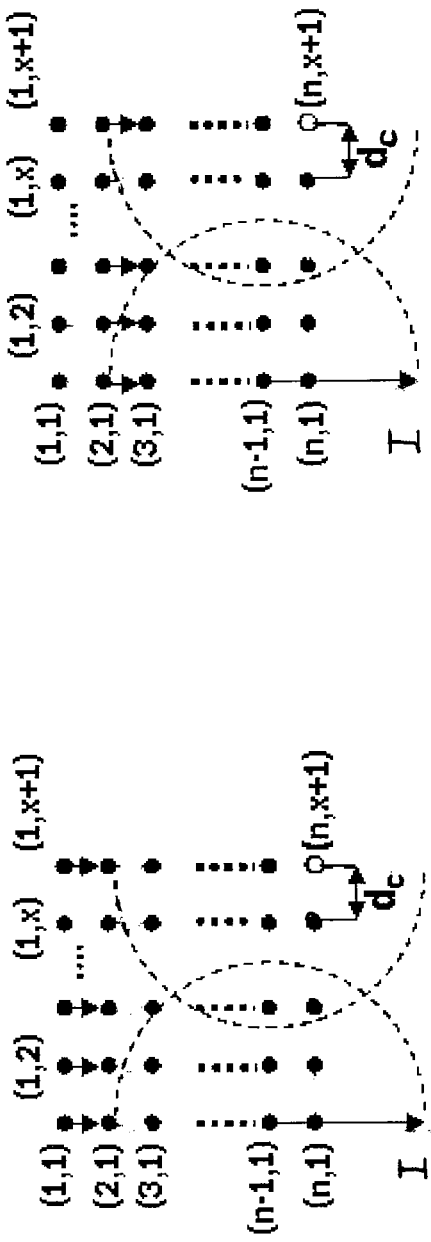
FIG. 7a is a plan view of data transfer in a first time slot in a method of simultaneous data transfer using the same frequency channels in a vertical sweeping scheme of the invention.
Figure 7C:
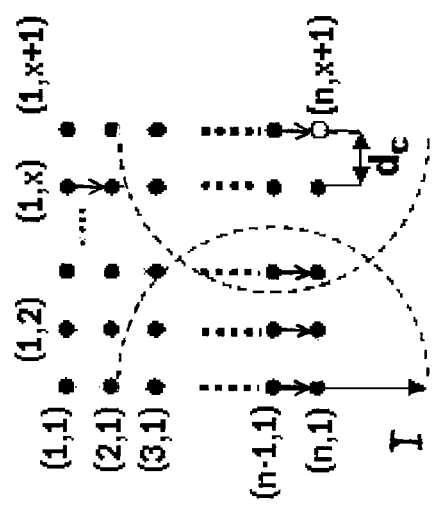

In an (n−1)th transmission time slot, depicted in FIG. 7c, x−1 tracker nodes in the (n−1)th row each transmit in the same respective frequency channel as in the first and second time slots. That is, the nodes in positions (n−1, 1) through (n−1, x−1) each transmit in a respective frequency channel. The node at (n−1, x+1) transmits in the (n−1)th time slot in the same frequency channel as the node at (n−1, 1). As can be seen in FIG. 7c, the node at (2, x) is outside the interference distance I from the closest transmitting node at (n−1, x+1), and thus the node at (1, x) may transmit to the node at (2, x) during the (n−1)th transmission time slot without experiencing interference. In one embodiment, the (1, x) node transmits in the same frequency channel as the node at (n−1, 1) and the node at (n−1, x+1).

In an nth transmission time slot, depicted in FIG. 7d, the horizontal sweeping along the bottom row of the matrix begins. Specifically, the tracker node at (n, 1) transmits its data, along with all other data collected from the other nodes in column 1, to the horizontally adjacent node (n, 2). Also, in the nth transmission time slot, the tracker node at (2, x) transmits its data, along with all other data collected from node (1, x), to the vertically adjacent node (3, x).

Figure 7F:
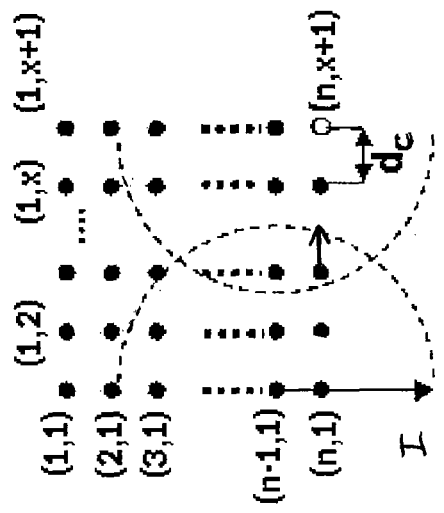
Figure 7E:
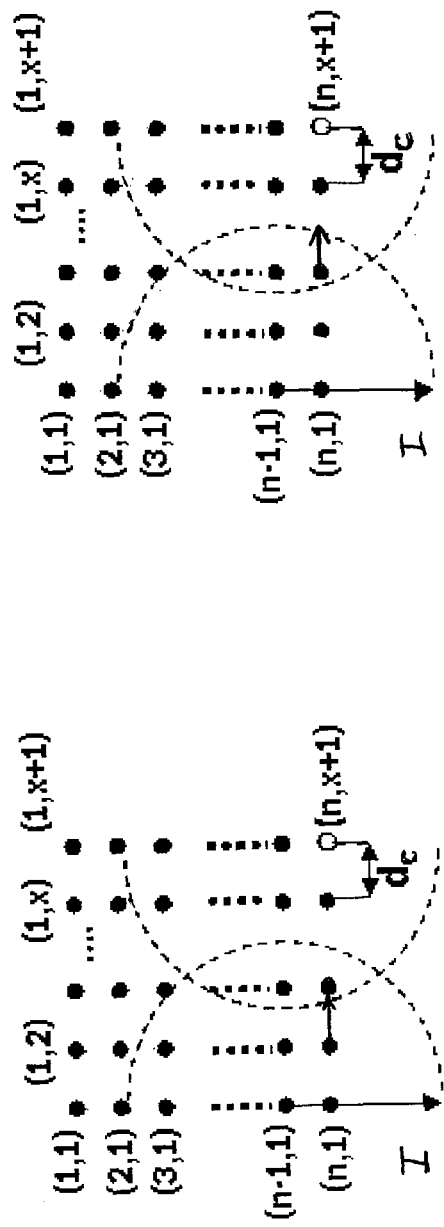

In an (n+1)th transmission time slot, depicted in FIG. 7e, the horizontal sweeping along the bottom row of the matrix continues. Specifically, the tracker node at (n, 2) transmits its data, along with all other data collected from the other nodes in column 2 and the node at (n, 1), to the horizontally adjacent node (n, 3).

In an (n+2)th transmission time slot, depicted in FIG. 7f, the horizontal sweeping along the bottom row of the matrix continues. Specifically, the tracker node at (n, 3) transmits its data, along with all other data collected from the other nodes in column 3 and the node at (n, 2), to the horizontally adjacent node (n, 4).

Figure 7H:
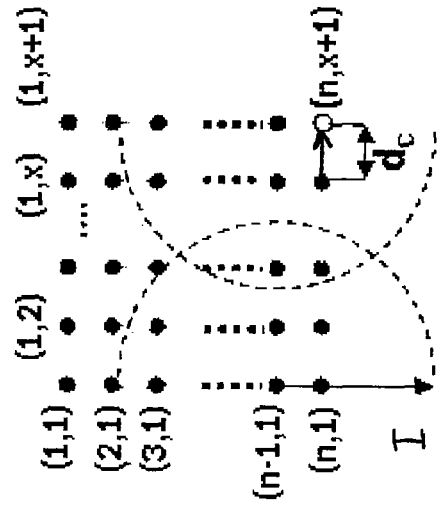
Figure 7G:
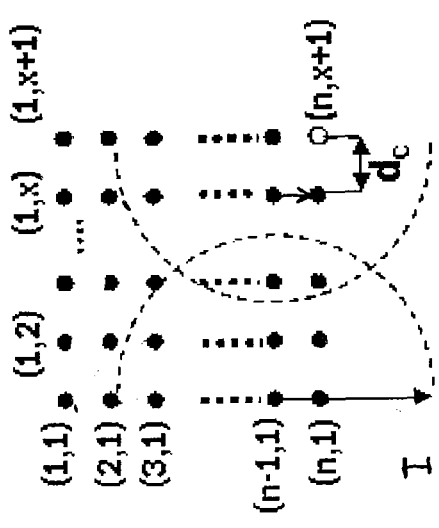

In a time slot subsequent to the (n+2)th time slot, depicted in FIG. 7g, the vertical sweeping is completed. Specifically, the tracker node at (n−1, x) transmits its data, along with all other data collected from the other nodes in column x, to the vertically adjacent node (n, x).

In a final time slot, depicted in FIG. 7h, the horizontal sweeping along the bottom row of the matrix is completed. Specifically, the tracker node at (n, x) transmits its data, along with all other data collected from the other nodes in columns 1 through x, to the data collector at position (n, x+1).

As described above, the node with index (1, x+1) can transmit at the same time that nodes with indices (1, 1), (1, 2) and (1, 3) are transmitting, even though node (1, x+1) transmits on the same frequency channel as node (1, 1) because node (1, x+1) is beyond the interference distance of node (1, 1). The node with index (1, x) can transmit at the same time that nodes with indices (n−1, 1), (n−1, 2), (n−1, 3) and (n−1, x+1) are transmitting, even though node (1, x) transmits on the same frequency channel as nodes (n−1, 1) and (n−1, x+1) because node (1, x) is beyond the interference distance of nodes (n−1, 1) and (n−1, x+1). In other words, data collection in column x begins when transmission by nodes in other columns on the same frequency channel are beyond the interference distance.

In an optimization method of the invention described with reference to FIGS. 8a-f, communication and/or collection of data occurs on a single path. In this embodiment, each node transmits to its $r^{th}$ neighbor instead of its next or adjacent neighbor. In the specific example embodiment of FIGS. 8a-f, each node transmits to its third neighbor (i.e., the node in a position three positions farther downstream than the transmitting node), if such a third neighbor exists. If such a third neighbor does not exist, then the transmitting node may be adjacent to, or the second neighbor of, the data collector, in which case the transmitting node transmits directly to the data collector.

In general, each node transmits to its $r^{th}$ neighbor, wherein $r \leq [R/d]$, and wherein R is the wireless communication range of the tracker and d is the distance of separation between neighboring trackers. An advantage of this embodiment is that, if a next neighbor node is dead, then the message still reaches the final destination (e.g., the data collector). Another advantage of this embodiment is that there may be fewer hops to the final destination. Yet another advantage of this embodiment is that there may be a reduced overall packet size. For example, if f number of frequency channels are used then the final packet size may be reduced by a factor of f. Still another advantage of this embodiment is that, if multiple frequencies available, then collection can be parallelized (e.g., can be performed in parallel).

FIG. 8a illustrates a specific embodiment of data transfer along a single path with only one non-overlapping frequency channel (f=1) available and eight trackers (n=8) in the path. With only one non-overlapping frequency channel available, each of the seven transmissions (which are each indicated by a respective arrow) occurs in a separate time slot. The only constraints in the order of transmission may be that transmission 802 from the third node down to the sixth node down occurs before transmission 804 from the sixth node down to the final destination. Thus, transmission 804 may include the contents of transmission 802. Similarly, transmission 806 from the first node to the fourth node down occurs before transmission 808 from the fourth node down to the seventh node down, and transmission 808 from the fourth node down to the seventh node down occurs before transmission 810 from the seventh node down to the final destination. Thus, transmission 808 may include the contents of transmission 806, and transmission 810 may include the contents of transmission 808. Further, transmission 812 from the second node to the fifth node down occurs before transmission 814 from the fifth node down to the eighth node down. Thus, transmission 814 may include the contents of transmission 812.

FIG. 8b illustrates another specific embodiment of data transfer along a single path with only one non-overlapping frequency channel (f=1) available and nine trackers (n=9) in the path. With only one non-overlapping frequency channel available, each of the eight transmissions (which are each indicated by a respective arrow) occurs in a separate time slot. The only constraints in the order of transmission may be that transmission 816 from the first node to the fourth node down occurs before transmission 818 from the fourth node down to the seventh node down, and transmission 818 from the fourth node down to the seventh node down occurs before transmission 820 from the seventh node down to the final destination. Thus, transmission 818 may include the contents of transmission 816, and transmission 820 may include the contents of transmission 818. Similarly, transmission 822 from the second node to the fifth node down occurs before transmission 824 from the fifth node down to the eighth node down, and transmission 824 from the fifth node down to the eighth node down occurs before transmission 826 from the eighth node down to the final destination. Thus, transmission 824 may include the contents of transmission 822, and transmission 826 may include the contents of transmission 824. Further, transmission 828 from the third node to the sixth node down occurs before transmission 830 from the sixth node down to the final destination. Thus, transmission 830 may include the contents of transmission 828.

Figures 8C, 8D:
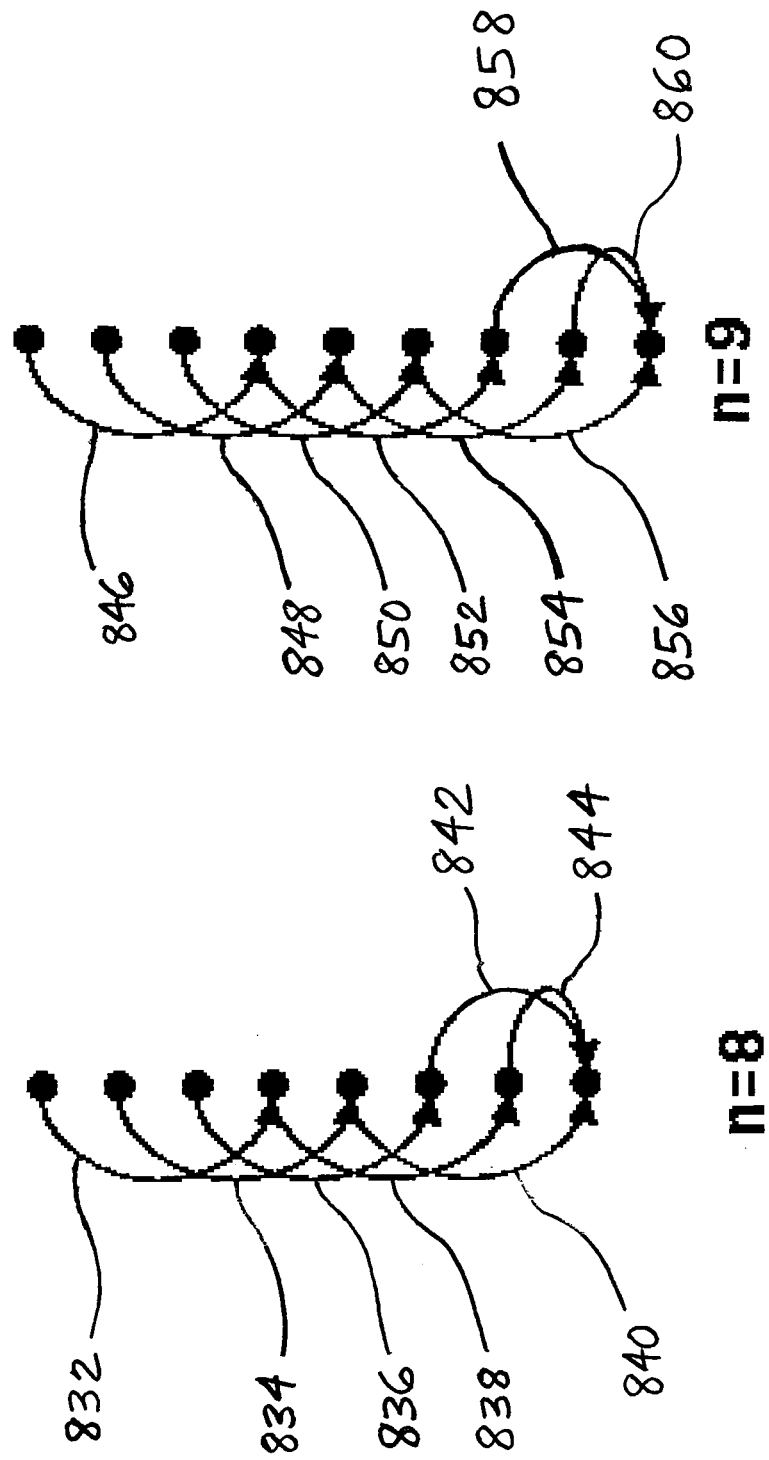
FIG. 8c is a plan view of data transfer in a method of data transfer along a single path with two non-overlapping frequency channels available and eight trackers in the path according to one embodiment of the invention.
FIG. 8d is a plan view of data transfer in a method of data transfer along a single path with two non-overlapping frequency channels available and nine trackers in the path according to one embodiment of the invention.

FIG. 8c illustrates yet another specific embodiment of data transfer along a single path with two non-overlapping frequency channels (f=2) available and eight trackers (n=8) in the path. Transmission 832 from the first node to the fourth node occurs during the same time slot as transmission 834 from the second node to the fifth node. After transmissions 832, 834, transmission 836 from the third node to the sixth node occurs during the same time slot as transmission 838 from the fourth node to the seventh node. Subsequent to transmissions 836, 838, transmission 840, 842 and 844 to the final destination from the fifth, sixth and seventh nodes, respectively, may occur in any order in time. Thus, transmission 844 may include the contents of transmission 838, which may include the contents of transmission 832; transmission 842 may include the contents of transmission 836; and transmission 840 may include the contents of transmission 834.

FIG. 8d illustrates still another specific embodiment of data transfer along a single path with two non-overlapping frequency channels (f=2) available and nine trackers (n=9) in the path. Transmission 846 from the first node to the fourth node occurs during the same time slot as transmission 848 from the second node to the fifth node. After transmissions 846, 848, transmission 850 from the third node to the sixth node occurs during the same time slot as transmission 852 from the fourth node to the seventh node. After transmissions 850, 852, transmission 854 from the fifth node to the eighth node occurs during the same time slot as transmission 856 from the sixth node to the final destination. Subsequent to transmissions 850, 852, transmission 858 from the seventh node down to the final destination may occur; and subsequent to transmissions 854, 856, transmission 860 from the eighth node down to the final destination may occur. Thus, transmission 860 may include the contents of transmission 854, which may include the contents of transmission 848; transmission 858 may include the contents of transmission 852, which may include the contents of transmission 846; and transmission 856 may include the contents of transmission 850.

Figure 8F:
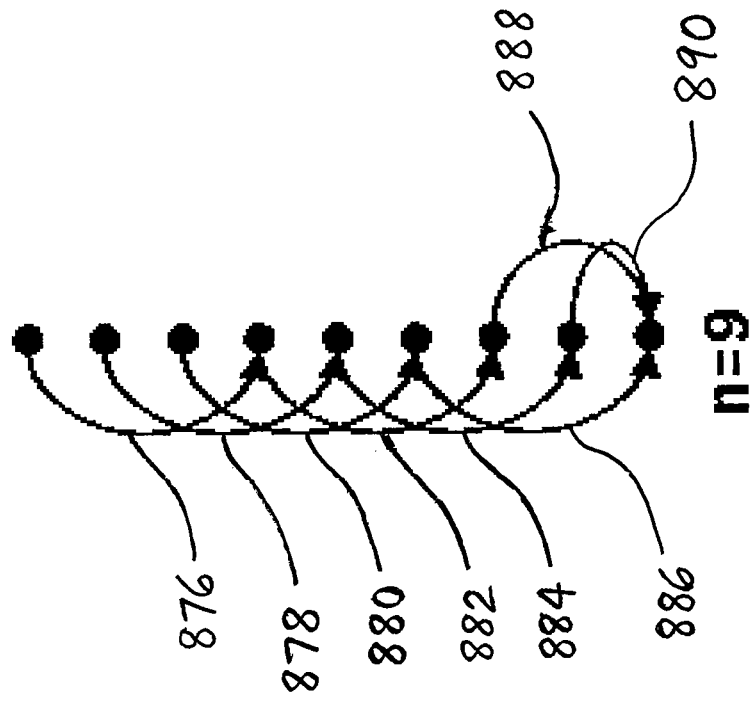
FIG. 8f is a plan view of data transfer in a method of data transfer along a single path with three non-overlapping frequency channels available and nine trackers in the path according to one embodiment of the invention.
Figure 8E:
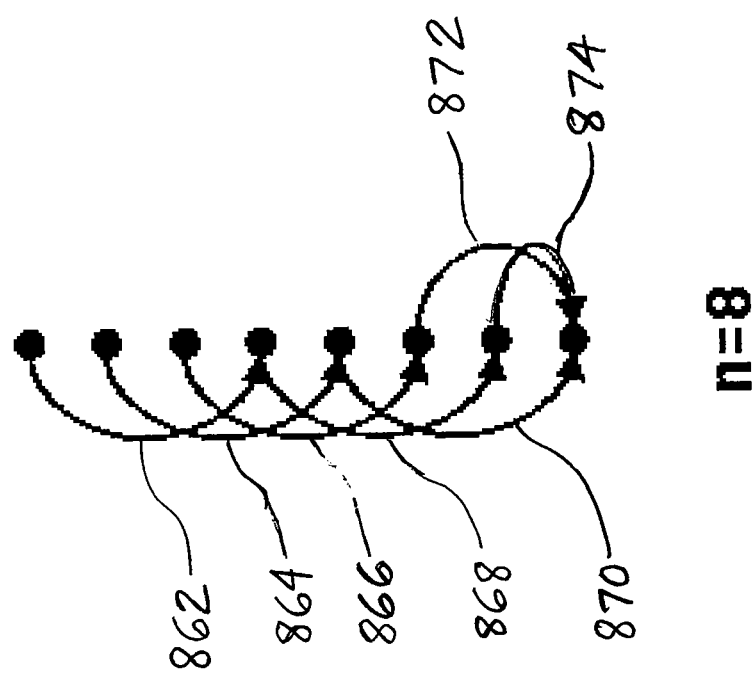
FIG. 8e is a plan view of data transfer in a method of data transfer along a single path with three non-overlapping frequency channels available and eight trackers in the path according to one embodiment of the invention.

FIG. 8e illustrates a further specific embodiment of data transfer along a single path with three non-overlapping frequency channels (f=3) available and eight trackers (n=8) in the path. Transmission 862 from the first node to the fourth node occurs during the same time slot as transmission 864 from the second node to the fifth node and transmission 866 from the third node to the sixth node. After transmissions 862, 864, 866, transmission 868 from the fourth node to the seventh node occurs during the same time slot as transmission 870 from the fifth node to the final destination. Subsequent to transmissions 862, 864, 866, transmission 872 from the sixth node down to the final destination may occur. Subsequent to transmissions 868, 870, transmission 874 from the seventh node down to the final destination may occur. Thus, transmission 874 may include the contents of transmission 868, which may include the contents of transmission 862; transmission 872 may include the contents of transmission 866; and transmission 870 may include the contents of transmission 864.

FIG. 8f illustrates another specific embodiment of data transfer along a single path with three non-overlapping frequency channels (f=3) available and nine trackers (n=9) in the path. Transmission 876 from the first node to the fourth node occurs during the same time slot as transmission 878 from the second node to the fifth node and transmission 880 from the third node to the sixth node. After transmissions 876, 878, 880, transmission 882 from the fourth node to the seventh node occurs during the same time slot as transmission 884 from the fifth node to the eighth node and transmission 886 from the sixth node to the final destination. After transmissions 882, 884, 886, transmission 888 from the seventh node to the final destination and transmission 890 from the eighth node to the final destination occur in no particular order in separate time slots. Thus, transmission 890 may include the contents of transmission 884, which may include the contents of transmission 878; transmission 888 may include the contents of transmission 882, which may include the contents of transmission 876; and transmission 886 may include the contents of transmission 880.

In another embodiment, the invention provides data collection in the form of sweeping schemes for circular grid topology. These schemes may involve the use of a circular geometry for achieving robust data collection. Two example embodiments are illustrated in FIGS. 9a-k and FIGS. 10a-g, respectively. In the embodiment of FIGS. 9a-k, data flows on concentric circle segments between trackers 924 until reaching the ends of the segments, and then the data flows radially toward the center, i.e., toward central DCS 922. In the embodiment of FIGS. 10a-g, in contrast, data flows only radially towards the center. Again by using multiple frequencies, data flow in different sectors/circles may be scheduled simultaneously. Further, the whole topology can be divided into multiple sectors, and different sweeping schemes can be employed in the different sectors. Further still, different groups of frequency channels can be used for different sectors. However, the same group of frequency channels can be used in two sectors when the two sectors are outside of the interference range from each other.

In the example embodiment illustrated in FIGS. 9a-k, the circular topology is divided into six pie-shaped sectors 902a-f. With regard to only one sector 902a, the number of available non-overlapping channels f is assumed to be at least six. That is, in a first transmission time slot, depicted in FIG. 9a, the six tracker nodes arranged along a radial wall 904a of sector 902a each transmit in a respective frequency channel. Each of the six tracker nodes transmits to a respective one of six concentrically-adjacent nodes. Thus, in the first transmission time slot depicted in FIG. 9a, concentric sweeping across sector 902a begins.

The six non-overlapping channels used in sector 902a may also be used in sector 902d, assuming that sectors 902a and 902d are outside of each other's interference range. In order to maximize the distance between nodes transmitting with a same frequency, a radially outermost tracker 906a of sector 902a may transmit at the same frequency as a radially innermost tracker 906b of sector 902d. Further, a radially second outermost tracker 906c of sector 902a may transmit at the same frequency as a radially second innermost tracker 906d of sector 902d, and so on down the line such that a radially innermost tracker 906e of sector 902a may transmit at the same frequency as a radially outermost tracker 906f of sector 902d.

Maximizing the distance between sectors using the same frequency channels, opposing sectors 902b and 902e may transmit using the same set of frequency channels. Lastly, opposing sectors 902c and 902f may also transmit using the same set of frequency channels.

In a second transmission time slot, depicted in FIG. 9b, the concentric sweeping across sector 902a continues. Specifically, the five tracker nodes that received transmissions in the first transmission time slot but that are not adjacent to radial wall 904b each transmit in a respective frequency channel. Each of the five tracker nodes transmits its data, along with all other data collected from the other nodes in the first transmission time slot, to a respective one of five concentrically-adjacent nodes.

Figure 9D:
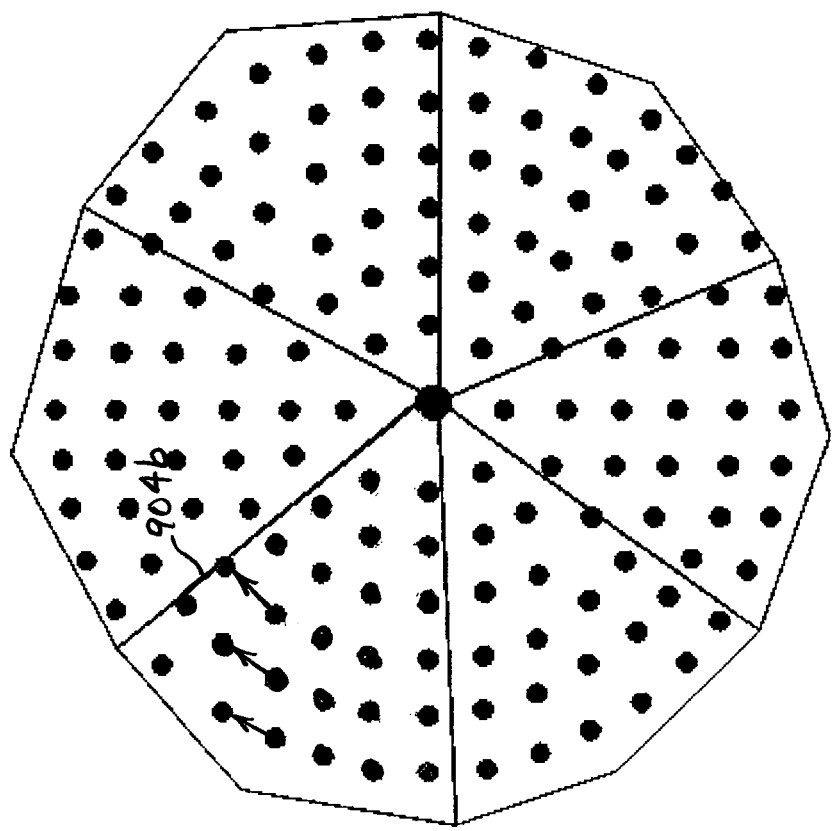
FIG. 9d is a plan view of data transfer in a fourth time slot in a method of concentric and radial data transfer using a circular grid topology.
Figure 9C:
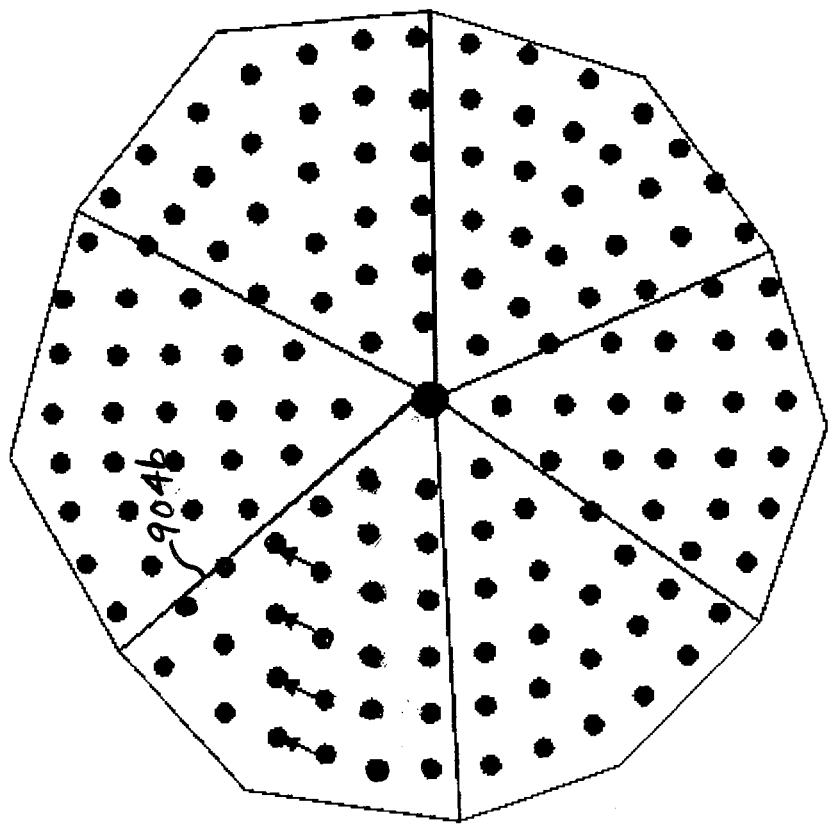
FIG. 9c is a plan view of data transfer in a third time slot in a method of concentric and radial data transfer using a circular grid topology.

In a third transmission time slot, depicted in FIG. 9c, the concentric sweeping across sector 902a continues. Specifically, the four tracker nodes that received transmissions in the second transmission time slot but that are not adjacent to radial wall 904b each transmit in a respective frequency channel. Each of the four tracker nodes transmits its data, along with all other data collected from the other nodes in the second transmission time slot, to a respective one of four concentrically-adjacent nodes.

In a fourth transmission time slot, depicted in FIG. 9d, the concentric sweeping across sector 902a continues. Specifically, the three tracker nodes that received transmissions in the third transmission time slot but that are not adjacent to radial wall 904b each transmit in a respective frequency channel. Each of the three tracker nodes transmits its data, along with all other data collected from the other nodes in the third transmission time slot, to a respective one of three concentrically-adjacent nodes.

Figure 9F:
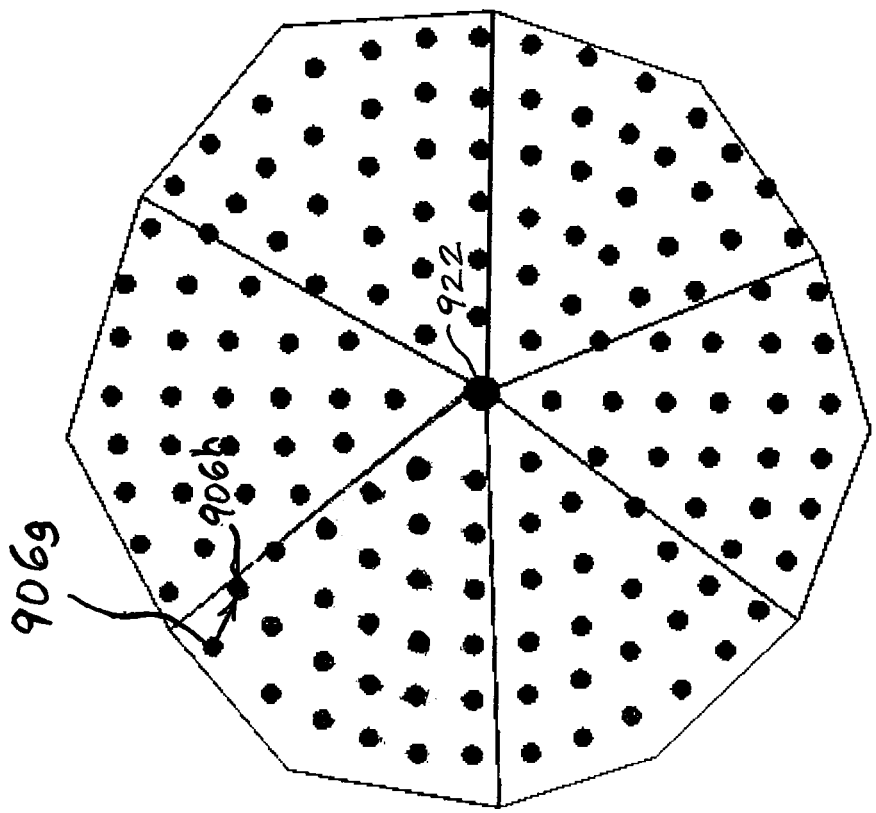
FIG. 9f is a plan view of data transfer in a sixth time slot in a method of concentric and radial data transfer using a circular grid topology.
Figure 9E:
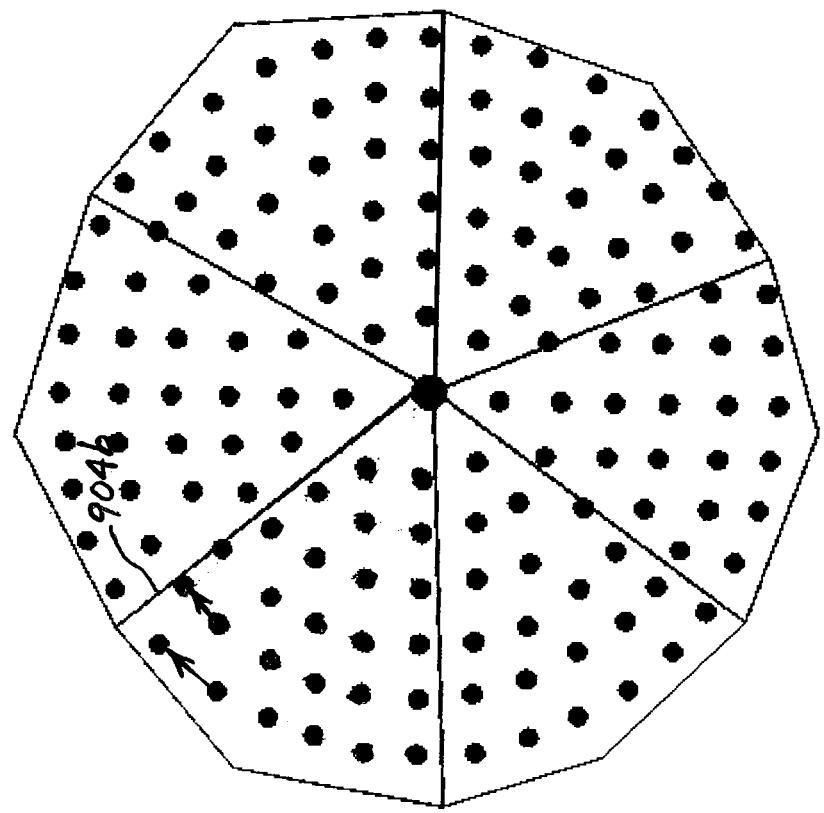
FIG. 9e is a plan view of data transfer in a fifth time slot in a method of concentric and radial data transfer using a circular grid topology.

In a fifth transmission time slot, depicted in FIG. 9e, the concentric sweeping across sector 902a is completed. Specifically, the two tracker nodes that received transmissions in the fourth transmission time slot but that are not adjacent to radial wall 904b each transmit in a respective frequency channel. Each of the two tracker nodes transmits its data, along with all other data collected from the other nodes in the fourth transmission time slot, to a respective one of two concentrically-adjacent nodes.

In a sixth transmission time slot, depicted in FIG. 9f, the radial sweeping toward central DCS 922 begins. Specifically, the radially outermost tracker node 906g transmits its data, along with all other data collected from the other nodes in the fifth transmission time slot, to a radially-adjacent tracker node 906h.

Figure 9H:
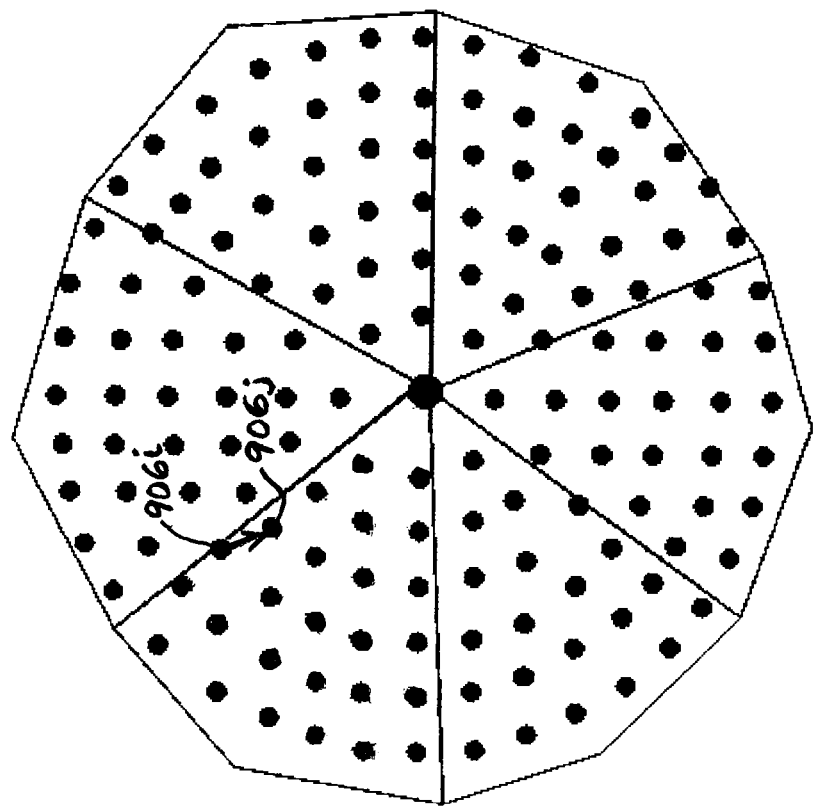
FIG. 9h is a plan view of data transfer in an eighth time slot in a method of concentric and radial data transfer using a circular grid topology.
Figure 9G:
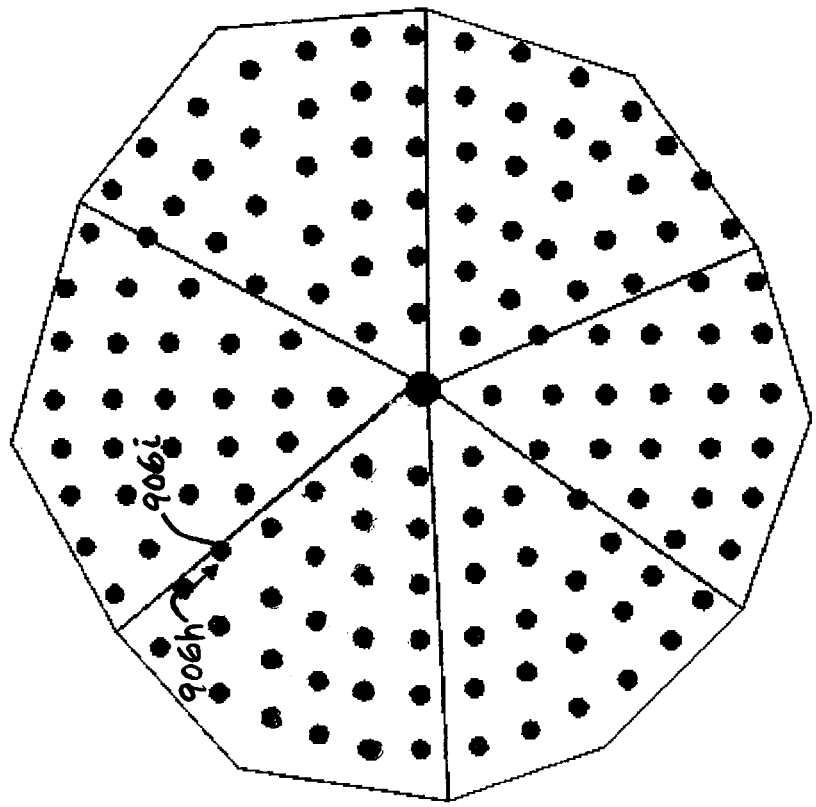
FIG. 9g is a plan view of data transfer in a seventh time slot in a method of concentric and radial data transfer using a circular grid topology.

In a seventh transmission time slot, depicted in FIG. 9g, the radial sweeping toward central DCS 922 continues. Specifically, tracker node 906h transmits its data, along with all other data collected from the other nodes in the sixth transmission time slot, to a radially-adjacent tracker node 906i.

In an eighth transmission time slot, depicted in FIG. 9h, the radial sweeping toward central DCS 922 continues. Specifically, tracker node 906i transmits its data, along with all other data collected from the other nodes in the seventh transmission time slot, to a radially-adjacent tracker node 906j.

Figure 9J:
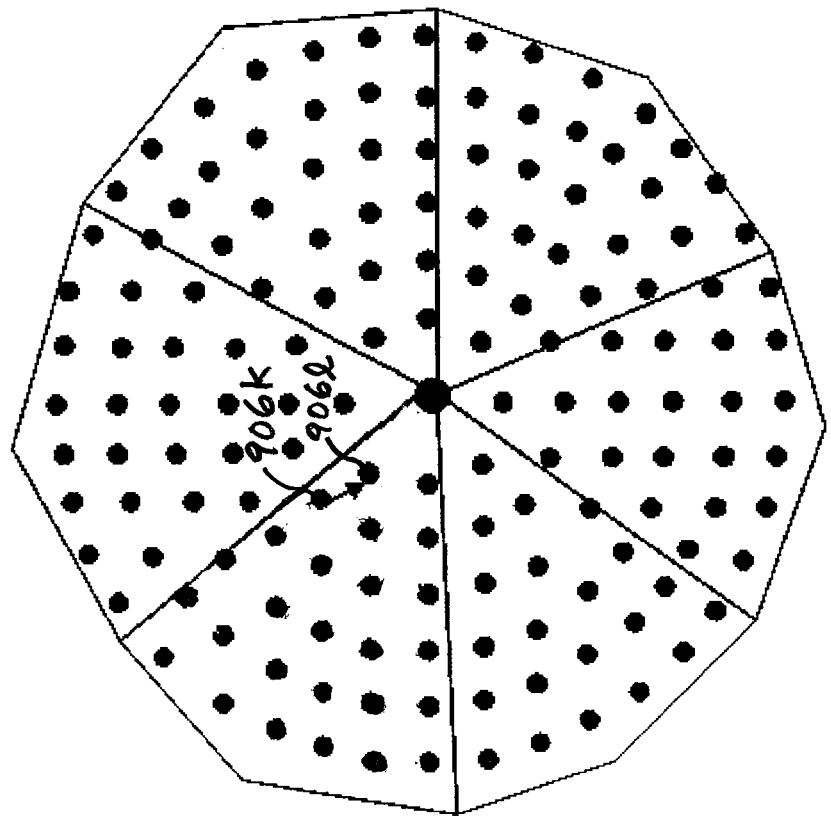
FIG. 9j is a plan view of data transfer in a tenth time slot in a method of concentric and radial data transfer using a circular grid topology.
Figure 9I:
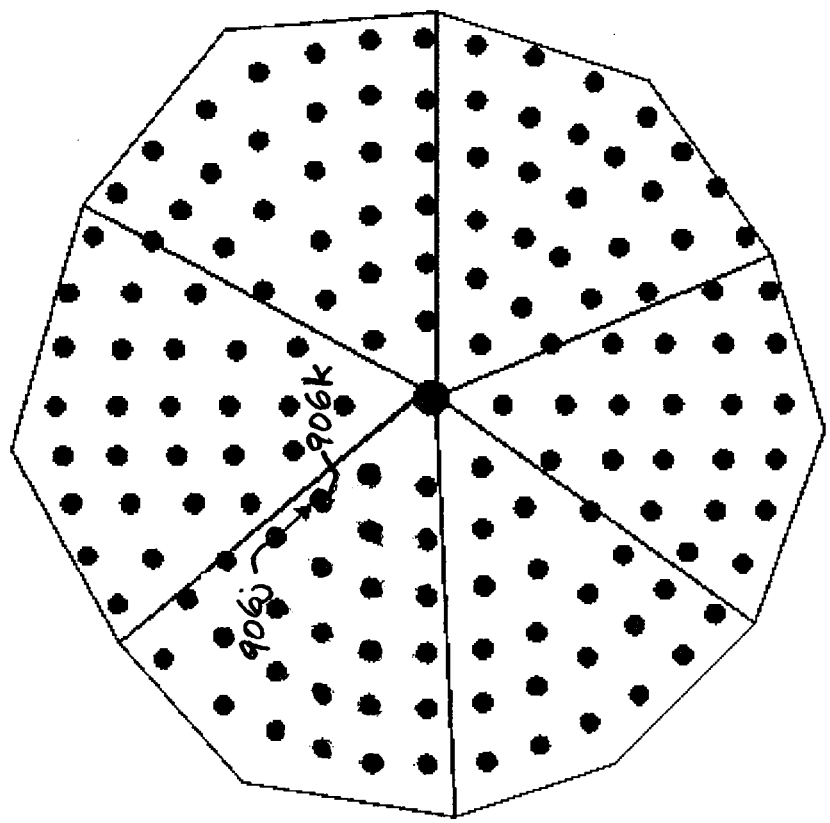
FIG. 9i is a plan view of data transfer in a ninth time slot in a method of concentric and radial data transfer using a circular grid topology.

In a ninth transmission time slot, depicted in FIG. 9i, the radial sweeping toward central DCS 922 continues. Specifically, tracker node 906j transmits its data, along with all other data collected from the other nodes in the eighth transmission time slot, to a radially-adjacent tracker node 906k.

In a tenth transmission time slot, depicted in FIG. 9j, the radial sweeping toward central DCS 922 continues. Specifically, tracker node 906k transmits its data, along with all other data collected from the other nodes in the ninth transmission time slot, to a radially-adjacent tracker node 906l.

Figure 9K:
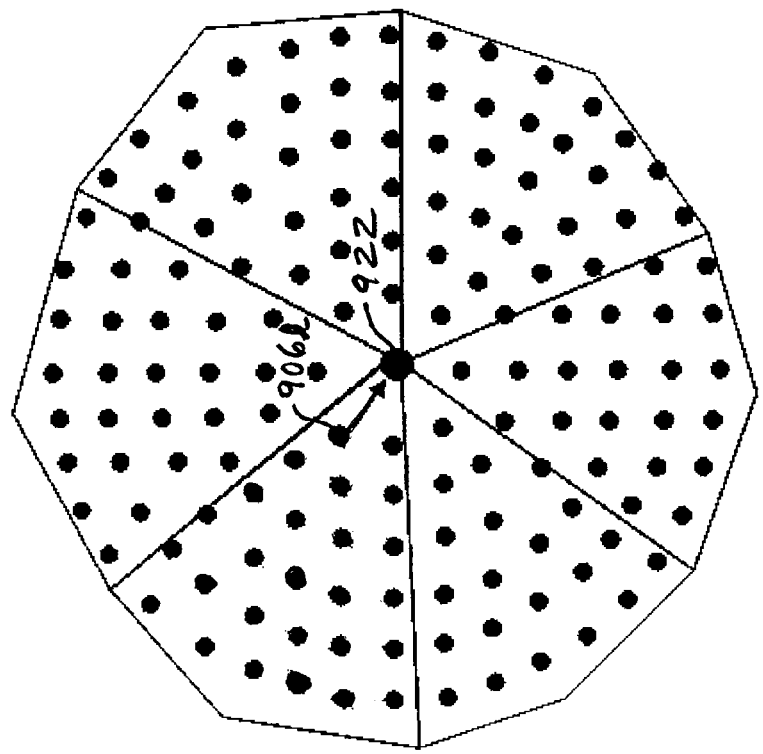
FIG. 9k is a plan view of data transfer in an eleventh time slot in a method of concentric and radial data transfer using a circular grid topology.

In a final time slot, depicted in FIG. 9k, the radial sweeping toward central DCS 922 is completed. Specifically, tracker node 906l transmits its data, along with all other data collected from the other nodes in the tenth transmission time slot, to central DCS 922.

In the example embodiment illustrated in FIGS. 10a-g, the circular topology is divided into six pie-shaped sectors 1002a-f. With regard to only one sector 1002a, the number of available non-overlapping channels f is assumed to be at least six. That is, in a first transmission time slot, depicted in FIG. 10a, the six radially outermost tracker nodes each transmit in a respective frequency channel. Each of the six tracker nodes transmits to a respective one of six radially-adjacent nodes. Thus, in the first transmission time slot depicted in FIG. 10a, radial sweeping towards central DCS 1022 begins.

The six non-overlapping channels used in sector 1002a may also be used in sector 1002b, assuming that sectors 1002a and 1002b are outside of each other's interference range. In order to maximize the distance between nodes transmitting with a same frequency, a counterclockwisemost tracker 1006a of sector 1002a may transmit at the same frequency as a counterclockwisemost tracker 1006b of sector 1002b. Further, a second counterclockwisemost tracker 1006c of sector 1002a may transmit at the same frequency as a second counterclockwisemost tracker 1006d of sector 1002b, and so on down the line such that a clockwisemost tracker 1006e of sector 1002a may transmit at the same frequency as a clockwisemost tracker 1006f of sector 1002b.

The frequency channel scheme of sectors 1002a-b may be replicated in sectors 1002c-f, assuming that the radially outermost width of each of the sectors is large enough to avoid interference between trackers transmitting on same frequency channels. As the transmissions converge towards central DCS 1022, however, the distances between simultaneously transmitting trackers may become small enough that interference is possible. At that point, trackers transmitting from corresponding positions within the sectors may transmit with different frequencies. Alternatively, the trackers may take turns transmitting such that they do not transmit at the same time on the same frequency.

In another embodiment, however, the relative frequency schemes of sectors 1002a-f is similar to that described above for sectors 902a-f. That is, the six non-overlapping channels used in sector 1002a may also be used in opposing sector 1002d, assuming that sectors 1002a and 1002d are outside of each other's interference range. Maximizing the distance between sectors using the same frequency channels, opposing sectors 1002b and 1002e may transmit using the same set of frequency channels. Lastly, opposing sectors 1002c and 1002f may also transmit using the same set of frequency channels.

Figure 10A:
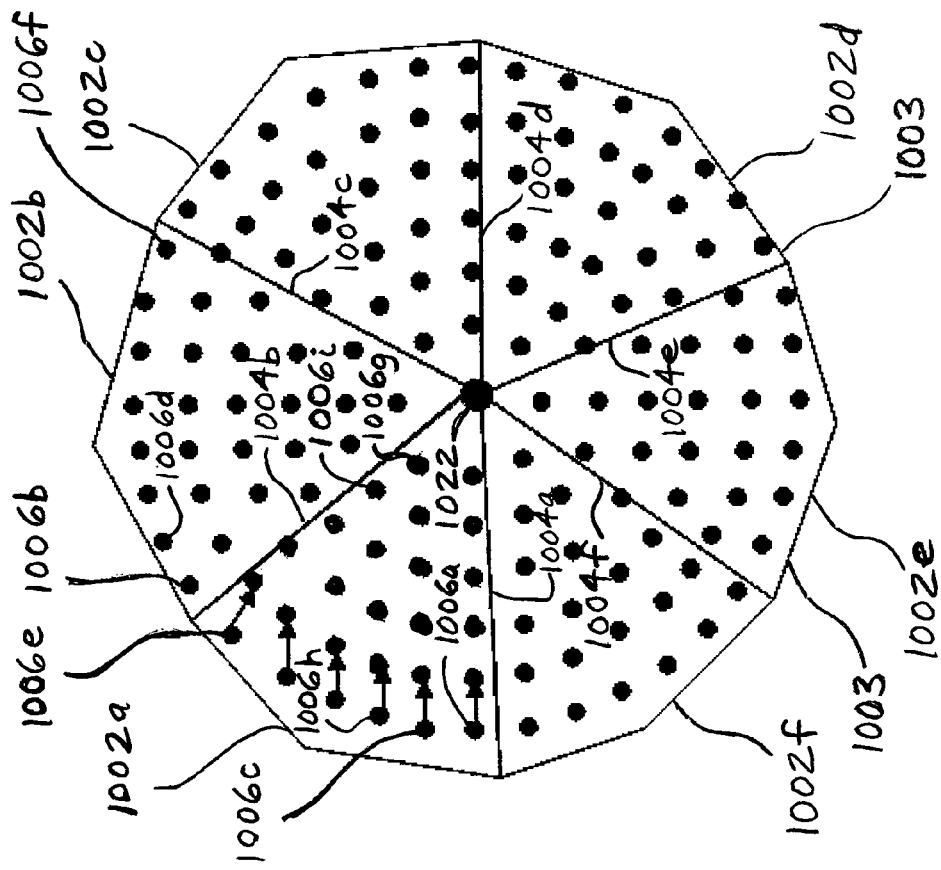
FIG. 10a is a plan view of data transfer in a first time slot in a method of radial data transfer using a circular grid topology.
Figure 10C:
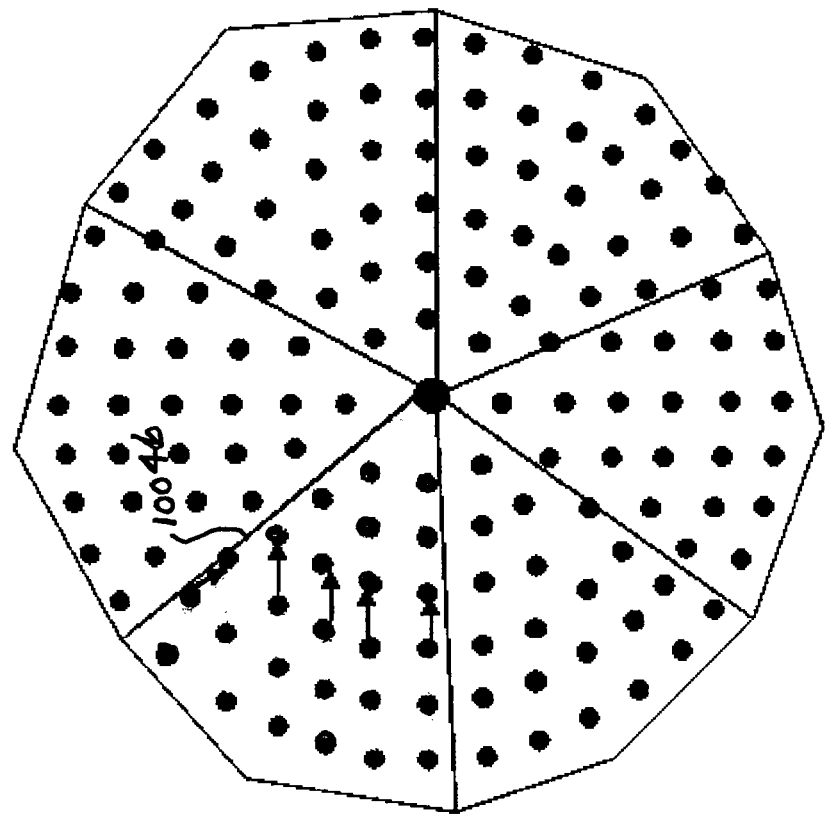
FIG. 10c is a plan view of data transfer in a third time slot in a method of radial data transfer using a circular grid topology.
Figure 10B:
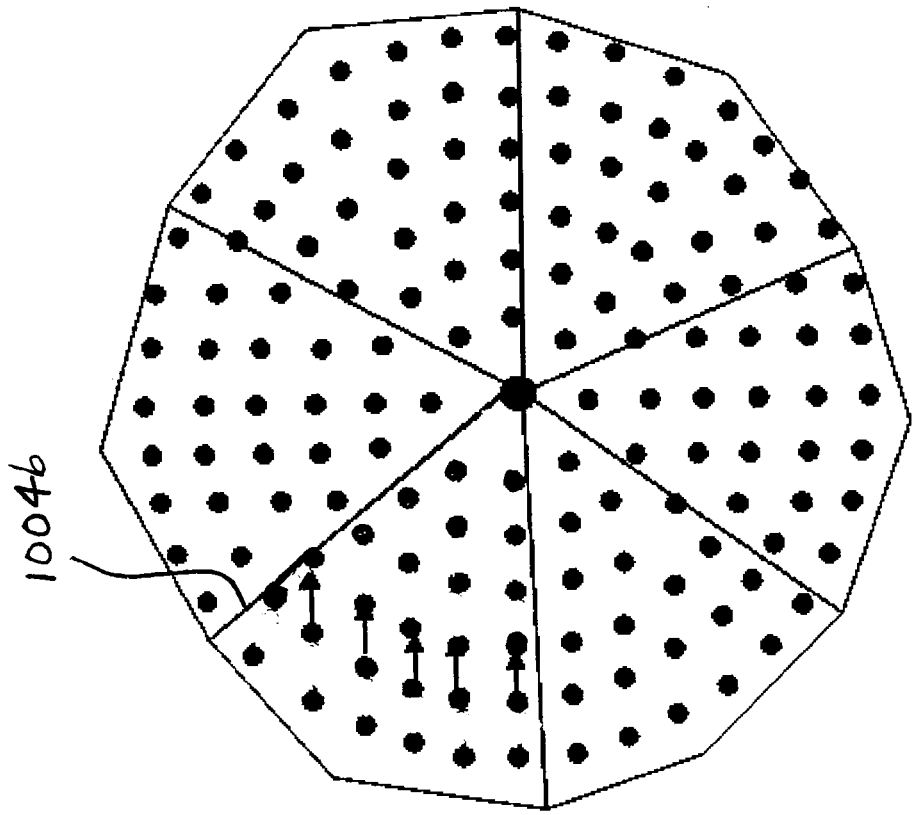
FIG. 10b is a plan view of data transfer in a second time slot in a method of radial data transfer using a circular grid topology.

In a second transmission time slot, depicted in FIG. 10b, the radial sweeping toward the center continues. Specifically, the five tracker nodes that received transmissions in the first transmission time slot but that are not adjacent to radial wall 1004b each transmit in a respective frequency channel. Each of the five tracker nodes transmits its data, along with all other data collected from the other nodes in the first transmission time slot, to a respective one of five radially-adjacent nodes.

In a third transmission time slot, depicted in FIG. 10c, the radial sweeping toward the center continues. Specifically, the four tracker nodes that received transmissions in the second transmission time slot but that are not adjacent to radial wall 1004b each transmit in a respective frequency channel. Each of the four tracker nodes transmits its data, along with all other data collected from the other nodes in the second transmission time slot, to a respective one of four radially-adjacent nodes. Also, a clockwisemost tracker that received a transmission in the first transmission time slot transmits its data, along with all other data collected from the other nodes in the first transmission time slot, to a radially-adjacent node that is adjacent to radial wall 1004b.

Figure 10E:
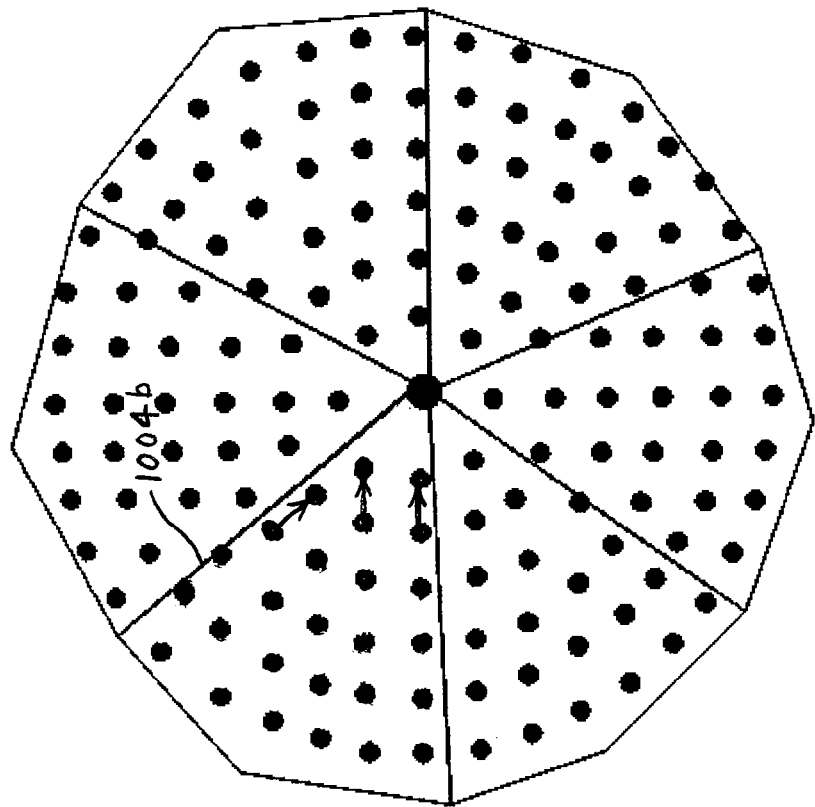
FIG. 10e is a plan view of data transfer in a fifth time slot in a method of radial data transfer using a circular grid topology.
Figure 10D:
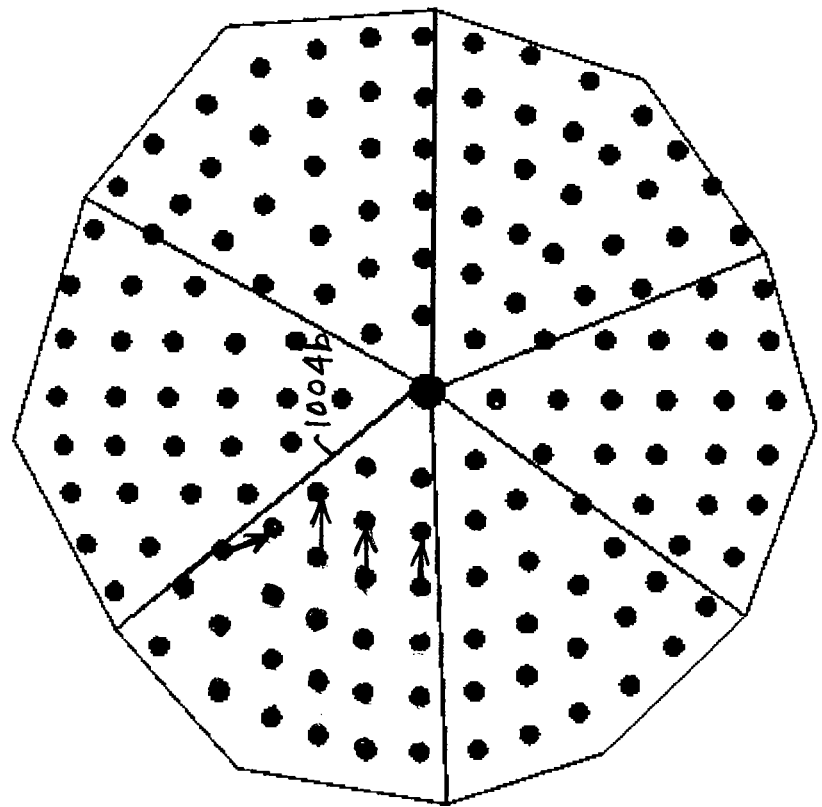
FIG. 10d is a plan view of data transfer in a fourth time slot in a method of radial data transfer using a circular grid topology.

In a fourth transmission time slot, depicted in FIG. 10d, the radial sweeping toward the center continues. Specifically, the three tracker nodes that received transmissions in the third transmission time slot but that are not adjacent to radial wall 1004b each transmit in a respective frequency channel. Each of the three tracker nodes transmits its data, along with all other data collected from the other nodes in the third transmission time slot, to a respective one of three radially-adjacent nodes. Also, the remaining tracker that received a transmission in the third transmission time slot transmits its data, along with all other data collected from the other nodes in the third transmission time slot, to a radially-adjacent node that is adjacent to radial wall 1004b.

In a fifth transmission time slot, depicted in FIG. 10e, the radial sweeping toward the center continues. Specifically, the two tracker nodes that received transmissions in the fourth transmission time slot but that are not adjacent to radial wall 1004b each transmit in a respective frequency channel. Each of the two tracker nodes transmits its data, along with all other data collected from the other nodes in the fourth transmission time slot, to a respective one of two radially-adjacent nodes. Also, the remaining tracker that received a transmission in the fourth transmission time slot transmits its data, along with all other data collected from the other nodes in the fourth transmission time slot, to a radially-adjacent node that is adjacent to radial wall 1004b.

Figure 10G:
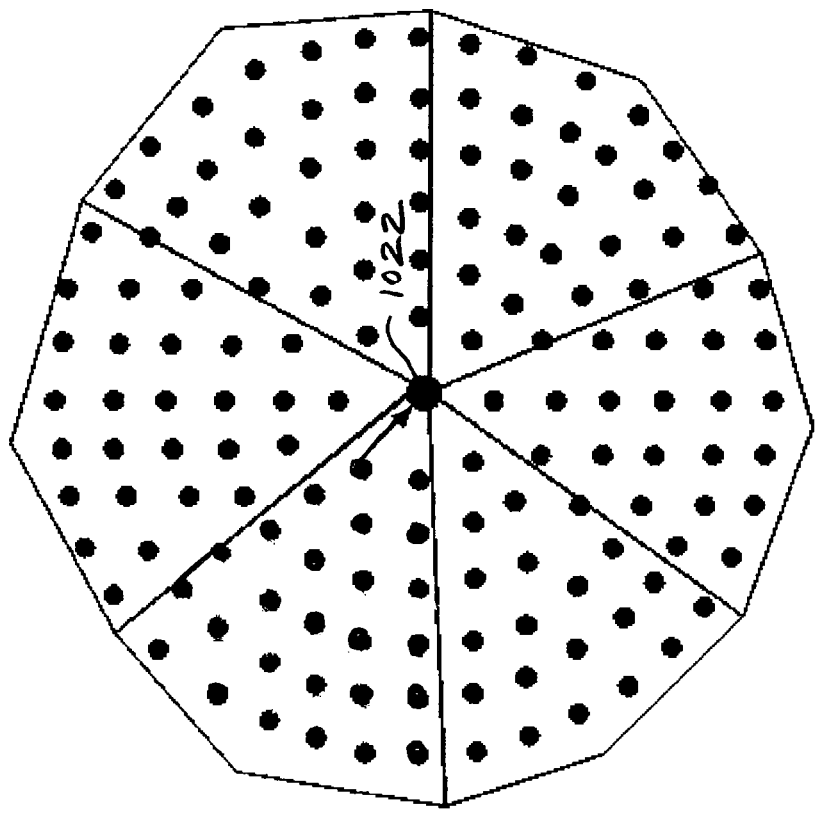
FIG. 10g is a plan view of data transfer in a seventh time slot in a method of radial data transfer using a circular grid topology.
Figure 10F:
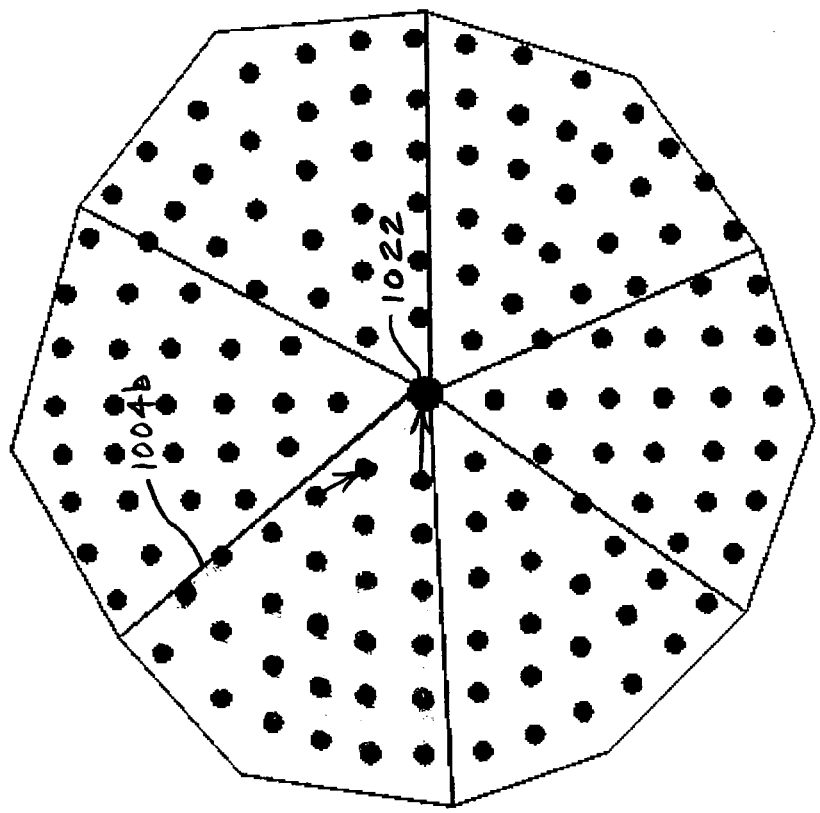
FIG. 10f is a plan view of data transfer in a sixth time slot in a method of radial data transfer using a circular grid topology.

In a sixth transmission time slot, depicted in FIG. 10f, the radial sweeping toward central DCS 1022 continues. Specifically, the tracker node that received transmissions in the fifth transmission time slot but that is not adjacent to radial wall 1004b transmits to central DCS 1022. The tracker node transmits its data, along with all other data collected from the other nodes in the fifth transmission time slot, to central DCS 1022. Also, the remaining tracker that received a transmission in the fifth transmission time slot transmits its data, along with all other data collected from the other nodes in the fifth transmission time slot, to a radially-adjacent node that is adjacent to radial wall 1004b.

In a final time slot, depicted in FIG. 10g, the radial sweeping toward central DCS 1022 is completed. Specifically, the clockwisemost tracker node that is radially-adjacent to central DCS 1022 transmits its data, along with all other data collected from the other nodes in the sixth transmission time slot, to central DCS 1022.

In another embodiment, the invention provides a random slotted scheme of data collection that may be used with any tracker topology. Given the connectivity graph between the trackers and the main computer, transmissions by the trackers can be scheduled with no collision using some fixed number of frequency channels such that all trackers can send their data packet to the main computer as fast as possible. An example of such a scheme is illustrated in FIGS. 11a-f. There are no topology constraints for such a scheme and the scheme can be used for both rectangular and circular grid topologies.

In the example embodiment illustrated in FIGS. 11*a-f*, the data flows generally from outer trackers toward a centralized DCS 1122, perhaps being relayed by one or more other trackers along the way. However, there is no requirement that the DCS be centralized. Rather, the DCS may be disposed anywhere along the outskirts of the distribution of the trackers.

Although different transmitting trackers may transmit on the same frequency channel simultaneously, a minimum difference between a first distance between a receiving tracker and one of the transmitting trackers and a second distance between the receiving tracker and another transmitting tracker using the same frequency channel may be called for. Thus, a difference in received signal strengths between two signals being simultaneously transmitted on a same frequency channel may be great enough that the receiving node can easily distinguish between the two signals, and no interference occurs in practical terms.

Figure 11B:
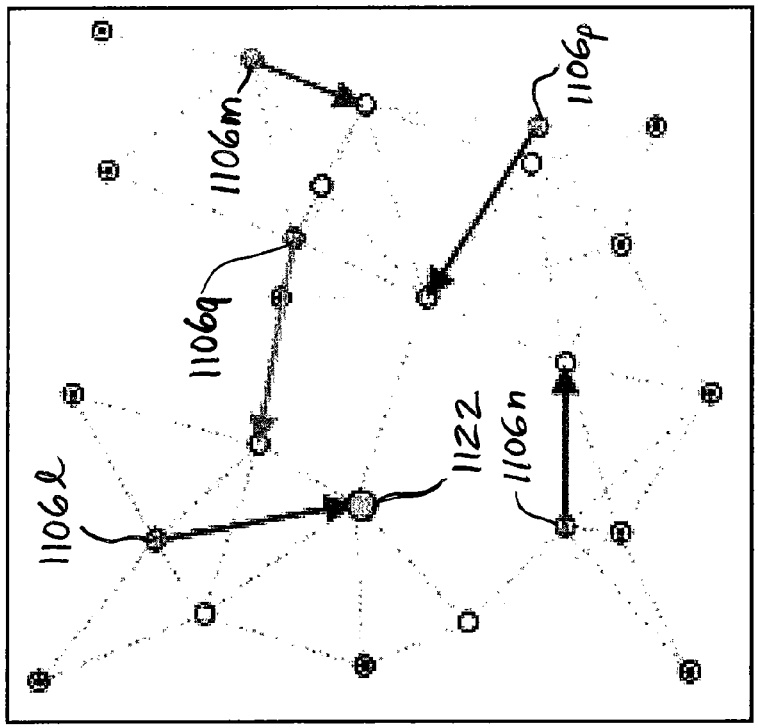
FIG. 11b is a plan view of data transfer in a second time slot in a random slotted scheme of data transfer.
Figure 11A:
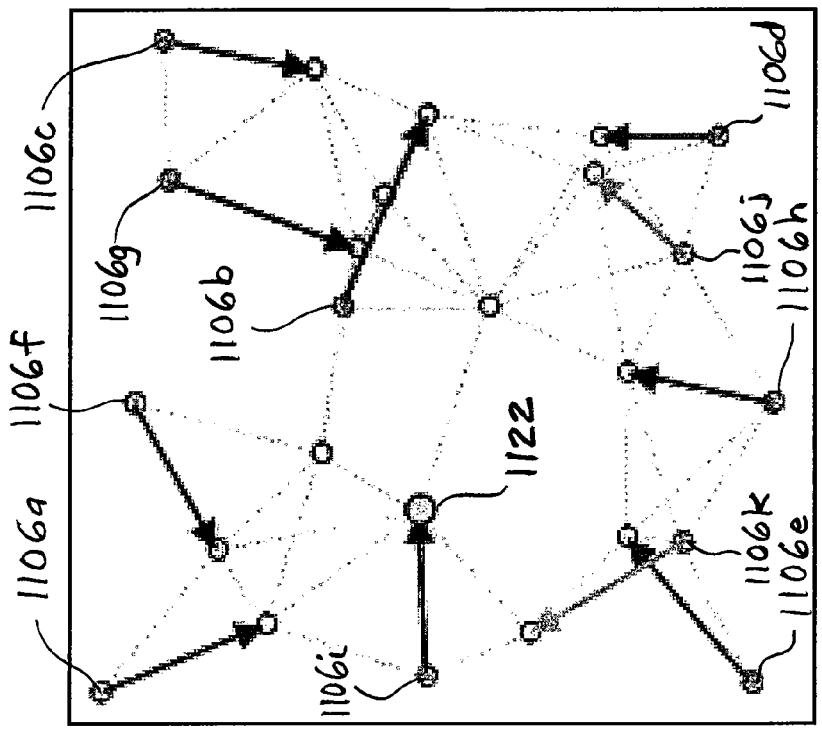
FIG. 11a is a plan view of data transfer in a first time slot in a random slotted scheme of data transfer.

In a first transmission time slot, depicted in FIG. 11*a*, five tracker nodes 1106*a-e* each transmit in a same first frequency channel; four tracker nodes 1106*f-i* each transmit in a same second frequency channel; and two tracker nodes 1106*j-k* each transmit in a same third frequency channel. As shown in each of FIGS. 11*a-f*, no tracker node both transmits and receives in a same transmission time slot.

In a second transmission time slot, depicted in FIG. 11*b*, three tracker nodes 1106*l-n* each transmit in the first frequency channel; one tracker node 1106*p* transmits in the second frequency channel; and one tracker node 1106*q* transmits in the third frequency channel. As can be seen in a comparison of FIGS. 11*a-b*, each of the tracker nodes 1106*l-q* that transmits in the second time slot depicted FIG. 11*b* also receives a transmission in the first time slot depicted in FIG. 11*a*.

Figure 11D:
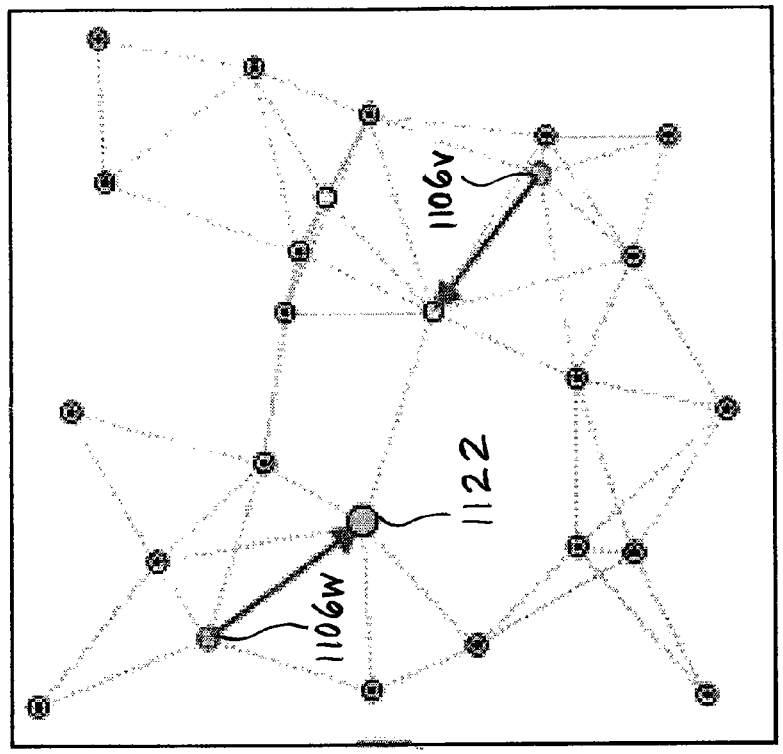
FIG. 11d is a plan view of data transfer in a fourth time slot in a random slotted scheme of data transfer.
Figure 11C:
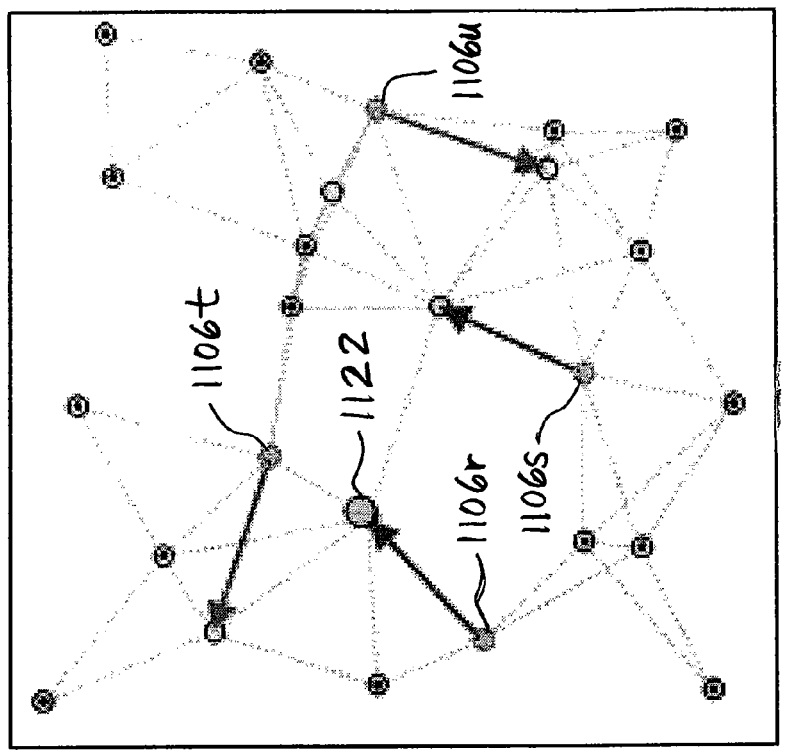
FIG. 11c is a plan view of data transfer in a third time slot in a random slotted scheme of data transfer.

In a third transmission time slot, depicted in FIG. 11*c*, two tracker nodes 1106*r-s* each transmit in the first frequency channel; and two tracker nodes 1106*t-u* each transmit in the second frequency channel. As can be seen in a comparison of FIGS. 11*a-c*, each of the tracker nodes 1106*r-u* that transmits in the third time slot depicted FIG. 11*c* also receives a transmission in the first time slot depicted in FIG. 11*a* and/or the second time slot depicted in FIG. 11*b*.

In a fourth transmission time slot, depicted in FIG. 11*d*, two tracker nodes 1106*v-w* each transmit in the first frequency channel. As can be seen in a comparison of FIGS. 11*a-d*, each of the tracker nodes 1106*v-w* that transmits in the fourth time slot depicted FIG. 11*d* also receives a transmission in the first time slot depicted in FIG. 11*a* and the third time slot depicted in FIG. 11*c*.

Figure 11F:
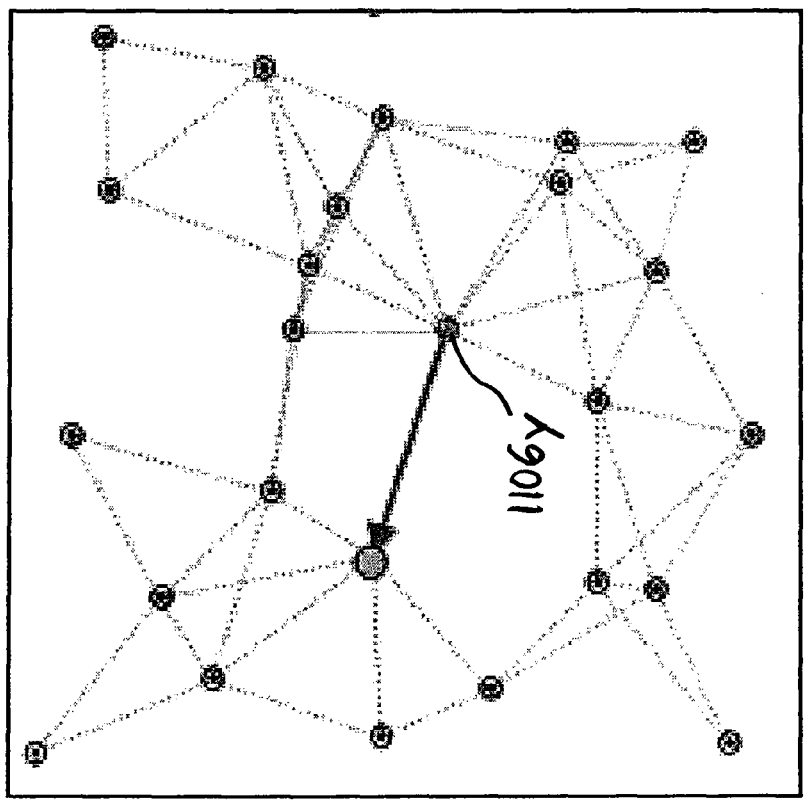
FIG. 11f is a plan view of data transfer in a sixth time slot in a random slotted scheme of data transfer.
Figure 11E:
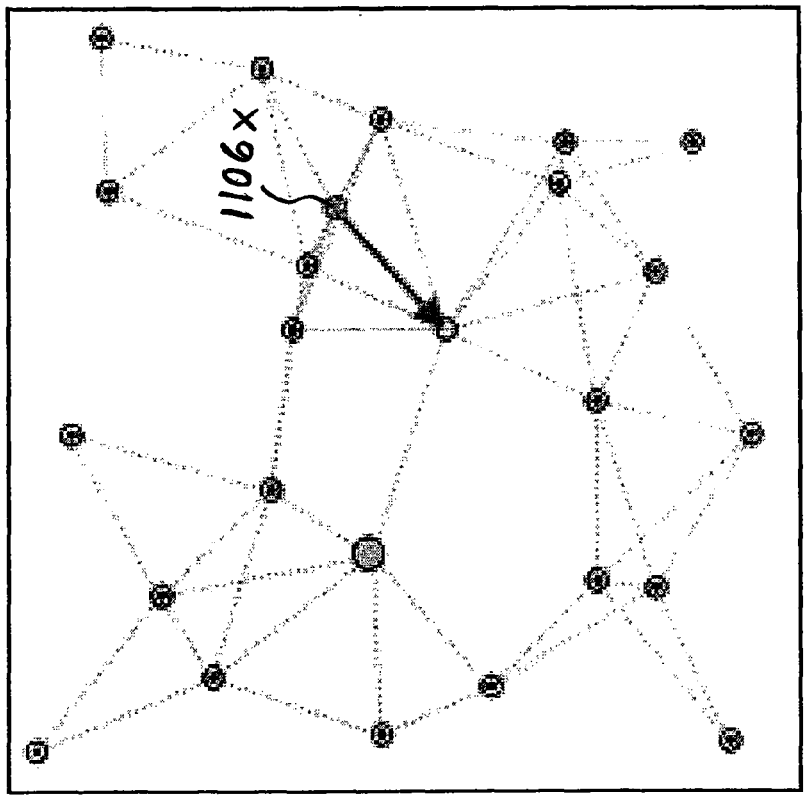
FIG. 11e is a plan view of data transfer in a fifth time slot in a random slotted scheme of data transfer.

In a fifth transmission time slot, depicted in FIG. 11*e*, a tracker node 1106*x* transmits in the first frequency channel. As can be seen in a comparison of FIGS. 11*a-e*, tracker node 1106*x* does not receive a transmission in any of the five time slots.

In a sixth and final transmission time slot, depicted in FIG. 11*f*, a tracker node 1106*y* transmits in the first frequency channel to DCS 1122. As can be seen in a comparison of FIGS. 11*a-f*, tracker node 1106*y* receives a transmission in each of the second, third, fourth and fifth time slots.

In a specific embodiment, in order to increase the efficiency and reliability of the base scheme, the time duration of the transmission time slots may be variable. For example, instead of the time durations of the transmission time slots being fixed, the time duration of a transmission time slot can vary depending on the maximum, average or minimum size of all packet data transmissions scheduled in that slot.

In another embodiment, multiple collection schedules may be utilized. As each node can send data to two or more different nodes in the network, multiple schedules can be overlapped together, as shown in FIGS. 12*a*-1.

Figure 12B:
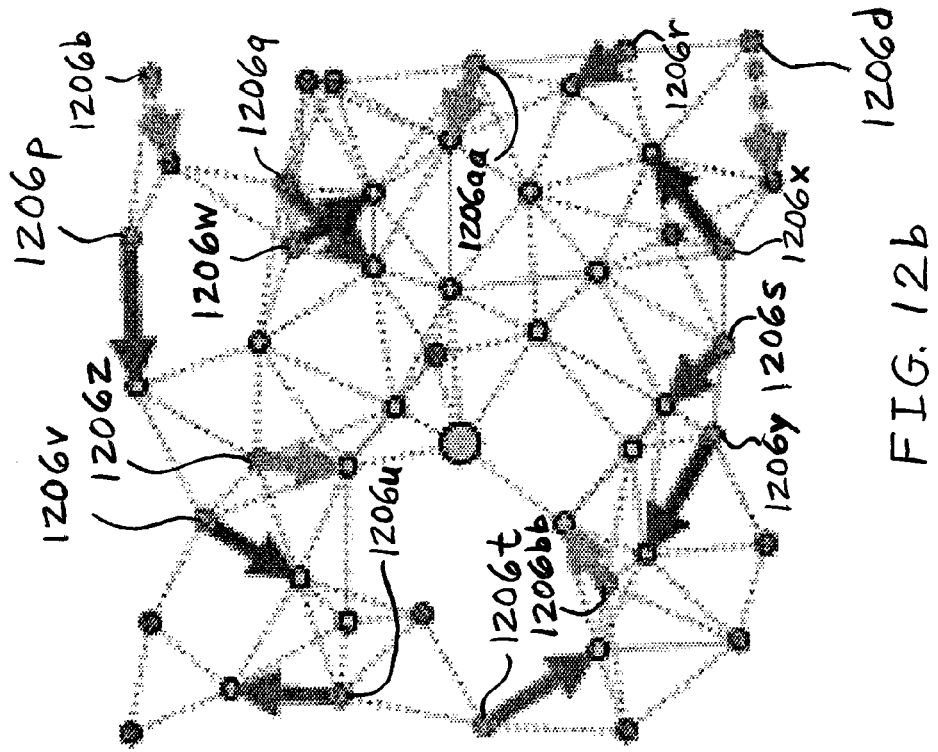
FIG. 12b is a plan view of data transfer in a second time slot in a random slotted scheme of data transfer including multiple collection schedules.
Figure 12A:
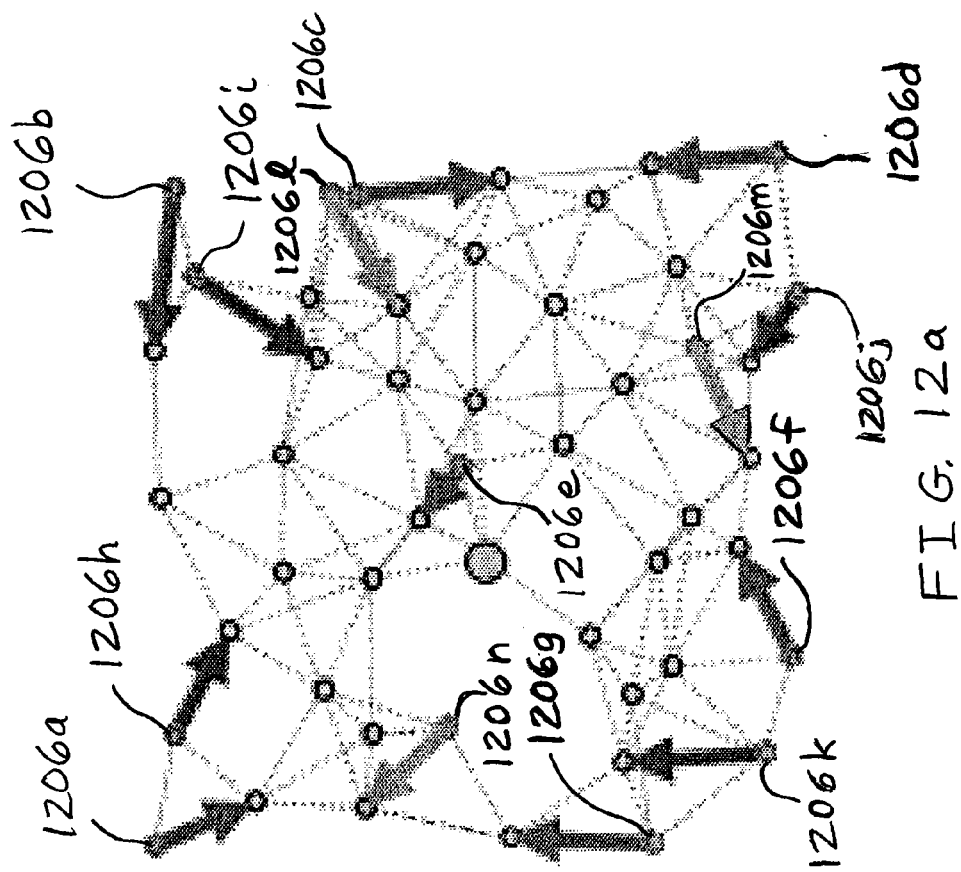
FIG. 12a is a plan view of data transfer in a first time slot in a random slotted scheme of data transfer including multiple collection schedules.

In a first transmission time slot, depicted in FIG. 12*a*, seven tracker nodes 1206*a-g* each transmit in a same first frequency channel; four tracker nodes 1206*h-k* each transmit in a same second frequency channel; and three tracker nodes 1206*l-n* each transmit in a same third frequency channel. In this first transmission time slot, all transmissions are according to a first schedule. As shown in each of FIGS. 12*a*-1, no tracker node both transmits and receives in a same transmission time slot.

In a second transmission time slot, depicted in FIG. 12*b*, six tracker nodes 1206*p-u* each transmit in the first frequency channel; four tracker nodes 1206*v-y* transmit in the second frequency channel; and three tracker nodes 1206*z* and 1206*aa-bb* transmit in the third frequency channel. All of the above-described transmissions in the second transmission time slot are according to the first schedule. In addition, according to a second schedule depicted by dashed arrows in FIGS. 12*b*-1, tracker nodes 1206*b* and 1206*d* each again transmit in the second transmission time slot, just as they transmitted in the first transmission time slot, but this time transmit to different tracker nodes than in the first transmission time slot. However, they may transmit the same information in the second transmission time slot as in the first transmission time slot. Tracker nodes 1206*b* and 1206*d* each transmit in the third frequency channel according to the second schedule, rather than in the first frequency channel according to the first schedule.

In a third transmission time slot, depicted in FIG. 12*c*, four tracker nodes 1206*cc-ff* each transmit in the first frequency channel; three tracker nodes 1206*gg-ii* transmit in the second frequency channel; and one tracker node 1206*jj* transmits in the third frequency channel. All of the above-described transmissions in the third transmission time slot are according to the first schedule. In addition, according to the second schedule, tracker nodes 1206*c*, 1206*p*, 1206*a*, 1206*j*, 1206*f* and 1206*t* each again transmit in the third transmission time slot, just as they transmitted in the first or second transmission time slots, but this time transmit to different tracker nodes than in the first or second transmission time slots. However, they may transmit the same information in the third transmission time slot as in the first or second transmission time slots. According to the second schedule, tracker node 1206*c* transmits in the first frequency channel; tracker node 1206*p* transmits in the second frequency channel; and tracker nodes 1206*a*, 1206*j*, 1206*f* and 1206*t* each transmit in the third frequency channel.

In a fourth transmission time slot, depicted in FIG. 12*d*, two tracker nodes 1206*kk-ll* each transmit in the first frequency channel; two tracker nodes 1206*mm-nn* transmit in the second frequency channel; and two tracker nodes 1206*oo-pp* transmit in the third frequency channel. All of the above-described transmissions in the fourth transmission time slot are according to the first schedule. In addition, according to the second schedule, tracker nodes 1206*i*, 1206*r*, 1206*k*, 1206*h*, 1206*ii*, 1206*dd* and 1206*x* each again transmit in the fourth transmission time slot, just as they transmitted in the first, second or third transmission time slots, but this time transmit to different tracker nodes than in the first, second or third transmission time slots. However, they may transmit the same information in the fourth transmission time slot as in the first, second or third transmission time slots. According to the second schedule, tracker nodes 1206*i*, 1206*r* and 1206*k* transmit in the first frequency channel; tracker nodes 1206*h* and

1206*ii* transmit in the second frequency channel; and tracker nodes 1206*dd* and 1206*x* each transmit in the third frequency channel.

Figure 12F:
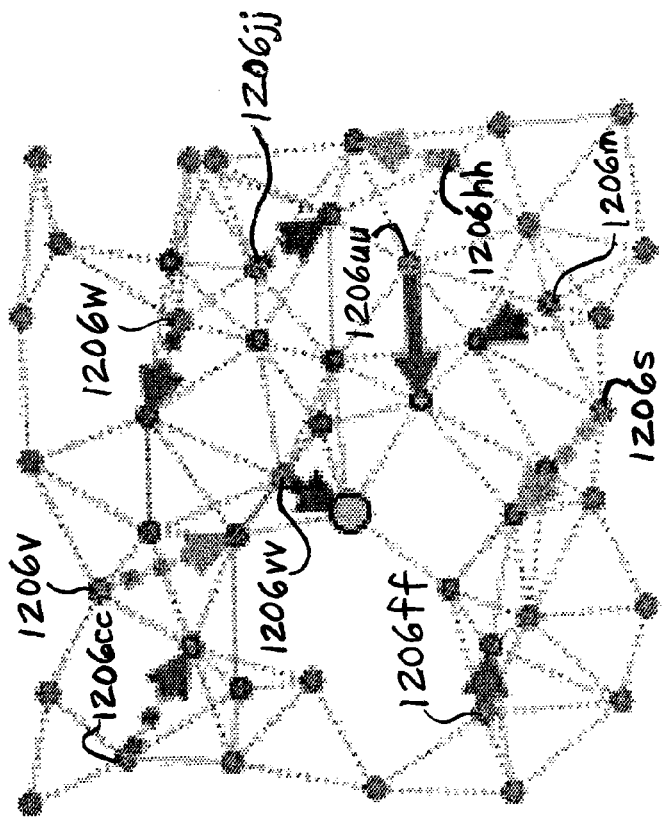
FIG. 12f is a plan view of data transfer in a sixth time slot in a random slotted scheme of data transfer including multiple collection schedules.
Figure 12E:
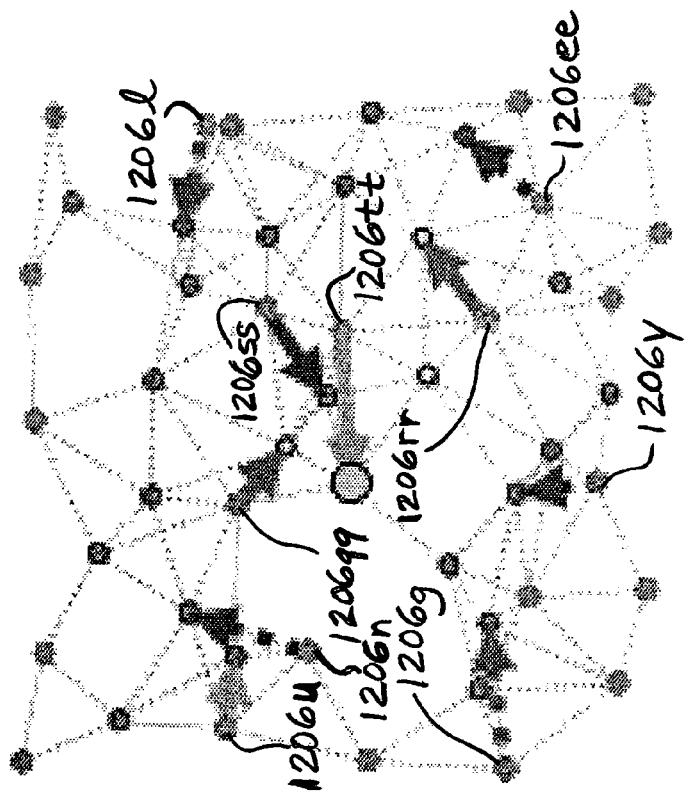
FIG. 12e is a plan view of data transfer in a fifth time slot in a random slotted scheme of data transfer including multiple collection schedules.

In a fifth transmission time slot, depicted in FIG. 12*e*, two tracker nodes 1206*qq-rr* each transmit in the first frequency channel; one tracker node 1206*ss* transmits in the second frequency channel; and one tracker node 1206*tt* transmits in the third frequency channel. All of the above-described transmissions in the fifth transmission time slot are according to the first schedule. In addition, according to the second schedule, tracker nodes 1206*l*, 1206*g*, 1206*ee*, 1206*y*, 1206*n* and 1206*u* each again transmit in the fifth transmission time slot, just as they transmitted in the first, second or third transmission time slots, but this time transmit to different tracker nodes than in the first, second or third transmission time slots. However, they may transmit the same information in the fifth transmission time slot as in the first, second or third transmission time slots. According to the second schedule, tracker nodes 1206*l* and 1206*g* transmit in the first frequency channel; tracker nodes 1206*ee*, 1206*y* and 1206*n* transmit in the second frequency channel; and tracker nodes 1206*u* transmits in the third frequency channel.

In a sixth transmission time slot, depicted in FIG. 12*f*, one tracker node 1206*uu* transmits in the first frequency channel; and one tracker node 1206*vv* transmits in the second frequency channel. The two above-described transmissions in the sixth transmission time slot are according to the first schedule. In addition, according to the second schedule, tracker nodes 1206*cc*, 1206*w*, 1206*ff*, 1206*jj*, 1206*m*, 1206*v*, 1206*hh* and 1206*s* each again transmit in the sixth transmission time slot, just as they transmitted in the second or third transmission time slots, but this time transmit to different tracker nodes than in the second or third transmission time slots. However, they may transmit the same information in the sixth transmission time slot as in the second or third transmission time slots. According to the second schedule, tracker nodes 1206*cc*, 1206*w* and 1206*ff* each transmit in the first frequency channel; tracker nodes 1206*jj* and 1206*m* each transmit in the second frequency channel; and tracker nodes 1206*v*, 1206*hh* and 1206*s* each transmit in the third frequency channel.

Figure 12H:
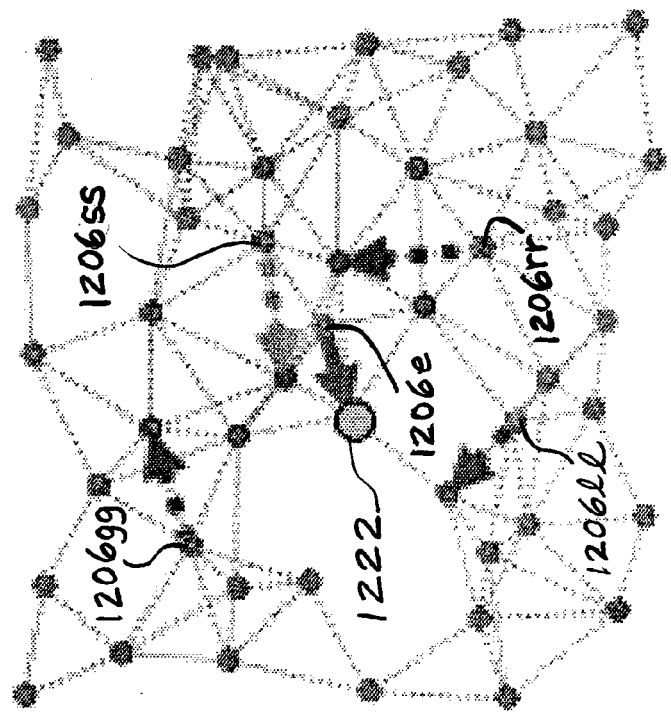
FIG. 12h is a plan view of data transfer in an eighth time slot in a random slotted scheme of data transfer including multiple collection schedules.
Figure 12G:
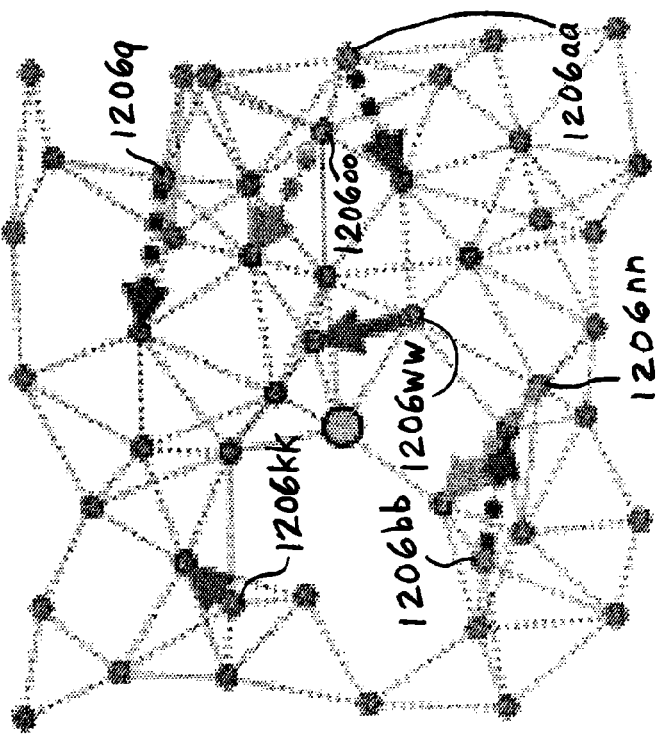
FIG. 12g is a plan view of data transfer in a seventh time slot in a random slotted scheme of data transfer including multiple collection schedules.

In a seventh transmission time slot, depicted in FIG. 12*g*, one tracker node 1206*ww* transmits in the first frequency channel according to the first schedule. In addition, according to the second schedule, tracker nodes 1206*kk*, 1206*q*, 1206*aa*, 1206*bb*, 1206*oo* and 1206*nn* each again transmit in the seventh transmission time slot, just as they transmitted in the second or third transmission time slots, but this time transmit to different tracker nodes than in the second or third transmission time slots. However, they may transmit the same information in the seventh transmission time slot as in the second or third transmission time slots. According to the second schedule, tracker node 1206*kk* transmits in the first frequency channel; tracker nodes 1206*q*, 1206*aa* and 1206*bb* each transmit in the second frequency channel; and tracker nodes 1206*oo* and 1206*nn* each transmit in the third frequency channel.

In an eighth transmission time slot, depicted in FIG. 12*h*, one tracker node 1206*e* again transmits in the first frequency channel to DCS 1222 according to the first schedule, just as it transmitted in the first transmission time slot, but this time transmit to a different tracker node than in the first transmission time slot. In addition, according to the second schedule, tracker nodes 1206*gg*, 1206*rr*, 1206*ll* and 1206*ss* each again transmit in the eighth transmission time slot, just as they transmitted in the third, fourth or fifth transmission time slots, but this time transmit to different tracker nodes than in the third, fourth or fifth transmission time slots. However, they may transmit the same information in the eighth transmission time slot as in the third, fourth or fifth transmission time slots. According to the second schedule, tracker nodes 1206*gg*, 1206*rr* and 1206*ll* each transmit in the second frequency channel; and tracker node 1206*ss* transmits in the third frequency channel.

Figure 12J:
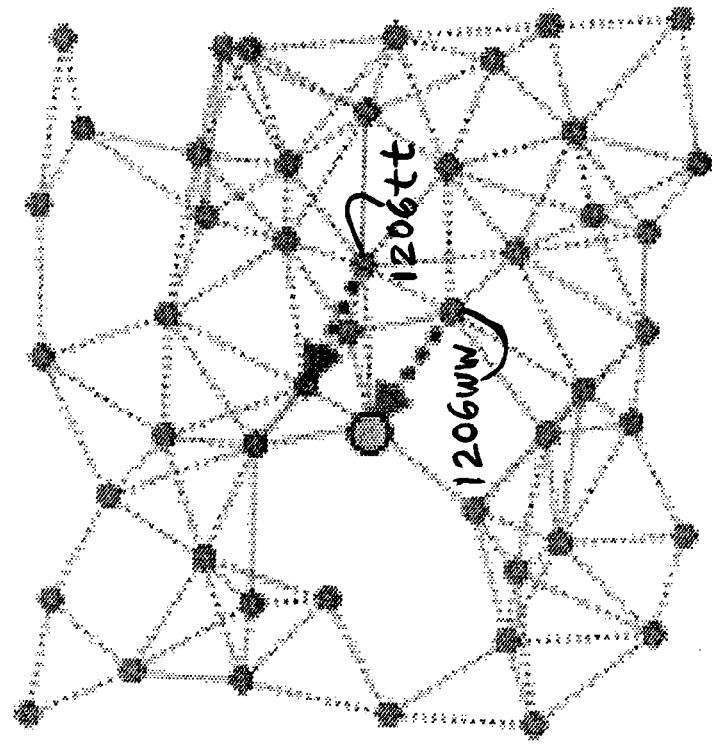
FIG. 12j is a plan view of data transfer in a tenth time slot in a random slotted scheme of data transfer including multiple collection schedules.
Figure 12I:
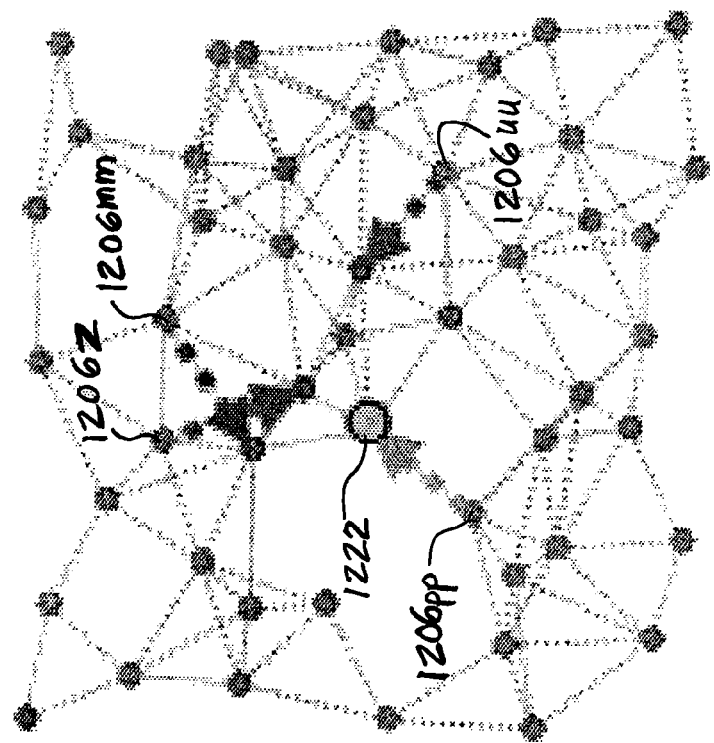
FIG. 12i is a plan view of data transfer in a ninth time slot in a random slotted scheme of data transfer including multiple collection schedules.

In a ninth transmission time slot, depicted in FIG. 12*i*, none of the tracker nodes transmit according to the first schedule. However, according to the second schedule, tracker nodes 1206*z*, 1206*uu*, 1206*mm* and 1206*pp* each again transmit in the ninth transmission time slot, just as they transmitted in the second, fourth or sixth transmission time slots. Tracker node 1206*pp* again transmits to DCS 1222, just as it did in the fourth transmission time slot. But this time tracker nodes 1206*z*, 1206*uu* and 1206*mm* transmit to different tracker nodes than in the second, fourth or sixth transmission time slots. However, tracker nodes 1206*z*, 1206*uu*, 1206*mm* and/or 1206*pp* may transmit the same information in the ninth transmission time slot as in the second, fourth or sixth transmission time slots. According to the second schedule, tracker nodes 1206*z*, 1206*uu* each transmit in the first frequency channel; tracker node 1206*mm* transmits in the second frequency channel; and tracker node 1206*pp* transmits in the third frequency channel.

In a tenth transmission time slot, depicted in FIG. 12*j*, none of the tracker nodes transmit according to the first schedule. However, according to the second schedule, tracker nodes 1206*ww* and 1206*tt* each again transmit in the tenth transmission time slot, just as they transmitted in the fifth or seventh transmission time slots, but this time transmit to different tracker nodes than in the fifth or seventh transmission time slots. However, tracker nodes 1206*ww* and 1206*tt* may transmit the same information in the tenth transmission time slot as in the fifth or seventh transmission time slots. According to the second schedule, tracker node 1206*ww* transmits in the first frequency channel; and tracker node 1206*tt* transmits in the second frequency channel.

In an eleventh transmission time slot, depicted in FIG. 12*k*, none of the tracker nodes transmit according to the first schedule. However, according to the second schedule, tracker nodes 1206*qq* again transmits in the eleventh transmission time slot, just as it transmitted in the fifth transmission time slot, but this time transmits to a different tracker node than in the fifth transmission time slot. However, tracker node 1206*qq* may transmit the same information in the eleventh transmission time slot as in the fifth transmission time slot. According to the second schedule, tracker node 1206*qq* transmits in the first frequency channel.

In a final transmission time slot, depicted in FIG. 12*l*, none of the tracker nodes transmit according to the first schedule. However, according to the second schedule, tracker node 1206*vv* again transmits in the final transmission time slot, just as it transmitted in the sixth transmission time slot, but this time transmits to DCS 1222 rather than to a tracker node as node 1206*vv* did in the sixth transmission time slot. However, tracker node 1206*vv* may transmit the same information in the final transmission time slot as in the sixth transmission time slot. According to the second schedule, tracker node 1206*vv* transmits in the first frequency channel.

An advantage of such a multiple collection schedule, random slotted scheme is that it is faster than other methods, and thus more time-efficient. Another advantage is that the scheme may keep all nodes busy. Links unused in the first round/time slot may be used in subsequent rounds/time slots. Yet another advantage is that the scheme may be more reliable and robust. The schedule may be computed such that each node receives the message from different sources in different rounds/time slots. A further advantage of the scheme is that it is easy to implement. That is, nodes may simply follow a pre-computed schedule. U.S. Pat. No. 7,738,455 (serial application Ser. No. 11/488,380) to Keshavarzian et al. discloses details on how such a scheme may be implemented, and is hereby incorporated by reference herein in its entirety.

Figure 13:
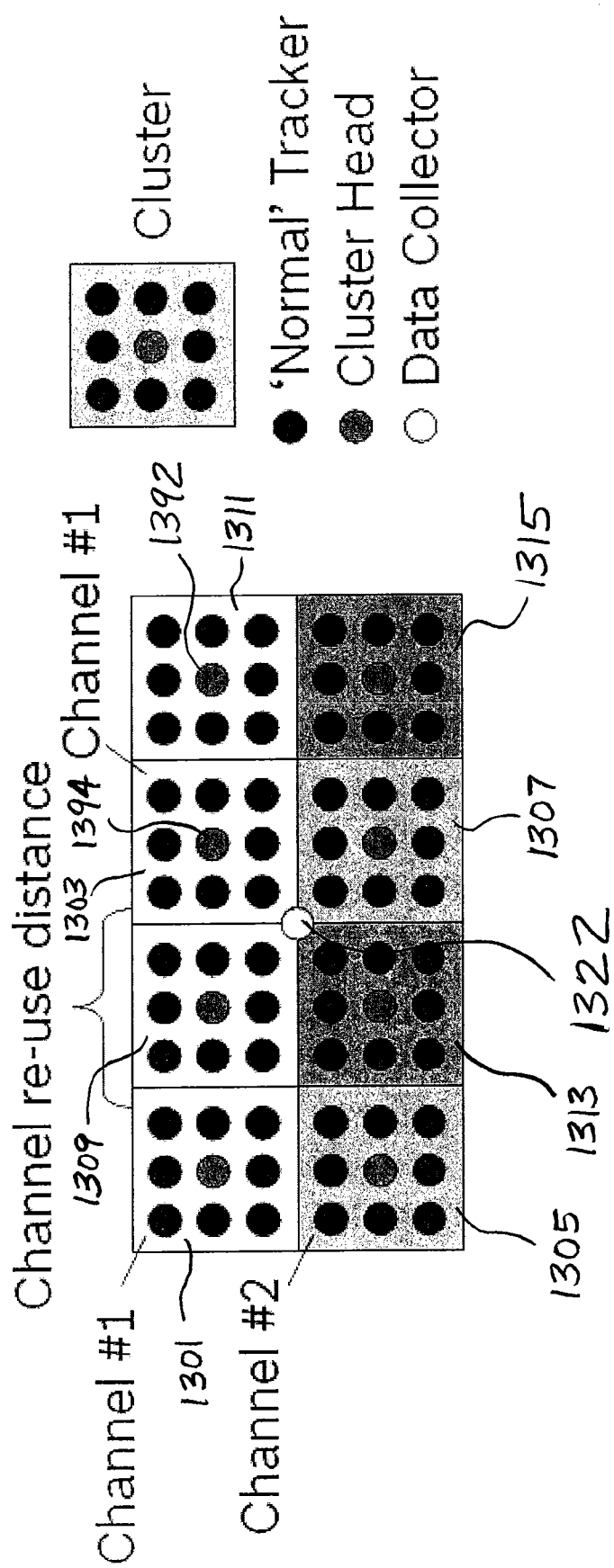
FIG. 13 is a plan view of data transfer in a hierarchical scheme of data collection.

In another embodiment depicted in FIG. 13, a hierarchical scheme of data collection may be performed in conjunction with any topology. A group/grid of trackers can also form individual clusters, there being a matrix of eight clusters including two rows of four clusters each illustrated in FIG. 13. Each cluster is made up of a matrix of nine elements including three rows of three elements each. The center element in each matrix is a cluster head, and the remaining eight elements in the matrix are all normal trackers. Each cluster head may be a tracker or a dedicated wireless node. All trackers may send their data to their cluster head which may then aggregate the data and send it to the DCS/Master data collector. As shown in FIG. 13, this DCS/Master data collector may be disposed in the middle of the matrix of clusters, e.g., between the first and second rows of clusters, and between the second and third rows of clusters. If the distance between the cluster head and the master collector is more than the wireless communication range, then the cluster head can use any other cluster head along the path as an intermediate hop to communicate with the master controller. For example, if DCS 1322 is beyond the wireless communication range of cluster head 1392, then cluster head 1392 may instead transmit to cluster head 1394, and cluster head 1394 may relay the message to DCS 1322.

For better performance, frequencies may be reused, but adjacent clusters can communicate on different frequency channels. However, clusters outside the interference range (e.g., the channel re-use distance) of each other may operate on same frequency channel. As illustrated in FIG. 13, clusters 1301 and 1303 are distanced from each other by at least the channel re-use distance. Thus, clusters 1301 and 1303 may both transmit within frequency channel 1. Similarly, clusters 1305 and 1307 may both transmit within frequency channel 2; clusters 1309 and 1311 may both transmit within a third frequency channel; and clusters 1313 and 1315 may both transmit within a fourth frequency channel.

In another embodiment, multiple radio antennas and/or directional antennas may be employed in the embodiment of FIG. 13. For example, the cluster head nodes can employ additional radio or directional antennas to communicate with the master node DCS directly without using an intermediate cluster head as a relay node. The antennas may be called for in transmitting to the DCS because the distance between a cluster head and the master collector DCS may be many times greater than the distance between the cluster head and the trackers in its same cluster.

Figure 14:
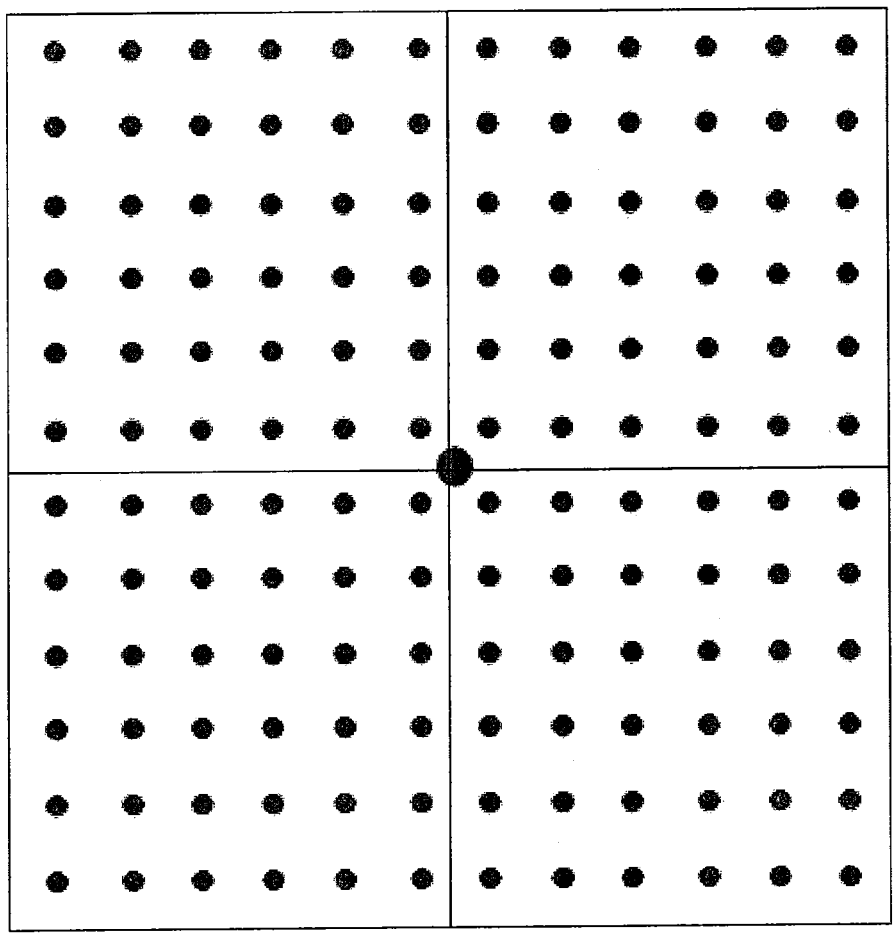
FIG. 14 is a plan view of a matrix of tracker nodes divided into quadrant sections for a divided scheme of data collection.

In another embodiment depicted in FIG. 14, a divide and conquer scheme of data collection may be performed in conjunction with any topology. The whole rectangular grid or matrix of tracker nodes can be divided into multiple sections. In the specific embodiment of FIG. 14, the grid is divided into four equally sized quadrants having equal numbers of tracker nodes. In each quadrant, respective data collection schemes may be implemented simultaneously, thereby reducing the overall data collection time by about 75 percent. The data collection schemes in each quadrant may be the same or different. Further, each quadrant can also employ different communication schemes, different frequency channels, etc., so as to improve the overall communication.

In other embodiments depicted in FIGS. 15-16, a communication path may be divided into sectors. For example, a given path, including all parallel scheduled paths, may be divided into multiple sectors wherein the multiple sectors can be scheduled simultaneously. This may result in smaller packets and a faster response time, especially in cases in which data is aggregated at every step. FIGS. 15*a-g* illustrate such a scheme wherein the number of bytes of overhead for every packet is represented by the letter "o" and the number of bytes of data to be sent by every node on the path is represented by the letter "a". The top half of the diagram in each of FIGS. 15*a-g* represents a data collection path without sectoring; and the bottom half of the diagram in each of FIGS. 15*a-g* represents a data collection path with sectoring, such as shown in FIG. 14. In FIG. 15*a* it can be seen that the communication path includes eleven tracker nodes 1506 and one DCS 1522 on the right-hand end of the diagram. In the first time slot depicted in FIG. 15*b* it may be observed that, with sectoring, two nodes 1506*a-b* in both sectors transmit simultaneously and total time consumed is still the same. That is, the time needed to transmit 'o+a' (1+1=2) bytes is the same. Generally in FIGS. 15*a-g*, communication on channel 1 is represented by a solid arced line between nodes 1506; and communication on channel 2 is represented by a dashed arced line between nodes 1506.

Figure 15A:
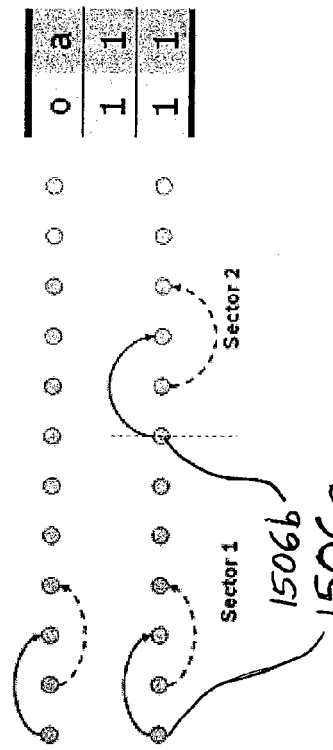
FIG. 15a is a plan view of a conventional communication path and the same communication path divided into two sections for a divided scheme of data collection.
Figure 15B:
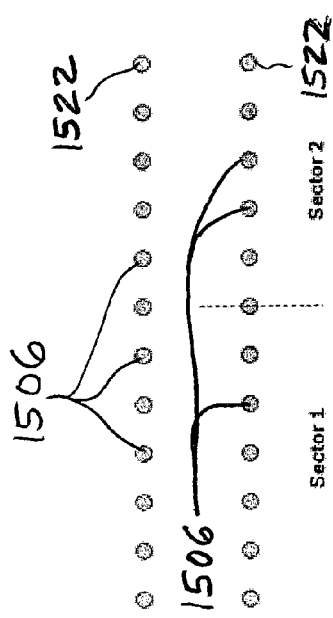
FIG. 15b is a plan view of a first step of data collection in the conventional communication path and in the same communication path divided into two sections for a divided scheme of data collection.
Figure 15C:
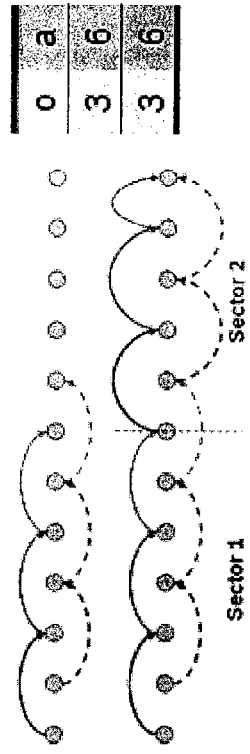
FIG. 15c is a plan view of a second step of data collection in the conventional communication path and in the same communication path divided into two sections for a divided scheme of data collection.

FIG. 15*c* depicts both the first and second time slots. The total time needed to transmit 'o+a' bytes remains same in the conventional and sectored communication paths. That is, in both methods, two bytes of overhead and three bytes of data need to be transmitted.

Figure 15D:
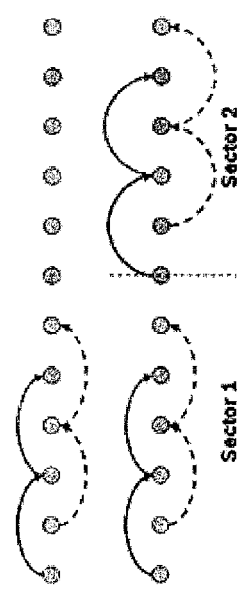
FIG. 15d is a plan view of a third step of data collection in the conventional communication path and in the same communication path divided into two sections for a divided scheme of data collection.

FIG. 15*d* depicts the first through third time slots. The total time needed to transmit 'o+a' bytes remains same in the conventional and sectored communication paths. That is, in both methods, three bytes of overhead and six bytes of data need to be transmitted.

Figure 15F:
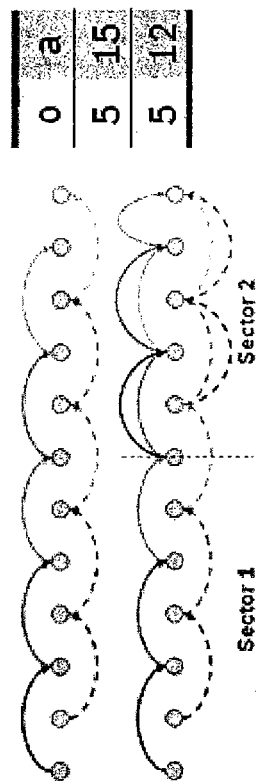
FIG. 15f is a plan view of a fifth step of data collection in the conventional communication path and in the same communication path divided into two sections for a divided scheme of data collection.
Figure 15E:
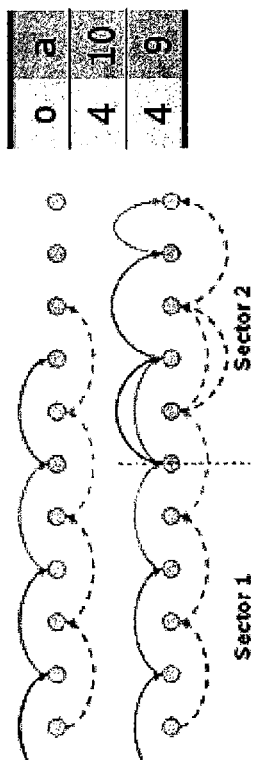
FIG. 15e is a plan view of a fourth step of data collection in the conventional communication path and in the same communication path divided into two sections for a divided scheme of data collection.

FIG. 15*e* depicts the first through fourth time slots. In the fourth time slot, the benefits of sectoring begin to materialize. It should be noted that trackers in sector two have no data to transmit. Hence from the fourth time slot onwards the trackers in sector two relay data of only nodes from sector one. Therefore, the duration of the fourth time slot required by the sectored scheme may be less than the duration of the fourth time slot in the non-sectored scheme. Thus, the overall time needed to transmit four bytes of overhead and ten bytes of data in the non-sectored scheme is greater than the time needed to transmit four bytes of overhead and nine bytes of data in the sectored scheme.

FIG. 15*f* depicts the first through fifth time slots. The duration of the fifth time slot required by the sectored scheme may be less than the duration of the fifth time slot in the non-sectored scheme. Moreover, the overall time needed to transmit five bytes of overhead and fifteen bytes of data in the non-sectored scheme is greater than the time needed to transmit five bytes of overhead and twelve bytes of data in the sectored scheme.

Figure 15G:
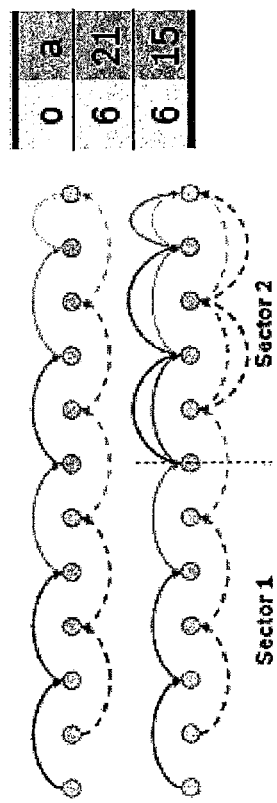
FIG. 15g is a plan view of a sixth step of data collection in the conventional communication path and in the same communication path divided into two sections for a divided scheme of data collection.

FIG. 15*g* depicts the first through sixth time slots. The duration of the sixth time slot required by the sectored scheme may be less than the duration of the sixth time slot in the non-sectored scheme. Moreover, the overall time needed to transmit six bytes of overhead and twenty-one bytes of data in the non-sectored scheme is greater than the time needed to transmit six bytes of overhead and fifteen bytes of data in the sectored scheme. That is, the overall communication time for the non-sectored scheme may include transmission time for '6o+21a' bytes of data while for the sectored scheme the overall communication time may require transmission time for only '6o+15a' bytes of data. Thus, the benefits of sectoring are clearly demonstrated. One restriction on the sectored scheme may be that the communications in the separate sectors not interfere with each other. Also, a given path can be divided into multiple sectors.

FIGS. 16a-f illustrate another embodiment including sectoring in which two adjacent paths are divided into multiple sectors. The top half of the diagram in each of FIGS. 16a-f represents a first data collection path divided in three sectors; and the bottom half of the diagram in each of FIGS. 16a-f represents a second, adjacent data collection path also divided in three sectors. Generally in FIGS. 16a-f, communication on channel 1 is represented by a solid arced line between nodes; communication on channel 2 is represented by a dashed arced line between nodes; communication on channel 3 is represented by an arced line between nodes including both dashes and dots; and communication on channel 4 is represented by a dotted arced line between nodes. Further, in each of FIGS. 16a-f, a tracker node whose data is being received, or has already been received, by the collector DCS at the right-hand end of the path is depicted by a black circle rather than a grey circle.

Figure 16B:
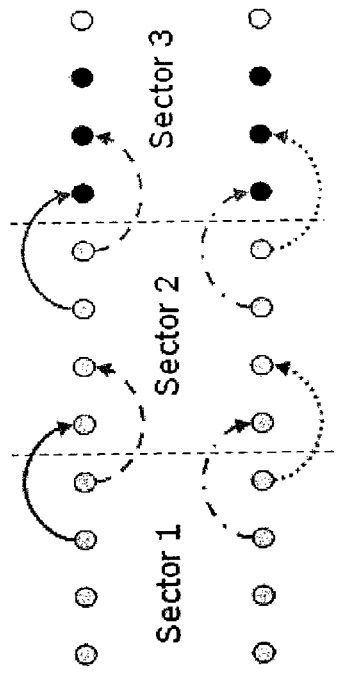
FIG. 16b is a plan view of a second step of data collection in two adjacent paths which are each divided into three sectors.
Figure 16D:
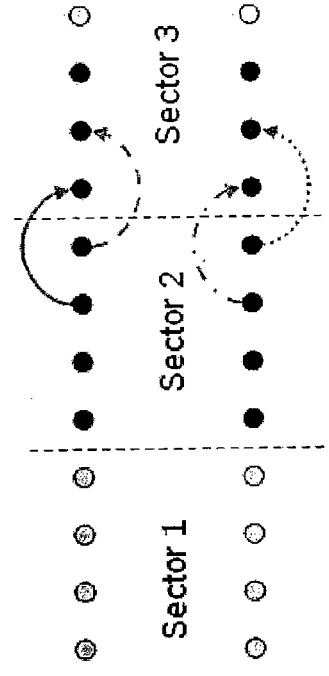
FIG. 16d is a plan view of a fourth step of data collection in two adjacent paths which are each divided into three sectors.
Figure 16A:
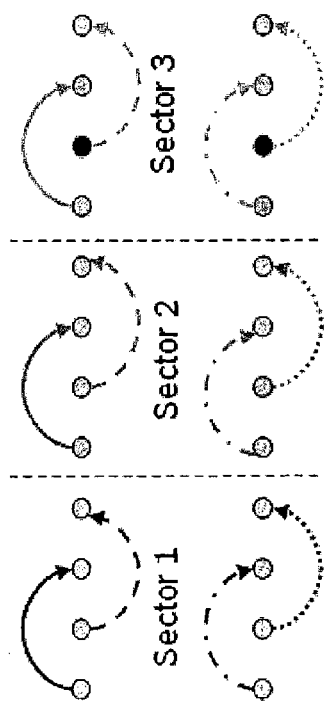
FIG. 16a is a plan view of a first step of data collection in two adjacent paths which are each divided into three sectors.
Figure 16C:
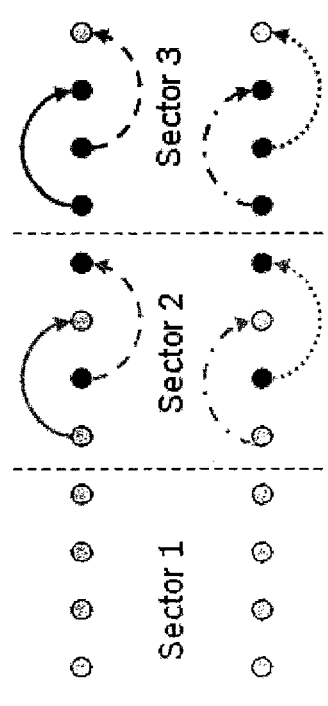
FIG. 16c is a plan view of a third step of data collection in two adjacent paths which are each divided into three sectors.
Figure 16E:
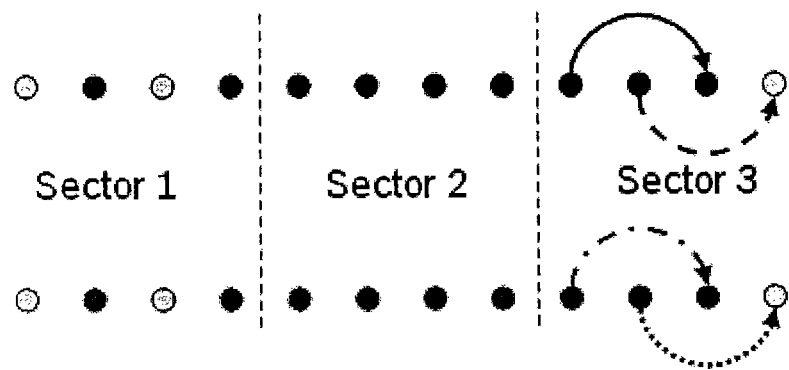
FIG. 16e is a plan view of a fifth step of data collection in two adjacent paths which are each divided into three sectors.
Figure 16F:
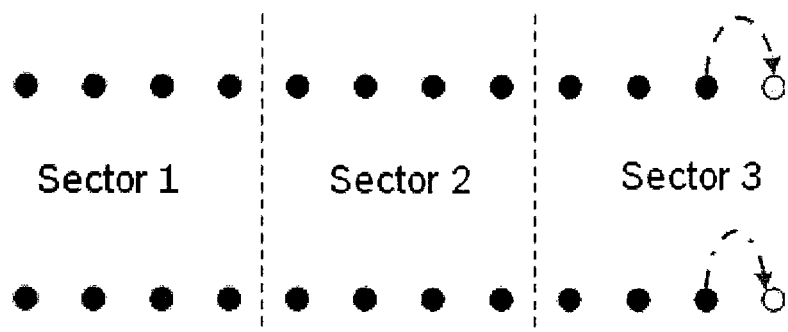
FIG. 16f is a plan view of a sixth step of data collection in two adjacent paths which are each divided into three sectors.

In the first step, depicted in FIG. 16a, all transmissions in sector 1 in both paths may occur in the same first time slot; all transmissions in sector 2 in both paths may occur in the same second time slot; and all transmissions in sector 3 in both paths may occur in the same third time slot. Similarly, in the second step, depicted in FIG. 16b, all transmissions from sector 1 in both paths may occur in the same fourth time slot; all transmissions from sector 2 in both paths may occur in the same fifth time slot; and all transmissions from sector 3 in both paths may occur in the same sixth time slot. Similarly, in the third step, depicted in FIG. 16c, all transmissions from sector 2 in both paths may occur in the same seventh time slot; and all transmissions from sector 3 in both paths may occur in the same eighth time slot. Similarly, in the fourth step, depicted in FIG. 16d, all transmissions from sector 2 in both paths may occur in the same ninth time slot; and all transmissions from sector 3 in both paths may occur in the same tenth time slot. Similarly, in the fifth step, depicted in FIG. 16e, all transmissions in both paths may occur in the same eleventh time slot. Finally, in the sixth step, depicted in FIG. 16f, all transmissions in both paths may occur in the same twelfth time slot.

Figure 17B:
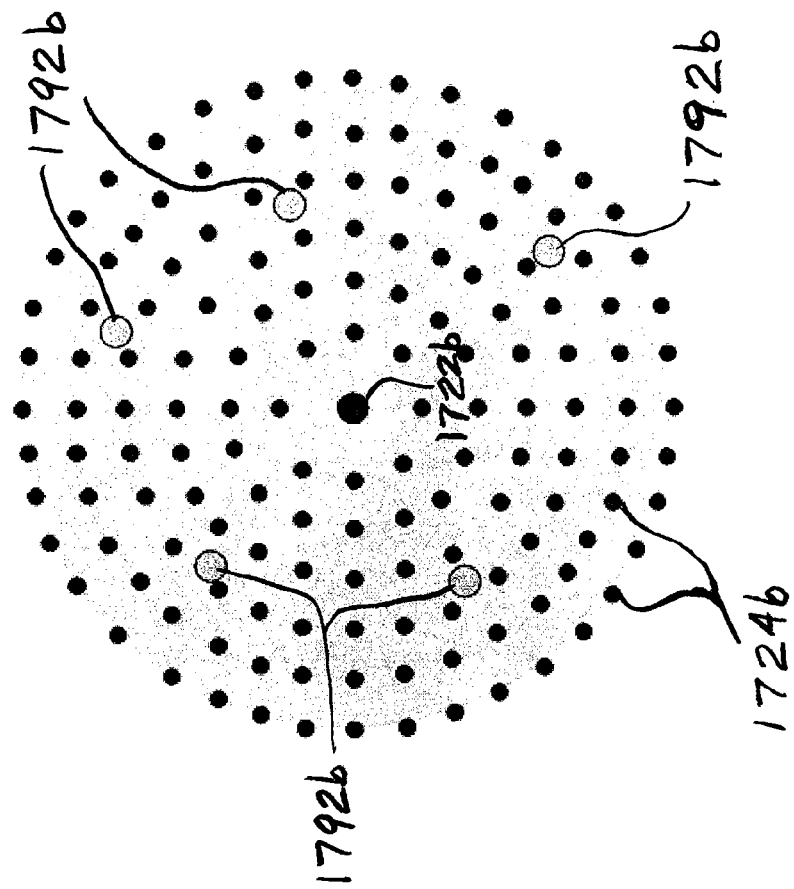
FIG. 17b is a plan view of a solar tracker wireless monitoring and tracking arrangement of the invention with the trackers arranged in a circular grid, and including five repeater/intermediate data collectors.
Figure 17A:
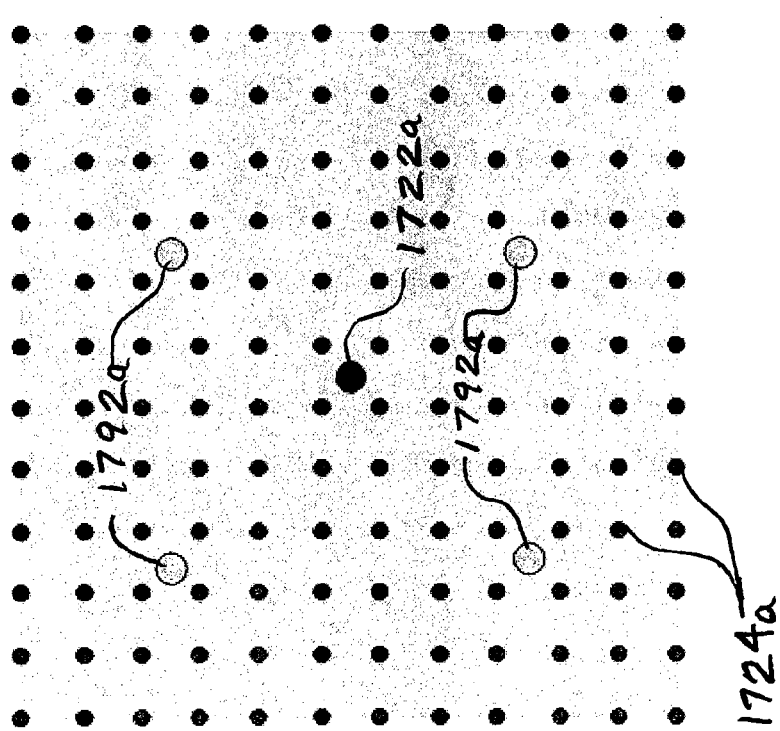
FIG. 17a is a plan view of a solar tracker wireless monitoring and tracking arrangement of the invention with the trackers arranged in a rectangular grid, and including four repeater/intermediate data collectors.

In other embodiments of solar tracker wireless monitoring and tracking arrangements 1720a-f depicted in FIGS. 17a-f, a repeater/collectors scheme of data collection may be performed in conjunction with any topology. Arrangement 1720a (FIG. 17a) includes a central data control system (DCS) 1722a which is located within a matrix of rows and columns of trackers 1724a. Four substantially equally-spaced repeaters or intermediate data collectors 1792a are dispersed among trackers 1724a, substantially equally-spaced from DCS 1722a. In a second embodiment of a solar tracker wireless monitoring and tracking arrangement 1720b illustrated in FIG. 17b, trackers 1724b are arranged in concentric rings surrounding a central data control system (DCS) 1722b. Thus, the solar plant may have trackers arranged either in a rectangular grid or in concentric circles as shown in FIGS. 17a-b. Five substantially equally-spaced repeaters or intermediate data collectors 1792b are dispersed among trackers 1724b, substantially equally-spaced from DCS 1722b.

Figure 17D:
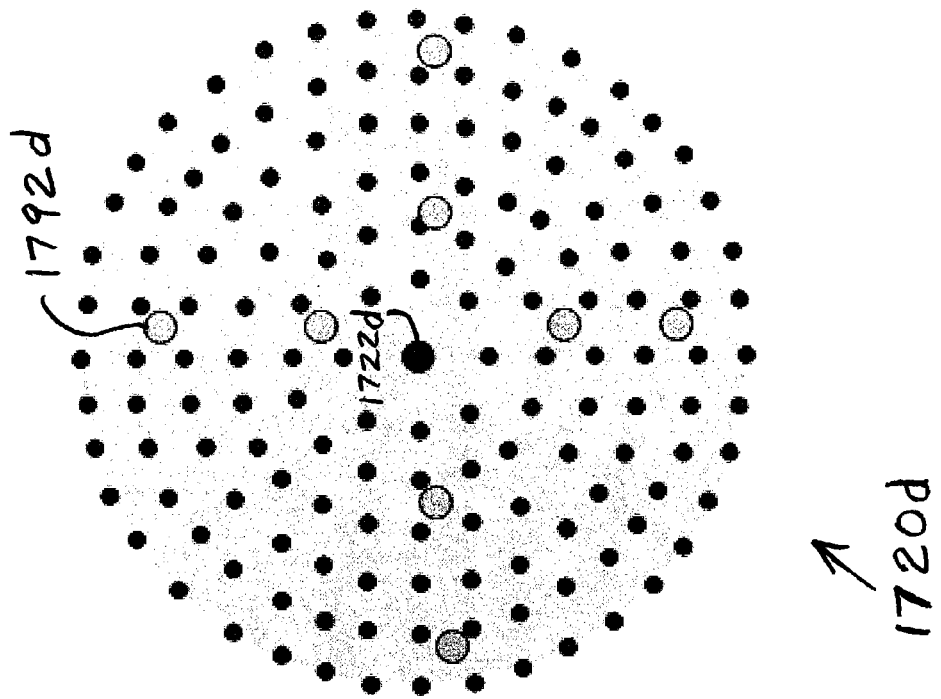
FIG. 17d is a plan view of a solar tracker wireless monitoring and tracking arrangement of the invention with the trackers arranged in a circular grid, and including eight repeater/intermediate data collectors.
Figure 17C:
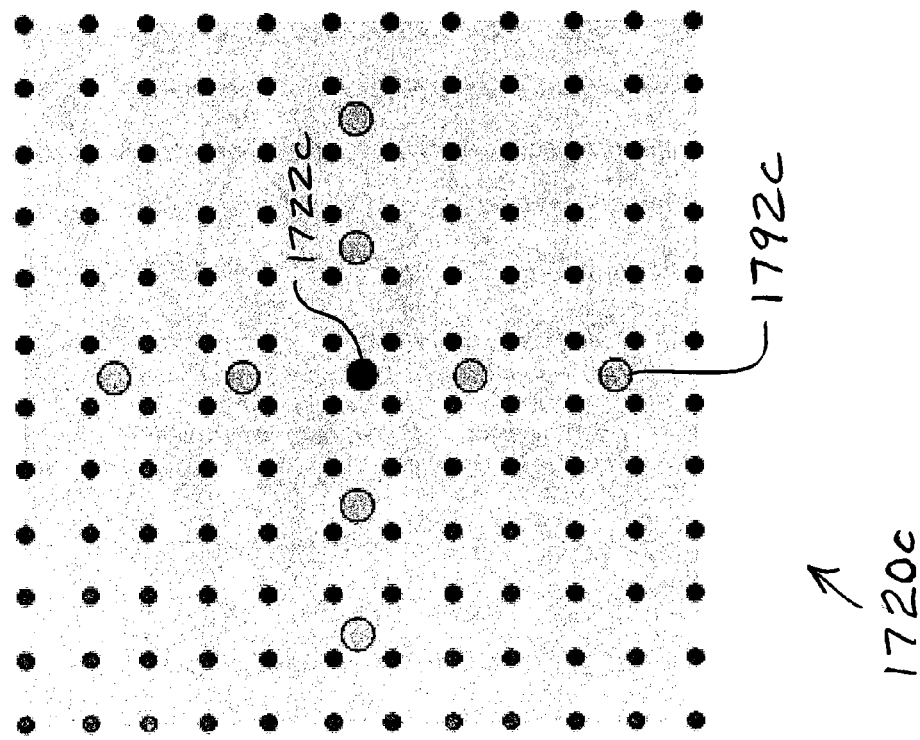
FIG. 17c is a plan view of a solar tracker wireless monitoring and tracking arrangement of the invention with the trackers arranged in a rectangular grid, and including eight repeater/intermediate data collectors.

A third embodiment of a solar tracker wireless monitoring and tracking arrangement 1720c illustrated in FIG. 17c is substantially similar to arrangement 1720a, except that arrangement 1720c includes eight repeaters or intermediate data collectors 1792c disposed in a crisscross pattern. In the particular illustrated embodiment, four repeaters 1792c are horizontally aligned with DCS 1722c, with these five elements being substantially equally spaced apart. Four other repeaters 1792c are vertically aligned with DCS 1722c, with these five elements also being substantially equally spaced apart.

A fourth embodiment of a solar tracker wireless monitoring and tracking arrangement 1720d illustrated in FIG. 17d is substantially similar to arrangement 1720b, except that arrangement 1720d includes eight repeaters or intermediate data collectors 1792d disposed in a crisscross pattern. In the particular illustrated embodiment, four repeaters 1792d are substantially horizontally aligned with DCS 1722d, with these five elements being substantially equally spaced apart. Four other repeaters 1792d are substantially vertically aligned with DCS 1722c, with these five elements also being substantially equally spaced apart.

Figure 17F:
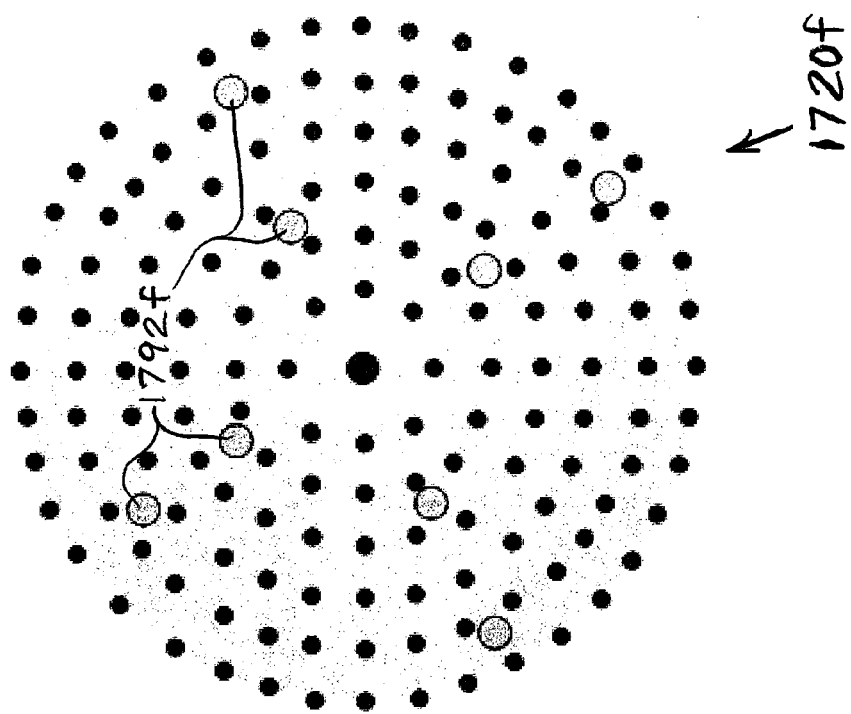
FIG. 17f is a plan view of another solar tracker wireless monitoring and tracking arrangement of the invention with the trackers arranged in a circular grid, and including eight repeater/intermediate data collectors.
Figure 17E:
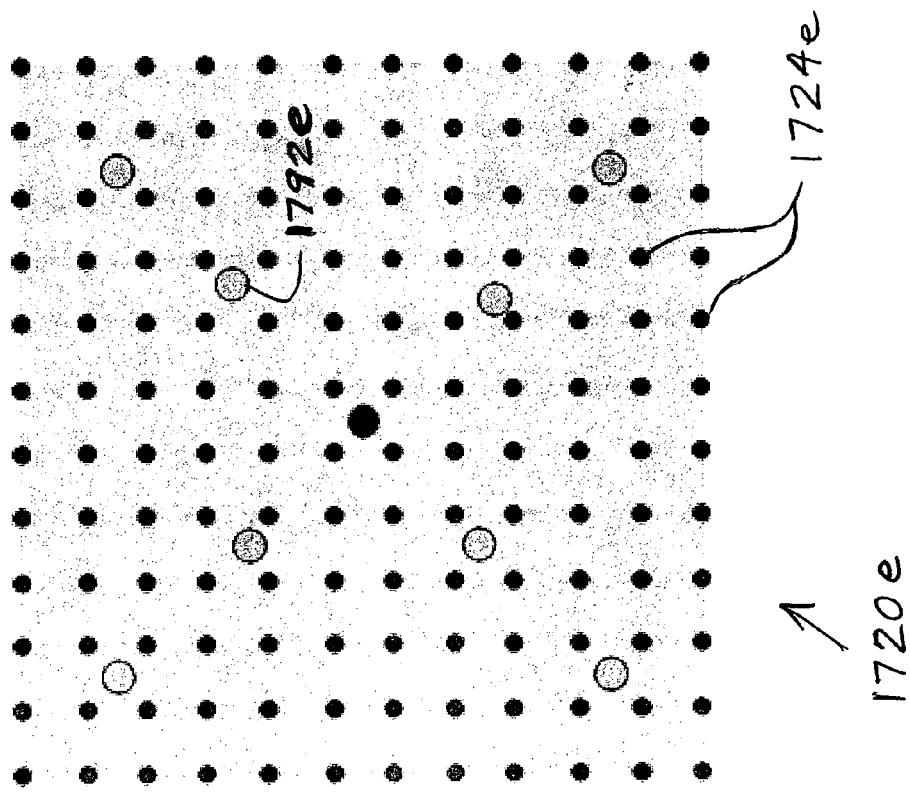
FIG. 17e is a plan view of another solar tracker wireless monitoring and tracking arrangement of the invention with the trackers arranged in a rectangular grid, and including eight repeater/intermediate data collectors.

A fifth embodiment of a solar tracker wireless monitoring and tracking arrangement 1720e illustrated in FIG. 17e is substantially similar to arrangement 1720c, except that the eight repeaters or intermediate data collectors 1792e of arrangement 1720e are disposed in a diagonally-oriented crisscross pattern with respect to the rectangular matrix of trackers 1724e.

A sixth embodiment of a solar tracker wireless monitoring and tracking arrangement 1720f illustrated in FIG. 17f is substantially similar to arrangement 1720d, except that the eight repeaters or intermediate data collectors 1792f of arrangement 1720f are disposed in a crisscross pattern wherein the crisscrossing lines of repeaters 1792f are not strictly perpendicular to each other. Rather, the crisscrossing lines of repeaters 1792f may form angles of about 80 degrees and 100 degrees therebetween. Moreover, the innermost four repeaters 1792f are disposed farther radially outward than the four repeaters 1792d of arrangement 1720d.

The dedicated repeaters or intermediate collector nodes 1792a-f may expedite data collection and/or enable better performance. Any or all of repeaters 1792a-f may include multiple radios in order to transmit signals to several nodes simultaneously on different channels. Any or all of repeaters 1792a-f may also include directional antennas which may provide the repeater with a greater transmission range such that the repeater may more reliably transmit signals to other intermediate collectors 1792a-f or to the final data collector 1722a-f. The placement of repeaters 1792a-f may be dependent on the topology of trackers 1724a-f; hardware constraints of trackers 1724a-f; and on other performance requirements.

The schemes discussed above for data collection may also be employed for data distribution from the DCS to the trackers. More particularly, in other embodiments depicted in FIGS. 17a-d and 18a-d, the invention provides schemes for data communication from the DCS to the trackers.

Generally, data communication from the DCS to the trackers can be of three types. In the first type, the DCS needs to enquire or otherwise communicate with a particular tracker. In the second type, the DCS needs to broadcast the same data to all the trackers. In the third type, the DCS needs to send individual data to every tracker.

In the cases of the first type, in which the DCS needs to enquire/communicate with a particular tracker, communication may be faster than with the other two types and may depend on the depth of the tree/network. The path from the DCS to the tracker may be the same as the path from the tracker to the DCS, and may include one or more intermediate nodes. Also, it may be possible to employ an algorithm that determines the shortest distance path between the DCS and the tracker based on the communication range of the tracker.

In the cases of the second type, in which the DCS needs to broadcast the same data to all trackers, an intermediate set of nodes can be pre-defined as repeaters for these messages. This allocation of certain nodes as repeaters can be either pre-defined or random depending on the topology and the communication scheme deployed. Pre-defined allocation of certain nodes as repeaters can be performed for topologies as discussed above with regard to embodiments depicted in FIGS. 11a-f, 14, 15a-g and 16a-f. In these cases, cluster heads and repeaters may forward the broadcast packets. For other cases, random mechanisms for allocating certain nodes as repeaters can be deployed. Given the connectivity graph and the base station, an optimal scheduling of the nodes with no collisions occurring is possible by using some fixed number of frequency channels such that all nodes receive the message as fast as possible. An example of this scheme is illustrated in FIGS. 18a-d, wherein at every step only selected nodes rebroadcast the data from the DCS.

Figure 18B:
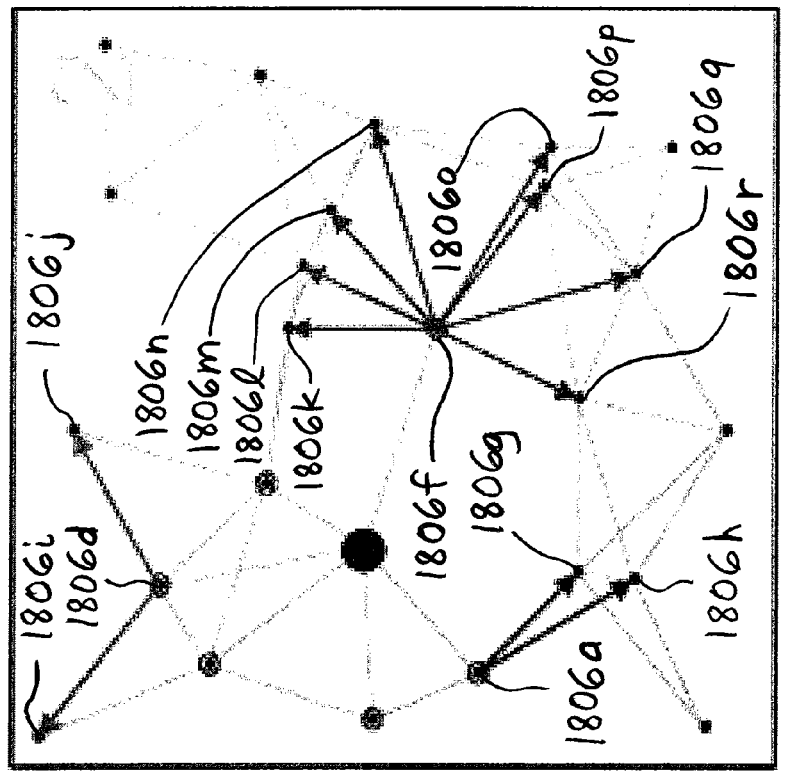
FIG. 18b is a plan view of data transfer from DCS to tracker nodes in a second time slot in a scheme in which the DCS broadcasts the same data to all tracker nodes.
Figure 18A:
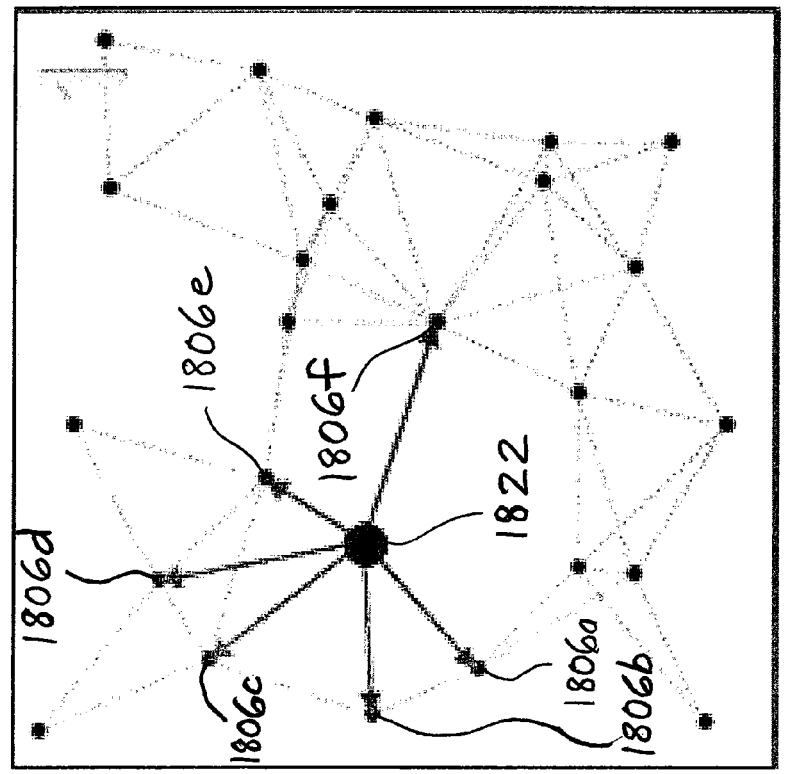
FIG. 18a is a plan view of data transfer from DCS to tracker nodes in a first time slot in a scheme in which the DCS broadcasts the same data to all tracker nodes.

In a first transmission time slot, depicted in FIG. 18a, DCS 1822 transmits to six tracker nodes 1806a-f. Each of the six transmissions may be in a same third of three frequency channels.

In a second transmission time slot, depicted in FIG. 18b, tracker node 1806a transmits in a first frequency channel to tracker nodes 1806g-h; tracker node 1806d transmits in a second frequency channel to tracker nodes 1806i-j; and tracker node 1806f transmits in the third frequency channel to tracker nodes 1806k-r. In the second transmission time slot, each of tracker nodes 1806a, 1806d and 1806f may transmit the same information received in the first transmission time slot, as well as other information already possessed by tracker nodes 1806a, 1806d and 1806f.

Figure 18D:
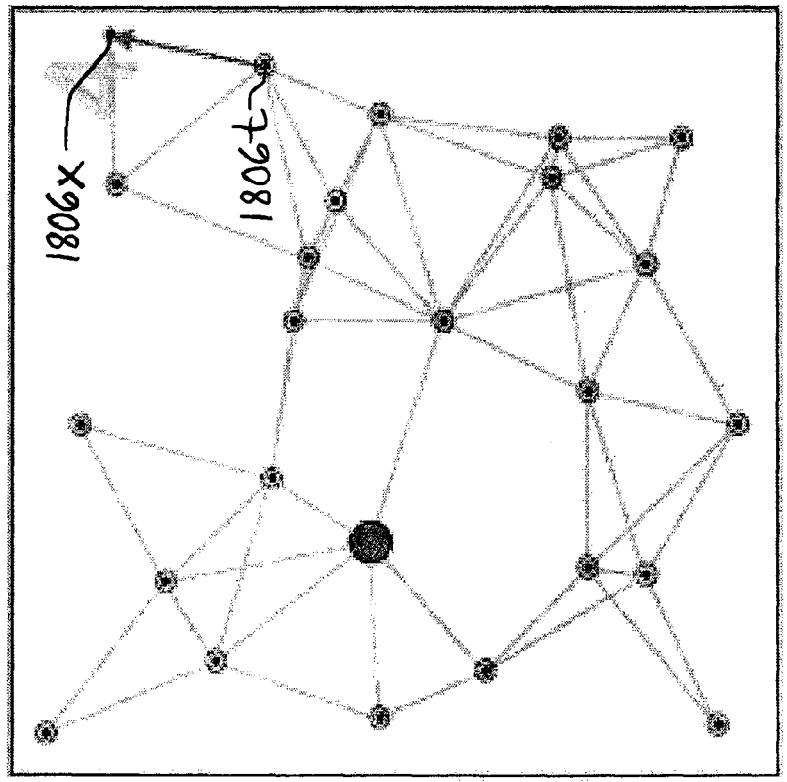
FIG. 18c is a plan view of data transfer from DCS to tracker nodes in a third time slot in a scheme in which the DCS broadcasts the same data to all tracker nodes.
Figure 18C:
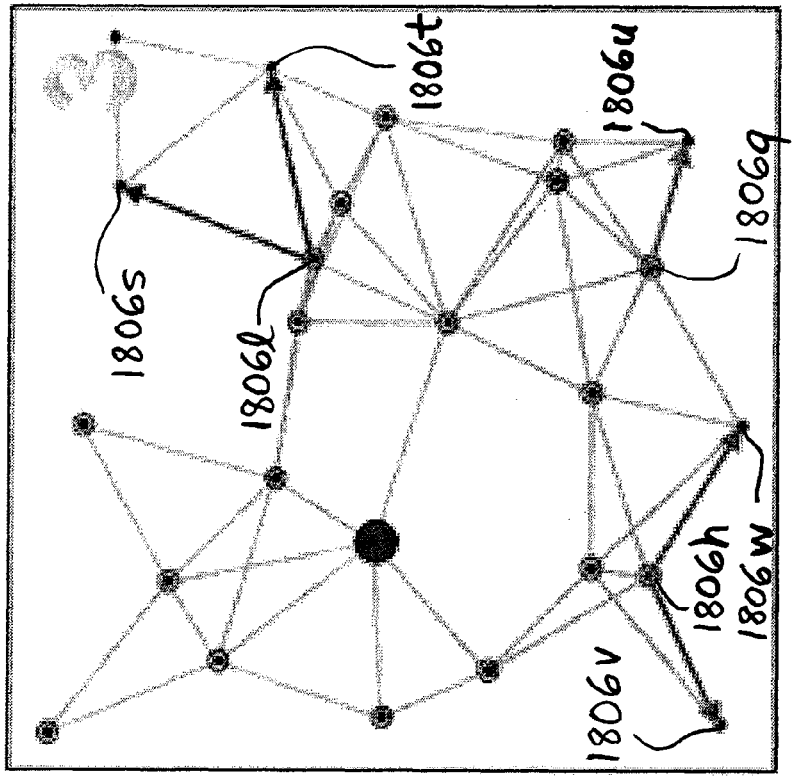

In a third transmission time slot, depicted in FIG. 18c, tracker node 1806l transmits in the first frequency channel to tracker nodes 1806s-t; tracker node 1806q transmits in the second frequency channel to tracker node 1806u; and tracker node 1806h transmits in the third frequency channel to tracker nodes 1806v-w. In the third transmission time slot, each of tracker nodes 1806l, 1806q and 1806h may transmit the same information received in the second transmission time slot, as well as other information already possessed by tracker nodes 1806l, 1806q and 1806h.

In a fourth transmission time slot, depicted in FIG. 18d, tracker node 1806t transmits in the third frequency channel to tracker node 1806x. In the fourth transmission time slot, tracker node 1806t may transmit the same information received in the third transmission time slot, as well as other information already possessed by tracker node 1806t. U.S. Pat. No. 7,738,455 (serial application Ser. No. 11/488,380) to Keshavarzian et al. discloses details on how the above-described scheme may be implemented, and is hereby incorporated by reference herein in its entirety.

In the cases of the third type, in which the DCS needs to send individual data to every tracker, individual communication from the DCS to all trackers may take the same amount of time as taken by data collection by the DCS from the trackers. The time slot lengths may remain the same while the schedule of hops may be the inverse or opposite of the schedule of hops used in data collection, as illustrated in FIGS. 19a-d, 20a-d and 21a-d. In each of FIGS. 19a-d, 20a-d and 21a-d, transmission in a first frequency channel is depicted by a solid arrow, and transmission in a second frequency channel is depicted by a dashed arrow.

FIGS. 19a-d illustrate data collection from tracker nodes to a DCS 1922 along two adjacent paths. In the first time slot, depicted in FIG. 19a, tracker nodes 1906a-b transmit to tracker nodes 1906c-d, respectively. The time slot may have a length corresponding to one overhead (header) byte per packet and one data byte per tracker.

Figure 19A:
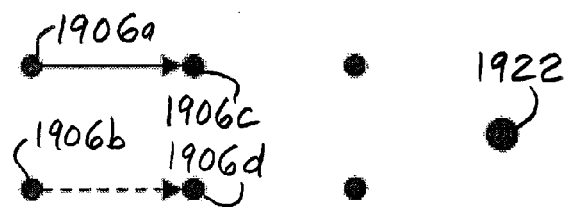
FIG. 19a is a plan view of individual data transfer from tracker nodes to a DCS along parallel paths in a first time slot.
Figure 19B:
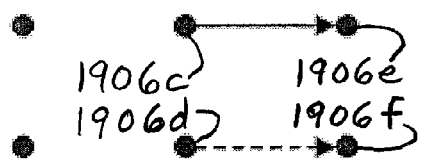
FIG. 19b is a plan view of individual data transfer from tracker nodes to a DCS along parallel paths in a second time slot.

In the second time slot, depicted in FIG. 19b, tracker nodes 1906c-d transmit to tracker nodes 1906e-f, respectively. The time slot may have a length corresponding to one overhead (header) byte per packet and two data byte per tracker, as nodes 1906c-d may transmit both the information received in the first time slot as well as the information already possessed by nodes 1906c-d.

Figure 19C:
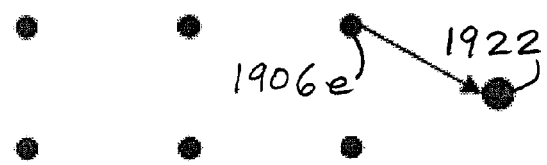
FIG. 19c is a plan view of individual data transfer from tracker nodes to a DCS along parallel paths in a third time slot.

In the third time slot, depicted in FIG. 19c, tracker node 1906e transmits to DCS 1922. The time slot may have a length corresponding to one overhead (header) byte per packet and three data bytes per tracker, as node 1906e may transmit the information received from both nodes 1906a and 1906c as well as the information already possessed by node 1906e.

Figure 19D:
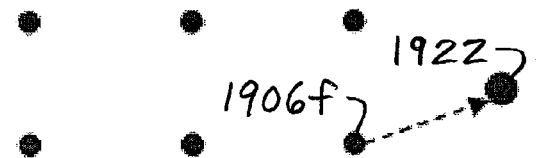
FIG. 19d is a plan view of individual data transfer from tracker nodes to a DCS along parallel paths in a fourth time slot.

In the fourth time slot, depicted in FIG. 19d, tracker node 1906f transmits to DCS 1922. The time slot may have a length corresponding to one overhead (header) byte per packet and three data bytes per tracker, as node 1906f may transmit the information received from both nodes 1906b and 1906d as well as the information already possessed by node 1906f. Accordingly, for data collection from the tracker nodes to the DCS, the total duration of all four time slots may correspond to four overhead bytes and nine data bytes.

In contrast to FIGS. 19a-d, FIGS. 20a-d illustrate one embodiment of a data communication scheme from the DCS to each tracker node in the parallel data paths. In the first time slot, depicted in FIG. 20a, DCS 2022 transmits to tracker node 2006f. The time slot may have a length corresponding to one overhead (header) byte and three data bytes, as data for each of tracker nodes 2006b, 2006d and 2006f is being transmitted.

Figure 20A:
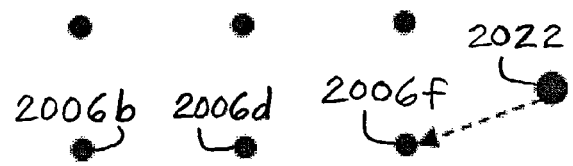
FIG. 20a is a plan view of transfer of individual data from a DCS to tracker nodes along parallel paths in a first time slot.
Figure 20B:
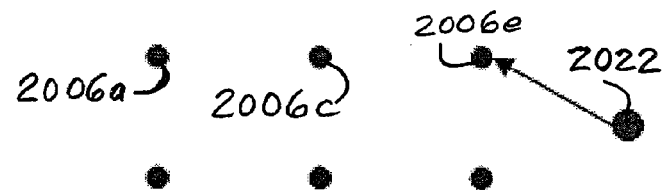
FIG. 20b is a plan view of transfer of individual data from a DCS to tracker nodes along parallel paths in a second time slot.

In the second time slot, depicted in FIG. 20b, DCS 2022 transmits to tracker node 2006e. The time slot may have a length corresponding to one overhead (header) byte and three data bytes, as data for each of tracker nodes 2006a, 2006c and 2006e is being transmitted.

Figure 20C:
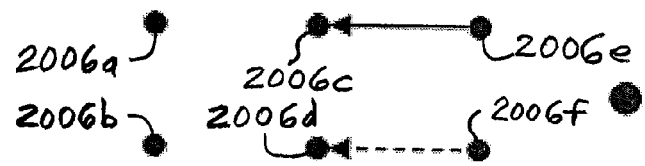
FIG. 20c is a plan view of transfer of individual data from a DCS to tracker nodes along parallel paths in a third time slot.

In the third time slot, depicted in FIG. 20c, tracker node 2006e transmits to tracker node 2006c; and tracker node 2006f transmits to tracker node 2006d. The time slot may have a length corresponding to one overhead (header) byte per packet and two data bytes, as data for each of tracker nodes 2006a, 2006c is being transmitted by tracker node 2006e, and data for each of tracker nodes 2006b, 2006d is being transmitted by tracker node 2006f.

Figure 20D:
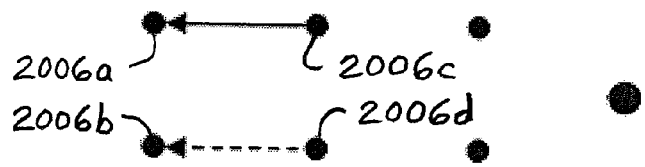
FIG. 20d is a plan view of transfer of individual data from a DCS to tracker nodes along parallel paths in a fourth time slot.

In the fourth time slot, depicted in FIG. 20d, tracker node 2006c transmits to tracker node 2006a; and tracker node 2006d transmits to tracker node 2006b. The time slot may have a length corresponding to one overhead (header) byte per packet and one data byte, as data for only tracker node 2006a is being transmitted by tracker node 2006c, and data for only tracker node 2006b is being transmitted by tracker node 2006d. Accordingly, for data collection from the DCS to the tracker nodes, the total duration of all four time slots may correspond to four overhead bytes and nine data bytes, which is the same as the time duration for data collection from the tracker nodes to the DCS.

In contrast to FIGS. 19a-d, FIGS. 21a-d illustrate another embodiment of a data communication scheme from the DCS to each tracker node in the parallel data paths. In the first time slot, depicted in FIG. 21a, DCS 2122 transmits to tracker node 2106f. The time slot may have a length corresponding to one overhead (header) byte and three data bytes, as data for each of tracker nodes 2106b, 2106d and 2106f is being transmitted.

Figure 21A:
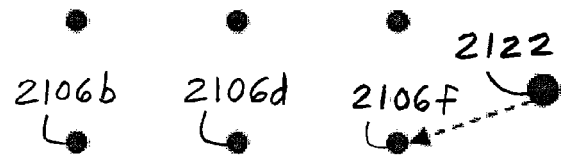
FIG. 21a is a plan view of another embodiment of transfer of individual data from a DCS to tracker nodes along parallel paths in a first time slot.
Figure 21B:
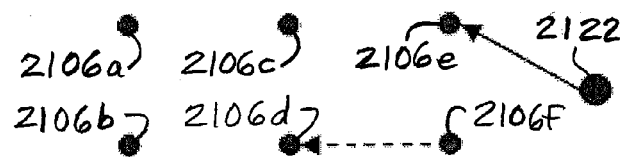
FIG. 21b is a plan view of another embodiment of transfer of individual data from a DCS to tracker nodes along parallel paths in a second time slot.

In the second time slot, depicted in FIG. 21b, DCS 2122 transmits to tracker node 2106e. The time slot may have a length corresponding to one overhead (header) byte and three data bytes, as data for each of tracker nodes 2106a, 2106c and 2106e is being transmitted. Also in the second time slot, tracker node 2106f transmits to tracker node 2106d. However, the time required for the transmission from tracker node 2106f corresponds to only one overhead byte and two data bytes, as data for tracker nodes 2106b, 2106d is being transmitted by tracker node 2106f, and this shorter time period does not affect the overall time needed for the second time slot.

Figure 21C:
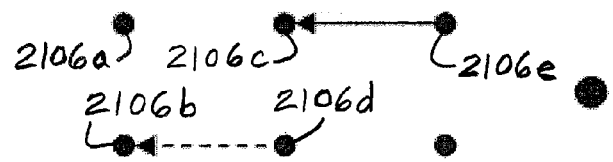
FIG. 21c is a plan view of another embodiment of transfer of individual data from a DCS to tracker nodes along parallel paths in a third time slot.

In the third time slot, depicted in FIG. 21c, tracker node 2106e transmits to tracker node 2106c; and tracker node 2106d transmits to tracker node 2106b. The time slot may have a length corresponding to one overhead (header) byte per packet and two data bytes, as data for each of tracker nodes 2106a, 2106c is being transmitted by tracker node 2106e. However, the time required for the transmission from tracker node 2106d corresponds to only one overhead byte and one data byte, as data for only tracker node 2106b is being transmitted by tracker node 2106d, and this shorter time period does not affect the overall time needed for the second time slot.

Figure 21D:
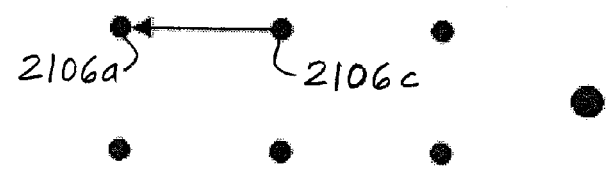
FIG. 21d is a plan view of another embodiment of transfer of individual data from a DCS to tracker nodes along parallel paths in a fourth time slot.

In the fourth time slot, depicted in FIG. 21d, tracker node 2106c transmits to tracker node 2106a. The time slot may have a length corresponding to one overhead (header) byte per packet and one data byte, as data for only tracker node 2106a is being transmitted by tracker node 2106c. Accordingly, for data collection from the DCS to the tracker nodes, the total duration of all four time slots may correspond to four overhead bytes and nine data bytes, which again is the same as the time duration for data collection from the tracker nodes to the DCS.

Referring to FIGS. 20a and 21a, the DCS sends data for all three trackers nodes in the bottom row or lower communication path. In the next step shown in FIGS. 20c and 21b, the receiving node (2006f and 2106f, respectively) extracts its data and transmits the rest of the data to the next node along the path and so on. As demonstrated in FIGS. 19a-d, 20a-d, 21a-d, the DCS-to-trackers individual communication schedule can be the reverse of the trackers-to-DCS data collection schedule, and may yield the same performance. If the schedule of data collection by the DCS is optimal, then the individual communication schedule to the tracker nodes may also be optimal.

An advantage of such a multiple collection schedule, random slotted scheme is that it is faster than other methods, and thus more time-efficient. Another advantage is that the scheme may keep all nodes busy. Links unused in the first round/time slot may be used in subsequent rounds/time slots. Yet another advantage is that the scheme may be more reliable and robust. The schedule may be computed such that each node receives the message from different sources in different rounds/time slots. A further advantage of the scheme is that it is easy to implement. That is, nodes may simply follow a pre-computed schedule. U.S. Pat. No. 7,738,455 (serial application Ser. No. 11/488,380) to Keshavarzian et al. discloses details on how such a scheme may be implemented, and is hereby incorporated by reference herein in its entirety.

Figure 22:
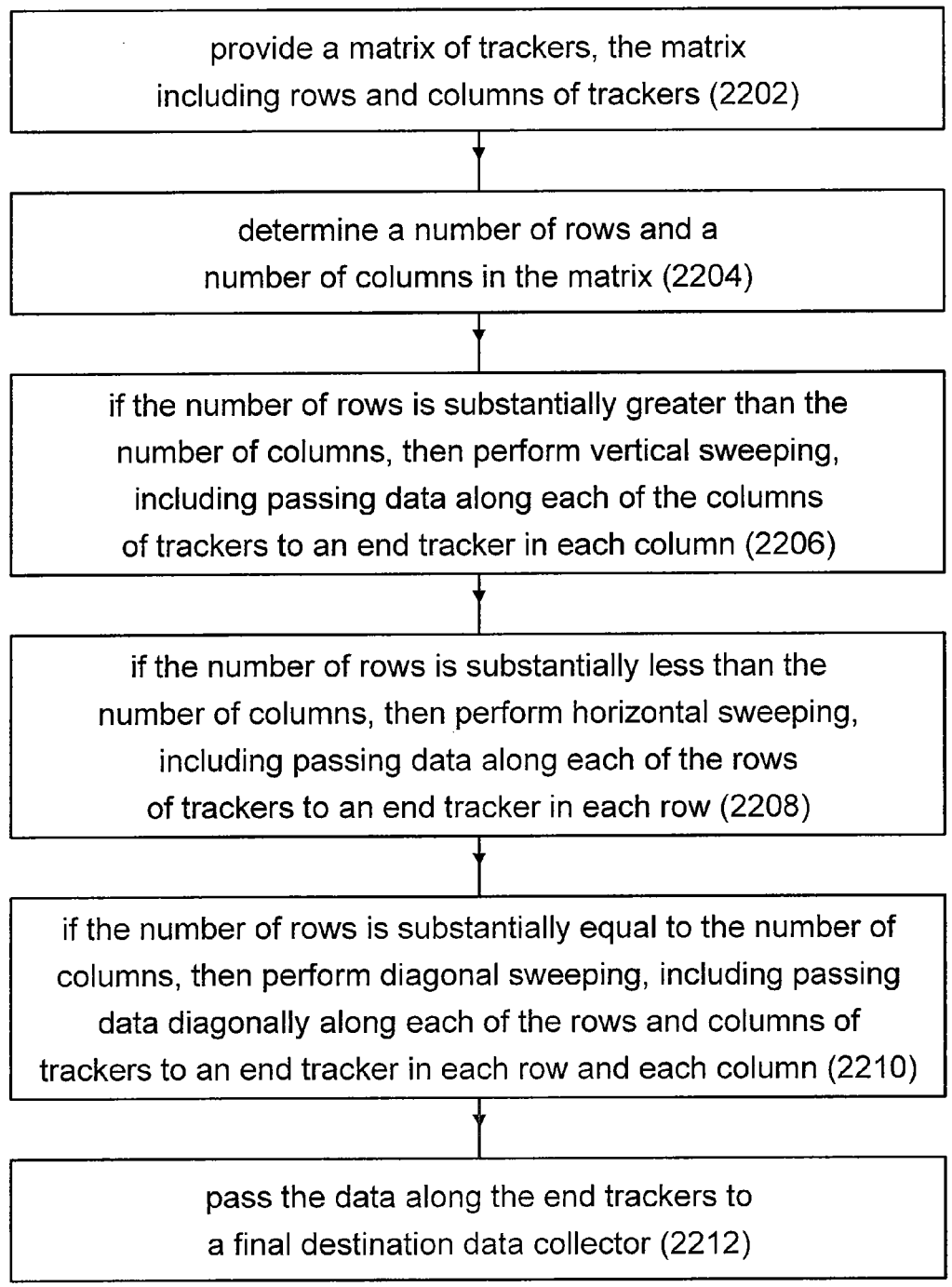
FIG. 22 is a flow chart illustrating one embodiment of a method of the invention for wireless communication.

One embodiment of a wireless communication method 2200 of the invention is illustrated in FIG. 22. In a first step 2202, a matrix of trackers is provided. The matrix includes rows and columns of trackers. For example, in the embodiment of FIG. 4a, a matrix of trackers is shown including columns and rows of trackers.

In a next step 2204, a number of rows and a number of columns in the matrix is determined. That is, in the embodiment of FIG. 4a, it may be determined that the matrix includes m number of columns and n number of rows of trackers.

Next, in step 2206, if the number of rows is substantially greater than the number of columns, then vertical sweeping is performed. The vertical sweeping includes passing data along each of the columns of trackers to an end tracker in each column. For example, in the embodiment of FIG. 4a it may be assumed that the number of rows n is substantially greater than the number of columns m. As shown in FIG. 4a, vertical sweeping may be performed wherein trackers in row i=1 transmit information to corresponding trackers immediately below in row i=2. The trackers in row i=2 then pass information to corresponding trackers immediately below in row i=3 and so on until all information is transmitted to the end trackers in the bottom row i=n.

In step 2208, if the number of rows is substantially less than the number of columns, then horizontal sweeping is performed. The horizontal sweeping includes passing data along each of the rows of trackers to an end tracker in each row. For example, in the embodiment of FIG. 4b it may be assumed that the number of rows n is substantially less than the number of columns m. As shown in FIG. 4b, horizontal sweeping may be performed wherein trackers in column j=1 transmit information to corresponding trackers immediately to the right in column j=2. The trackers in column j=2 then pass information to corresponding trackers immediately to the right in column j=3 and so on until all information is transmitted to the end trackers in the rightmost column j=m.

In a next step 2210, if the number of rows is substantially equal to the number of columns, then diagonal sweeping is performed. The diagonal sweeping includes passing data diagonally across each of the rows and columns of trackers to an end tracker in each row and each column. For example, in the embodiment of FIGS. 4c-e it may be assumed that the number of rows n is substantially equal to the number of columns m. As shown in FIG. 4c, diagonal sweeping may be performed wherein trackers in row i=1 and/or column j=1 (except for the end trackers at row i=1, column j=m and at row i=n, column j=1) transmit information to corresponding trackers immediately diagonally adjacent to the lower right in column j=2 and/or row i=2. The trackers in column row i=2 and/or j=2 (except for one end tracker at row i=2, column j=m and another end tracker at row i=n, column j=2) then pass information to corresponding trackers immediately diagonally adjacent to the lower right in column j=3 and/or row i=3. This process continues, as shown in FIG. 4e, for example, until all information is transmitted to the end trackers in the rightmost column j=m and/or the bottom row i=n.

In a final step 2212, the data is passed along the end trackers to a final destination data collector. For example, as shown in FIG. 4d, the end tracker at row i=1, column j=m transmits to the end tracker immediately below at row i=2, column j=m; and the end tracker at row i=n, column j=1 transmits to the end tracker immediately to the right at row i=n, column j=2. Further, as shown in FIG. 4e, the end tracker at row i=2, column j=m transmits to the end tracker immediately below at row i=3, column j=m; and the end tracker at row i=n, column j=2 transmits to the end tracker immediately to the right at row i=n, column j=3. This process continues until all data has been passed to a final destination data collector 226c.

Figure 23:
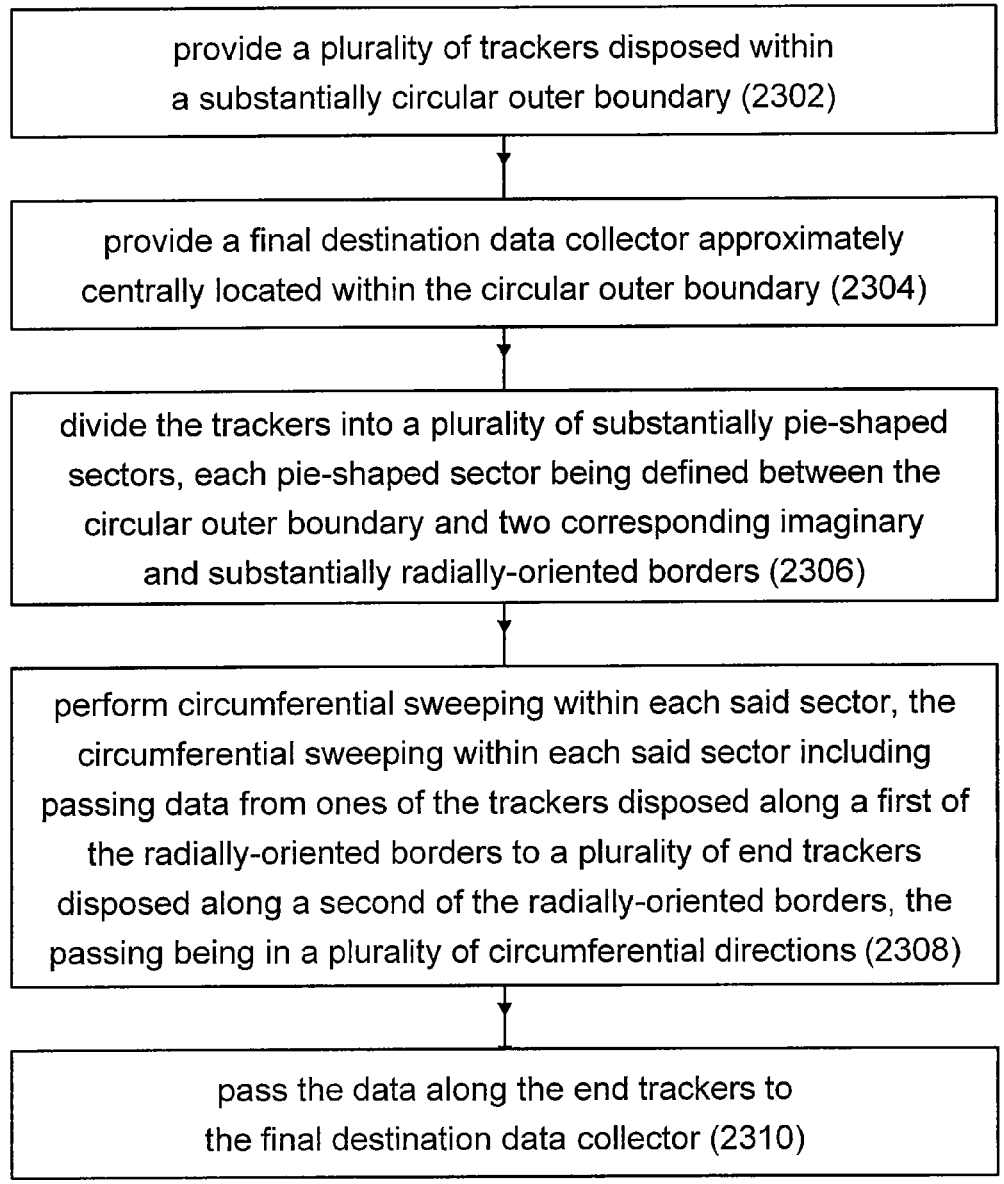
FIG. 23 is a flow chart illustrating another embodiment of a method of the invention for wireless communication.

Another embodiment of a method 2300 of the invention for wireless communication is illustrated in FIG. 23. In a first step 2302, a plurality of trackers are provided disposed within a substantially circular outer boundary. For example, as shown in FIG. 9a, trackers 906 are provided within a substantially circular outer imaginary boundary 903.

In a next step 2304, a final destination data collector is provided approximately centrally located within the circular outer boundary. For example, as shown in FIG. 9a, a final destination data collector 922 is provided approximately centrally located within the circular outer boundary 903.

Next, in step 2306, the trackers are divided or grouped into a plurality of substantially pie-shaped sectors. Each pie-shaped sector is defined between the circular outer boundary and two corresponding imaginary and substantially radially-oriented borders. That is, as shown in FIG. 9a, trackers 906 are grouped or divided into six pie-shaped sectors 902a-f. Each of pie-shaped sectors 902a-f is defined between the circular outer boundary 903 and a respective pair of corresponding imaginary and substantially radially-oriented borders. Each respective pair of borders is an adjacent two of radially-oriented borders 904a-f.

In step 2308, circumferential sweeping is performed within each sector. The circumferential sweeping within each sector includes passing data from ones of the trackers disposed along a first of the radially-oriented borders to a plurality of end trackers disposed along a second of the radially-oriented borders. The passing is in a plurality of circumferential directions. For example, as shown in FIG. 9a, data within sector 902a is passed by the trackers that are adjacent to radially-oriented border 904a, including trackers 906a, 906c and 906e, in circumferential directions generally indicated by arcuate arrow 926. As further shown in FIGS. 9b-e, the data transmissions in the circumferential directions continue until all data has been received by the end trackers adjacent to radially-oriented border 904b. Similar patterns of data transmission also occur in the other sectors 902b-f.

In a final step 2310, the data is passed along the end trackers to the final destination data collector. As shown in FIGS. 9f-k, data is passed sequentially from end tracker 906g to end tracker 906h; then from end tracker 906h to end tracker 906i; then from end tracker 906i to end tracker 906j; then from end tracker 906j to end tracker 906k; then from end tracker 906k to end tracker 906l; and finally from end tracker 906l to data collector 922.

Figure 24:
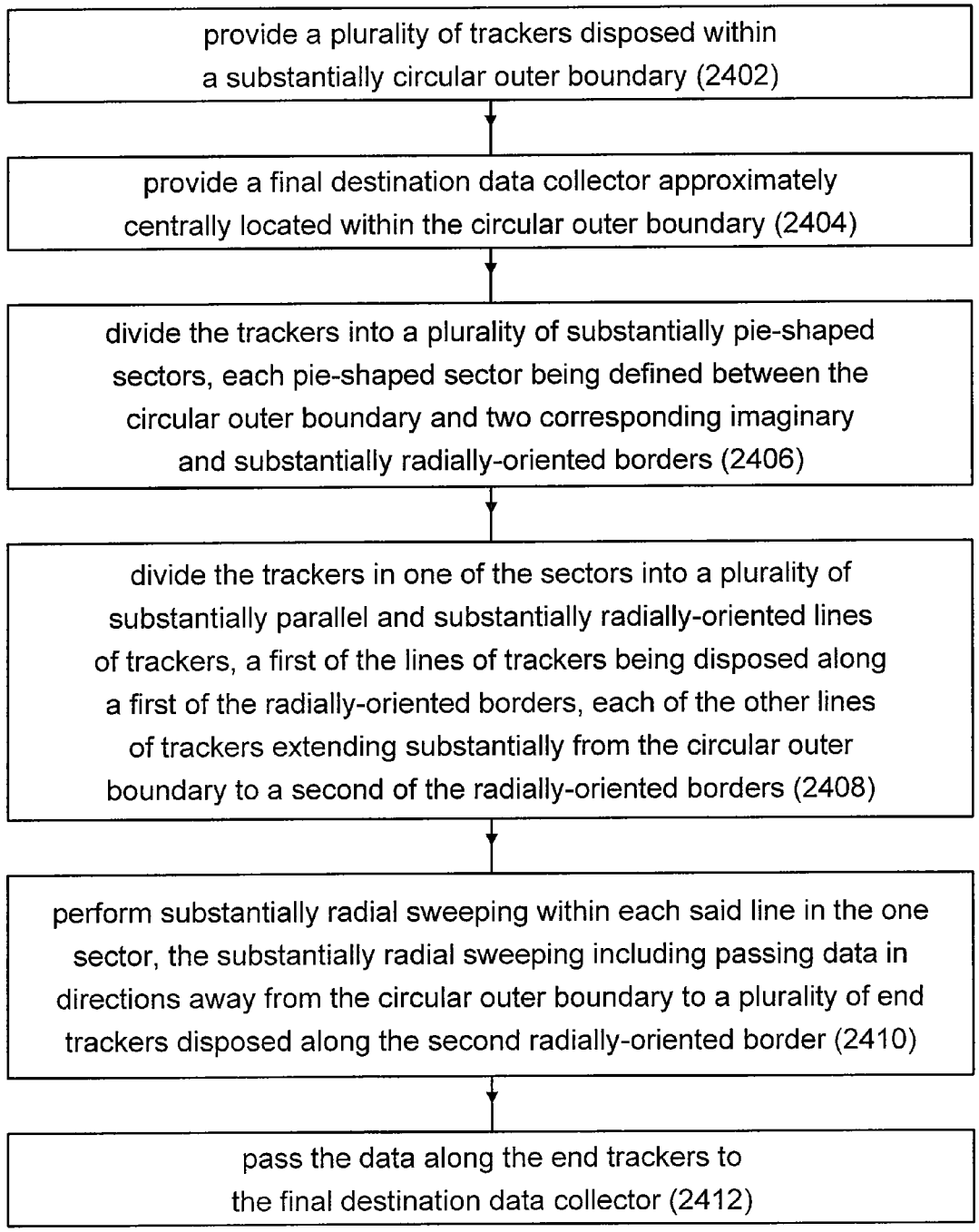
FIG. 24 is a flow chart illustrating yet another embodiment of a method of the invention for wireless communication.

Another embodiment of a method 2400 of the invention for wireless communication is illustrated in FIG. 24. In a first step 2402, a plurality of trackers are provided disposed within a substantially circular outer boundary. For example, as shown in FIG. 10a, trackers 1006 are provided within a substantially circular outer imaginary boundary 1003.

In a next step 2404, a final destination data collector is provided approximately centrally located within the circular outer boundary. For example, as shown in FIG. 10a, a final destination data collector 1022 is provided approximately centrally located within the circular outer boundary 1003.

Next, in step 2406, the trackers are divided or grouped into a plurality of substantially pie-shaped sectors. Each pie-shaped sector is defined between the circular outer boundary and two corresponding imaginary and substantially radially-oriented borders. That is, as shown in FIG. 10a, trackers 1006 are divided or grouped into six pie-shaped sectors 1002a-f. Each of pie-shaped sectors 1002a-f is defined between the circular outer boundary 1003 and a respective pair of corresponding imaginary and substantially radially-oriented borders. Each respective pair of borders is an adjacent two of radially-oriented borders 1004a-f.

In step 2408, the trackers in one of the sectors are divided or grouped into a plurality of substantially parallel and substantially radially-oriented lines of trackers. A first of the lines of trackers is disposed along a first of the radially-oriented borders. Each of the other lines of trackers extend substantially from the circular outer boundary to a second of the radially-oriented borders. For example, as shown in FIG. 10a, the trackers in sector 1002a may be divided or grouped into a first line of trackers disposed along radially-oriented border 1004a and including tracker 1006a as its radially outermost tracker. A second line of trackers includes tracker 1006c as its radially outermost tracker and includes tracker 1006g, which is adjacent to radially-oriented border 1004b. Similarly, a third line of trackers extends from tracker 1006h to tracker 1006, etc.

In a next step 2410, substantially radial sweeping is performed within each line in the one sector. The substantially radial sweeping includes passing data in directions away from the circular outer boundary to a plurality of end trackers disposed along the second radially-oriented border. For example, as shown in FIGS. 10a-e, data within sector 1002a is passed in generally radially inward directions from the trackers that are adjacent to outer border 1003, including trackers 1006a, 1006c and 1006h, along their respective lines of trackers to the end trackers disposed adjacent to radially-oriented border 1004b, including end trackers 1006g and 1006i.

In a final step 2412, the data is passed along the end trackers to the final destination data collector. As shown in FIGS. 10a and 10c-g, data is passed sequentially from end tracker 1006e along the end trackers adjacent to radially-oriented border 1004b until arriving at tracker 1006i, tracker 1006g, and finally at data collector 1022.

While this invention has been described as having an exemplary design, the invention may be further modified within the spirit and scope of this disclosure. This application is therefore intended to cover any variations, uses, or adaptations of the invention using its general principles.

What is claimed is:

1. A method of wireless communication, the method comprising the steps of:
  providing a plurality of trackers disposed within a circular outer boundary;
  providing a final destination data collector centrally located within the circular outer boundary;
  grouping the plurality of trackers into a plurality of pie-shaped sectors, each of said pie-shaped sectors being defined between the circular outer boundary and two corresponding imaginary and radially-oriented borders;
  grouping the plurality of trackers in one of the pie-shaped sectors into a plurality of parallel and radially-oriented lines of trackers, a first of the plurality of parallel and radially-oriented lines of trackers being disposed along a first of the imaginary and radially-oriented borders, each of the other lines of the plurality of parallel and radially-oriented lines of trackers extending from the circular outer boundary to a second of the imaginary and radially-oriented borders;
  performing radial sweeping within each of the plurality of parallel and radially-oriented lines of trackers in said one of the pie-shaped sectors, the radial sweeping including passing data in directions away from the circular outer boundary to a plurality of end trackers disposed along the second of the imaginary and radially-oriented borders; and
  passing the data along the plurality of end trackers to the final destination data collector.

2. The method of claim 1, wherein at least one of the plurality of end trackers that receives the passed data also produces original data, and the at least one of the plurality of end trackers passes both the passed data received by the at least one of the plurality of end trackers and the original data produced by the at least one of the plurality of end trackers.

3. The method of claim 1, wherein the passing of the data comprises wirelessly transmitting the data.

4. The method of claim 1, wherein the data is passed to an adjacent one of the plurality of end trackers.

5. The method of claim 1, wherein all trackers disposed adjacent to the circular outer boundary pass the data in a same time slot.

6. The method of claim 1, wherein each of said trackers passing the data in a same time slot and within a transmission distance of each other uses a different respective frequency channel, and wherein at least two of said trackers passing the data in a same time slot and disposed beyond the transmission distance of each other use a same frequency channel.

* * * * *